United States Patent
King et al.

(10) Patent No.: US 11,360,509 B2
(45) Date of Patent: *Jun. 14, 2022

(54) ELECTRONIC DEVICE HAVING DISPLAY AND SURROUNDING TOUCH SENSITIVE SURFACES FOR USER INTERFACE AND CONTROL

(71) Applicant: Apple Inc., Cupertino, CA (US)

(72) Inventors: Nicholas King, San Jose, CA (US); Duncan Robert Kerr, San Francisco, CA (US); Paul Herbst, Austin, TX (US); Steven P. Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/175,387

(22) Filed: Feb. 12, 2021

(65) Prior Publication Data

US 2021/0165449 A1    Jun. 3, 2021

Related U.S. Application Data

(63) Continuation of application No. 16/529,690, filed on Aug. 1, 2019, now Pat. No. 10,921,941, which is a
(Continued)

(51) Int. Cl.
*G06F 3/044* (2006.01)
*G06F 1/16* (2006.01)
(Continued)

(52) U.S. Cl.
CPC ............ *G06F 1/1626* (2013.01); *G06F 1/169* (2013.01); *G06F 1/1637* (2013.01);
(Continued)

(58) Field of Classification Search
CPC ...... G06F 3/0412; G06F 1/1643; G06F 3/044; G06F 3/03547; G06F 1/1626;
(Continued)

(56) References Cited

U.S. PATENT DOCUMENTS 3,333,160 A    7/1967    Gorski
3,541,541 A    11/1970   Engelbart
(Continued)

FOREIGN PATENT DOCUMENTS

CA    1243096 A    10/1988
CN    1173672 A    2/1998
(Continued)

OTHER PUBLICATIONS

4-Wire Resistive Touchscreens, Available online at: <http://www.touchscreens.com/intro-touchtypes-4resistive.html>, Accessed on Aug. 5, 2005.
(Continued)

*Primary Examiner* — Michael A Faragalla
(74) *Attorney, Agent, or Firm* — Kubota & Basol LLP

(57) ABSTRACT

An electronic device has a display and has a touch sensitive bezel surrounding the display. Areas on the bezel are designated for controls used to operate the electronic device. Visual guides corresponding to the controls are displayed on the display adjacent the areas of the bezel designated for the controls. Touch data is generated by the bezel when a user touches an area of the bezel. The device determines which of the controls has been selected based on which designated area is associated with the touch data from the bezel. The device then initiates the determined control. The device can have a sensor for determining the orientation of the device. Based on the orientation, the device can alter the areas designated on the bezel for the controls and can alter the (Continued)

location of the visual guides for the display so that they match the altered areas on the bezel.

20 Claims, 13 Drawing Sheets

Related U.S. Application Data continuation of application No. 15/970,571, filed on May 3, 2018, now Pat. No. 10,386,980, which is a continuation of application No. 14/724,753, filed on May 28, 2015, now Pat. No. 9,983,742, which is a continuation of application No. 12/486,710, filed on Jun. 17, 2009, now Pat. No. 9,047,009, which is a continuation of application No. 11/426,078, filed on Jun. 23, 2006, now Pat. No. 7,656,393, which is a continuation-in-part of application No. 11/367,749, filed on Mar. 3, 2006.

(60) Provisional application No. 60/663,345, filed on Mar. 16, 2005, provisional application No. 60/658,777, filed on Mar. 4, 2005.

(51) Int. Cl.
| | |
|---|---|
| *G06F 3/0488* | (2022.01) |
| *G06F 3/04883* | (2022.01) |
| *G06F 3/04886* | (2022.01) |
| *G06F 3/0354* | (2013.01) |
| *G06F 3/041* | (2006.01) |
| *G06F 3/04847* | (2022.01) |

(52) U.S. Cl.
CPC ........ *G06F 1/1643* (2013.01); *G06F 3/03547* (2013.01); *G06F 3/044* (2013.01); *G06F 3/0412* (2013.01); *G06F 3/04847* (2013.01); *G06F 3/04883* (2013.01); *G06F 3/04886* (2013.01); *G06F 3/0445* (2019.05); *G06F 3/0446* (2019.05); *G06F 2200/1612* (2013.01); *G06F 2203/0339* (2013.01); *G06F 2203/04101* (2013.01); *G06F 2203/04808* (2013.01)

(58) Field of Classification Search
CPC ......... G06F 2203/04105; G06F 3/0446; G06F 2203/0339; G06F 1/169; G06F 2203/04101; G06F 2200/1612; G06F 3/04847; G06F 3/0445; G06F 3/04886; G06F 3/04883; G06F 1/1637; G06F 2203/04808
See application file for complete search history.

(56) References Cited

U.S. PATENT DOCUMENTS

| | | |
|---|---|---|
| 3,662,105 A | 5/1972 | Hurst et al. |
| 3,798,370 A | 3/1974 | Hurst |
| 4,110,749 A | 8/1978 | Janko et al. |
| 4,246,452 A | 1/1981 | Chandler |
| 4,264,903 A | 4/1981 | Bigelow |
| 4,550,221 A | 10/1985 | Mabusth |
| 4,566,001 A | 1/1986 | Moore et al. |
| 4,672,364 A | 6/1987 | Lucas |
| 4,672,558 A | 6/1987 | Beckes et al. |
| 4,689,761 A | 8/1987 | Yurchenco |
| 4,692,809 A | 9/1987 | Beining et al. |
| 4,695,827 A | 9/1987 | Beining et al. |
| 4,719,524 A | 1/1988 | Morishima et al. |
| 4,733,222 A | 3/1988 | Evans |
| 4,734,685 A | 3/1988 | Watanabe |
| 4,736,191 A | 4/1988 | Matzke et al. |
| 4,746,770 A | 5/1988 | Mcavinney |
| 4,771,276 A | 9/1988 | Parks |
| 4,788,384 A | 11/1988 | Bruere-Dawson et al. |
| 4,806,846 A | 2/1989 | Kerber |
| 4,857,916 A | 8/1989 | Bellin |
| 4,866,602 A | 9/1989 | Hall |
| 4,891,508 A | 1/1990 | Campbell |
| 4,896,370 A | 1/1990 | Kasparian et al. |
| 4,898,555 A | 2/1990 | Sampson |
| 4,917,516 A | 4/1990 | Retter |
| 4,922,236 A | 5/1990 | Heady |
| 4,933,660 A | 6/1990 | Wynne, Jr. |
| 4,968,877 A | 11/1990 | Mcavinney et al. |
| 4,970,819 A | 11/1990 | Mayhak |
| 5,003,519 A | 3/1991 | Noirjean |
| 5,017,030 A | 5/1991 | Crews |
| 5,027,690 A | 7/1991 | Wachi et al. |
| 5,125,077 A | 6/1992 | Hall |
| 5,178,477 A | 1/1993 | Gambaro |
| 5,179,648 A | 1/1993 | Hauck |
| 5,186,646 A | 2/1993 | Pederson |
| 5,189,403 A | 2/1993 | Franz et al. |
| 5,194,862 A | 3/1993 | Edwards |
| 5,224,151 A | 6/1993 | Bowen et al. |
| 5,224,861 A | 7/1993 | Glass et al. |
| 5,225,959 A | 7/1993 | Stearns |
| 5,237,311 A | 8/1993 | Mailey et al. |
| 5,241,308 A | 8/1993 | Young |
| 5,252,951 A | 10/1993 | Tannenbaum et al. |
| 5,281,966 A | 1/1994 | Walsh |
| 5,305,017 A | 4/1994 | Gerpheide |
| D349,280 S | 8/1994 | Kaneko |
| 5,339,213 A | 8/1994 | O'callaghan |
| 5,345,543 A | 9/1994 | Capps et al. |
| 5,355,148 A | 10/1994 | Anderson |
| 5,376,948 A | 12/1994 | Roberts |
| 5,379,057 A | 1/1995 | Clough et al. |
| 5,398,310 A | 3/1995 | Tchao et al. |
| 5,404,152 A | 4/1995 | Nagai |
| 5,414,445 A | 5/1995 | Kaneko et al. |
| 5,438,331 A | 8/1995 | Gilligan et al. |
| 5,442,742 A | 8/1995 | Greyson et al. |
| D362,431 S | 9/1995 | Kaneko et al. |
| 5,463,388 A | 10/1995 | Boie et al. |
| 5,463,696 A | 10/1995 | Beernink et al. |
| 5,473,343 A | 12/1995 | Kimmich et al. |
| 5,473,344 A | 12/1995 | Bacon et al. |
| 5,483,261 A | 1/1996 | Yasutake |
| 5,488,204 A | 1/1996 | Mead et al. |
| 5,491,706 A | 2/1996 | Tagawa et al. |
| 5,495,077 A | 2/1996 | Miller et al. |
| 5,495,566 A | 2/1996 | Kwatinetz |
| 5,510,813 A | 4/1996 | Makinwa et al. |
| 5,513,309 A | 4/1996 | Meier et al. |
| 5,523,775 A | 6/1996 | Capps |
| 5,528,265 A | 6/1996 | Harrison |
| 5,530,455 A | 6/1996 | Gillick et al. |
| 5,541,372 A | 7/1996 | Baller et al. |
| 5,543,590 A | 8/1996 | Gillespie et al. |
| 5,543,591 A | 8/1996 | Gillespie et al. |
| 5,559,943 A | 9/1996 | Cyr et al. |
| 5,561,445 A | 10/1996 | Miwa et al. |
| 5,563,632 A | 10/1996 | Roberts |
| 5,563,996 A | 10/1996 | Tchao |
| 5,565,658 A | 10/1996 | Gerpheide et al. |
| 5,565,887 A | 10/1996 | Mccambridge et al. |
| 5,578,817 A | 11/1996 | Bidiville et al. |
| 5,579,036 A | 11/1996 | Yates, IV |
| 5,581,681 A | 12/1996 | Tchao et al. |
| 5,583,946 A | 12/1996 | Gourdol |
| 5,585,823 A | 12/1996 | Duchon et al. |
| 5,589,856 A | 12/1996 | Stein et al. |
| 5,590,219 A | 12/1996 | Gourdol |
| 5,592,198 A | 1/1997 | Fagard et al. |
| 5,592,566 A | 1/1997 | Pagallo et al. |
| 5,594,471 A | 1/1997 | Deeran et al. |
| 5,594,810 A | 1/1997 | Gourdol |
| 5,596,347 A | 1/1997 | Robertson et al. |
| 5,596,694 A | 1/1997 | Capps |
| 5,598,183 A | 1/1997 | Robertson et al. |

(56) References Cited

U.S. PATENT DOCUMENTS

| | | |
|---|---|---|
| 5,598,527 A | 1/1997 | Debrus et al. |
| 5,611,040 A | 3/1997 | Brewer et al. |
| 5,611,060 A | 3/1997 | Belfiore et al. |
| 5,612,719 A | 3/1997 | Beernink et al. |
| 5,631,805 A | 5/1997 | Bonsall |
| 5,633,955 A | 5/1997 | Bozinovic et al. |
| 5,634,102 A | 5/1997 | Capps |
| 5,636,101 A | 6/1997 | Bonsall et al. |
| 5,642,108 A | 6/1997 | Gopher et al. |
| 5,644,657 A | 7/1997 | Capps et al. |
| D382,550 S | 8/1997 | Kaneko et al. |
| 5,661,505 A | 8/1997 | Livits |
| 5,663,070 A | 9/1997 | Barr et al. |
| 5,666,113 A | 9/1997 | Logan |
| 5,666,502 A | 9/1997 | Capps |
| 5,666,552 A | 9/1997 | Greyson et al. |
| D385,542 S | 10/1997 | Kaneko et al. |
| 5,675,361 A | 10/1997 | Santilli |
| 5,675,362 A | 10/1997 | Clough et al. |
| 5,677,710 A | 10/1997 | Thompson-rohrlich |
| 5,686,720 A | 11/1997 | Tullis |
| 5,689,253 A | 11/1997 | Hargreaves et al. |
| 5,710,844 A | 1/1998 | Capps et al. |
| 5,726,687 A | 3/1998 | Belfiore et al. |
| 5,729,219 A | 3/1998 | Armstrong et al. |
| 5,729,250 A | 3/1998 | Bishop et al. |
| 5,730,165 A | 3/1998 | Philipp |
| 5,736,976 A | 4/1998 | Cheung |
| 5,741,990 A | 4/1998 | Davies |
| 5,745,116 A | 4/1998 | Pisutha-arnond |
| 5,745,591 A | 4/1998 | Feldman |
| 5,745,716 A | 4/1998 | Tchao et al. |
| 5,746,818 A | 5/1998 | Yatake |
| 5,748,185 A | 5/1998 | Stephan et al. |
| 5,748,269 A | 5/1998 | Harris et al. |
| 5,751,274 A | 5/1998 | Davis |
| 5,754,890 A | 5/1998 | Holmdahl et al. |
| 5,764,222 A | 6/1998 | Shieh |
| 5,764,818 A | 6/1998 | Capps et al. |
| 5,766,493 A | 6/1998 | Shin |
| 5,767,457 A | 6/1998 | Gerpheide et al. |
| 5,767,842 A | 6/1998 | Korth |
| 5,786,804 A | 7/1998 | Gordon |
| 5,786,818 A | 7/1998 | Brewer et al. |
| 5,790,104 A | 8/1998 | Shieh |
| 5,790,107 A | 8/1998 | Kasser et al. |
| 5,793,881 A | 8/1998 | Stiver et al. |
| 5,802,516 A | 9/1998 | Shwarts et al. |
| 5,808,567 A | 9/1998 | Mccloud |
| 5,808,602 A | 9/1998 | Sellers |
| 5,809,267 A | 9/1998 | Moran et al. |
| 5,812,114 A | 9/1998 | Loop |
| 5,816,225 A | 10/1998 | Koch et al. |
| 5,821,690 A | 10/1998 | Martens et al. |
| 5,821,930 A | 10/1998 | Hansen |
| 5,823,782 A | 10/1998 | Marcus et al. |
| 5,825,351 A | 10/1998 | Tam |
| 5,825,352 A | 10/1998 | Bisset et al. |
| 5,825,353 A | 10/1998 | Will |
| 5,828,364 A | 10/1998 | Siddiqui |
| 5,835,079 A | 11/1998 | Shieh |
| 5,838,304 A | 11/1998 | Hall |
| 5,841,078 A | 11/1998 | Miller et al. |
| 5,841,425 A | 11/1998 | Zenz, Sr. |
| 5,841,426 A | 11/1998 | Dodson et al. |
| D402,281 S | 12/1998 | Ledbetter et al. |
| 5,850,213 A | 12/1998 | Imai et al. |
| 5,854,625 A | 12/1998 | Frisch et al. |
| 5,856,822 A | 1/1999 | Du et al. |
| 5,880,411 A | 3/1999 | Gillespie et al. |
| 5,880,715 A | 3/1999 | Garrett |
| 5,883,619 A | 3/1999 | Ho et al. |
| 5,886,687 A | 3/1999 | Gibson |
| 5,889,236 A | 3/1999 | Gillespie et al. |
| 5,898,434 A | 4/1999 | Small et al. |
| 5,900,848 A | 5/1999 | Haneda et al. |
| 5,903,229 A | 5/1999 | Kishi |
| 5,907,152 A | 5/1999 | Dandliker et al. |
| 5,907,318 A | 5/1999 | Medina |
| 5,909,211 A | 6/1999 | Combs et al. |
| 5,910,799 A | 6/1999 | Carpenter et al. |
| 5,914,705 A | 6/1999 | Johnson et al. |
| 5,914,706 A | 6/1999 | Kono |
| 5,920,309 A | 7/1999 | Bisset et al. |
| 5,923,319 A | 7/1999 | Bishop et al. |
| 5,931,906 A | 8/1999 | Fidelibus et al. |
| 5,933,134 A | 8/1999 | Shieh |
| 5,943,044 A | 8/1999 | Martinelli et al. |
| 5,956,019 A | 9/1999 | Bang et al. |
| 5,959,611 A | 9/1999 | Smailagic et al. |
| 5,977,867 A | 11/1999 | Blouin |
| 5,977,869 A | 11/1999 | Andreas |
| 5,977,952 A | 11/1999 | Francis |
| 5,982,302 A | 11/1999 | Ure |
| 5,991,431 A | 11/1999 | Borza et al. |
| 5,996,080 A | 11/1999 | Silva et al. |
| 5,999,166 A | 12/1999 | Rangan |
| 6,002,389 A | 12/1999 | Kasser |
| 6,002,808 A | 12/1999 | Freeman |
| 6,005,299 A | 12/1999 | Hengst |
| 6,020,881 A | 2/2000 | Naughton et al. |
| 6,029,214 A | 2/2000 | Dorfman et al. |
| 6,031,518 A | 2/2000 | Adams et al. |
| 6,031,524 A | 2/2000 | Kunert |
| 6,037,882 A | 3/2000 | Levy |
| 6,041,134 A | 3/2000 | Merjanian |
| 6,049,328 A | 4/2000 | Vanderheiden |
| 6,050,825 A | 4/2000 | Nichol et al. |
| 6,052,339 A | 4/2000 | Frenkel et al. |
| 6,064,370 A | 5/2000 | Wang et al. |
| 6,069,648 A | 5/2000 | Suso et al. |
| 6,072,471 A | 6/2000 | Lo |
| 6,072,475 A | 6/2000 | Van |
| 6,072,494 A | 6/2000 | Nguyen |
| 6,075,533 A | 6/2000 | Chang |
| 6,084,574 A | 7/2000 | Bidiville |
| 6,084,576 A | 7/2000 | Leu et al. |
| 6,097,372 A | 8/2000 | Suzuki |
| 6,107,997 A | 8/2000 | Ure |
| 6,111,563 A | 8/2000 | Hines |
| 6,115,028 A | 9/2000 | Balakrishnan et al. |
| 6,118,435 A | 9/2000 | Fujita et al. |
| 6,124,587 A | 9/2000 | Bidiville et al. |
| 6,125,285 A | 9/2000 | Chavez et al. |
| 6,128,003 A | 10/2000 | Smith et al. |
| 6,128,006 A | 10/2000 | Rosenberg et al. |
| 6,130,664 A | 10/2000 | Suzuki |
| 6,131,047 A | 10/2000 | Hayes et al. |
| 6,131,299 A | 10/2000 | Raab et al. |
| 6,135,958 A | 10/2000 | Mikula-Curtis et al. |
| 6,144,380 A | 11/2000 | Shwarts et al. |
| 6,163,312 A | 12/2000 | Furuya |
| 6,163,616 A | 12/2000 | Feldman |
| 6,166,721 A | 12/2000 | Kuroiwa et al. |
| 6,179,496 B1 | 1/2001 | Chou |
| 6,181,322 B1 | 1/2001 | Nanavati |
| 6,184,868 B1 | 2/2001 | Shahoian et al. |
| 6,188,389 B1 | 2/2001 | Yen |
| 6,188,391 B1 | 2/2001 | Seely et al. |
| 6,188,393 B1 | 2/2001 | Shu |
| 6,191,774 B1 | 2/2001 | Schena et al. |
| 6,198,473 B1 | 3/2001 | Armstrong |
| 6,198,515 B1 | 3/2001 | Cole |
| 6,208,329 B1 | 3/2001 | Ballare |
| 6,211,860 B1 | 4/2001 | Bunsen |
| 6,211,861 B1 | 4/2001 | Rosenberg et al. |
| 6,219,038 B1 | 4/2001 | Cho |
| 6,222,465 B1 | 4/2001 | Kumar et al. |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,232,957 B1 | 5/2001 | Hinckley |

(56) References Cited

U.S. PATENT DOCUMENTS

| | | |
|---|---|---|
| 6,239,790 B1 | 5/2001 | Martinelli et al. |
| D443,616 S | 6/2001 | Fisher et al. |
| 6,243,071 B1 | 6/2001 | Shwarts et al. |
| 6,243,078 B1 | 6/2001 | Rosenberg |
| 6,246,862 B1 | 6/2001 | Grivas et al. |
| 6,249,606 B1 | 6/2001 | Kiraly et al. |
| 6,256,011 B1 | 7/2001 | Culver |
| 6,262,716 B1 | 7/2001 | Raasch |
| 6,262,717 B1 | 7/2001 | Donohue et al. |
| 6,266,050 B1 | 7/2001 | Oh et al. |
| 6,288,707 B1 | 9/2001 | Philipp |
| 6,289,326 B1 | 9/2001 | Lafleur |
| 6,292,178 B1 | 9/2001 | Bernstein et al. |
| 6,297,795 B1 | 10/2001 | Kato et al. |
| 6,297,811 B1 | 10/2001 | Kent et al. |
| 6,310,610 B1 | 10/2001 | Beaton et al. |
| 6,313,828 B1 | 11/2001 | Chombo |
| 6,323,843 B2 | 11/2001 | Giles et al. |
| 6,323,845 B1 | 11/2001 | Robbins |
| 6,323,846 B1 | 11/2001 | Westerman et al. |
| 6,323,849 B1 | 11/2001 | He et al. |
| 6,327,011 B2 | 12/2001 | Kim |
| 6,333,734 B1 | 12/2001 | Rein |
| 6,337,678 B1 | 1/2002 | Fish |
| 6,337,919 B1 | 1/2002 | Dunton |
| 6,340,800 B1 | 1/2002 | Zhai et al. |
| 6,347,290 B1 | 2/2002 | Bartlett |
| D454,568 S | 3/2002 | Andre et al. |
| 6,356,287 B1 | 3/2002 | Ruberry et al. |
| 6,356,524 B2 | 3/2002 | Aratani |
| 6,362,811 B1 | 3/2002 | Edwards et al. |
| 6,369,797 B1 | 4/2002 | Maynard, Jr. |
| 6,373,470 B1 | 4/2002 | Andre et al. |
| 6,377,009 B1 | 4/2002 | Philipp |
| 6,377,530 B1 | 4/2002 | Burrows |
| 6,380,931 B1 | 4/2002 | Gillespie et al. |
| 6,384,743 B1 | 5/2002 | Vanderheiden |
| 6,392,632 B1 | 5/2002 | Lee |
| 6,392,634 B1 | 5/2002 | Bowers et al. |
| 6,392,636 B1 | 5/2002 | Ferrari et al. |
| 6,396,477 B1 | 5/2002 | Hinckley et al. |
| 6,411,287 B1 | 6/2002 | Scharff et al. |
| 6,413,233 B1 | 7/2002 | Sites et al. |
| 6,414,671 B1 | 7/2002 | Gillespie et al. |
| 6,421,234 B1 | 7/2002 | Ricks et al. |
| 6,429,846 B2 | 8/2002 | Rosenberg et al. |
| 6,429,852 B1 | 8/2002 | Adams et al. |
| 6,433,780 B1 | 8/2002 | Gordon et al. |
| 6,452,514 B1 | 9/2002 | Philipp |
| 6,456,275 B1 | 9/2002 | Hinckley et al. |
| 6,457,355 B1 | 10/2002 | Philipp |
| 6,466,036 B1 | 10/2002 | Philipp |
| 6,466,203 B2 | 10/2002 | Van |
| 6,469,693 B1 | 10/2002 | Chiang et al. |
| 6,489,947 B2 | 12/2002 | Hesley et al. |
| 6,492,979 B1 | 12/2002 | Kent et al. |
| 6,498,601 B1 | 12/2002 | Gujar et al. |
| 6,504,530 B1 | 1/2003 | Wilson et al. |
| 6,505,088 B1 | 1/2003 | Simkin et al. |
| 6,513,717 B2 | 2/2003 | Hannigan |
| 6,515,669 B1 | 2/2003 | Mohri |
| 6,525,749 B1 | 2/2003 | Moran et al. |
| 6,535,200 B2 | 3/2003 | Philipp |
| 6,543,684 B1 | 4/2003 | White et al. |
| 6,543,947 B2 | 4/2003 | Lee |
| 6,545,665 B2 | 4/2003 | Rodgers |
| 6,559,830 B1 | 5/2003 | Hinckley et al. |
| 6,559,831 B1 | 5/2003 | Armstrong |
| 6,567,073 B1 | 5/2003 | Levin |
| 6,570,557 B1 | 5/2003 | Westerman et al. |
| 6,587,091 B2 | 7/2003 | Serpa |
| 6,587,093 B1 | 7/2003 | Shaw et al. |
| 6,593,916 B1 | 7/2003 | Aroyan |
| 6,597,347 B1 | 7/2003 | Yasutake |
| 6,597,384 B1 | 7/2003 | Harrison |
| 6,610,936 B2 | 8/2003 | Gillespie et al. |
| 6,614,422 B1 | 9/2003 | Rafii et al. |
| 6,624,803 B1 | 9/2003 | Vanderheiden et al. |
| 6,624,833 B1 | 9/2003 | Kumar et al. |
| 6,636,197 B1 | 10/2003 | Goldenberg et al. |
| 6,639,577 B2 | 10/2003 | Eberhard |
| 6,639,584 B1 | 10/2003 | Li |
| 6,650,319 B1 | 11/2003 | Hurst et al. |
| 6,650,975 B2 | 11/2003 | Ruffner |
| 6,658,994 B1 | 12/2003 | Mcmillan |
| 6,661,410 B2 | 12/2003 | Casebolt et al. |
| 6,670,894 B2 | 12/2003 | Mehring |
| 6,677,927 B1 | 1/2004 | Bruck et al. |
| 6,677,932 B1 | 1/2004 | Westerman |
| 6,677,934 B1 | 1/2004 | Blanchard |
| 6,686,904 B1 | 2/2004 | Sherman et al. |
| 6,690,387 B2 | 2/2004 | Zimmerman et al. |
| 6,700,564 B2 | 3/2004 | Mcloone et al. |
| 6,703,550 B2 | 3/2004 | Chu |
| 6,703,599 B1 | 3/2004 | Casebolt et al. |
| 6,707,027 B2 | 3/2004 | Liess et al. |
| 6,717,569 B1 | 4/2004 | Gruhl et al. |
| 6,717,573 B1 | 4/2004 | Shahoian et al. |
| 6,724,366 B2 | 4/2004 | Crawford |
| 6,724,817 B1 | 4/2004 | Simpson et al. |
| 6,725,064 B1 | 4/2004 | Wakamatsu et al. |
| 6,727,889 B2 | 4/2004 | Shaw |
| 6,738,045 B2 | 5/2004 | Hinckley et al. |
| 6,740,860 B2 | 5/2004 | Kobayashi |
| 6,757,002 B1 | 6/2004 | Oross et al. |
| D493,157 S | 7/2004 | Yang |
| D493,158 S | 7/2004 | Yang |
| 6,762,751 B2 | 7/2004 | Kuan |
| 6,788,288 B2 | 9/2004 | Ano |
| 6,791,533 B2 | 9/2004 | Su |
| 6,792,398 B1 | 9/2004 | Handley et al. |
| 6,795,056 B2 | 9/2004 | Norskog et al. |
| 6,795,057 B2 | 9/2004 | Gordon |
| D497,606 S | 10/2004 | Yang |
| 6,803,906 B1 | 10/2004 | Morrison et al. |
| 6,816,149 B1 | 11/2004 | Alsleben |
| 6,816,150 B2 | 11/2004 | Casebolt et al. |
| 6,819,312 B2 | 11/2004 | Fish |
| 6,822,635 B2 | 11/2004 | Shahoian et al. |
| D500,298 S | 12/2004 | Yang |
| 6,828,958 B2 | 12/2004 | Davenport |
| 6,833,825 B1 | 12/2004 | Farag et al. |
| 6,834,195 B2 | 12/2004 | Brandenberg et al. |
| 6,834,373 B2 | 12/2004 | Dieberger |
| 6,842,672 B1 | 1/2005 | Straub et al. |
| 6,844,871 B1 | 1/2005 | Hinckley et al. |
| 6,844,872 B1 | 1/2005 | Farag et al. |
| 6,847,352 B2 | 1/2005 | Lantigua |
| 6,848,014 B2 | 1/2005 | Landron et al. |
| 6,853,850 B2 | 2/2005 | Shim et al. |
| 6,856,259 B1 | 2/2005 | Sharp |
| 6,865,718 B2 | 3/2005 | Levi Montalcini |
| 6,873,715 B2 | 3/2005 | Kuo et al. |
| 6,876,891 B1 | 4/2005 | Schuler et al. |
| 6,888,532 B2 | 5/2005 | Wong et al. |
| 6,888,536 B2 | 5/2005 | Westerman et al. |
| 6,900,795 B1 | 5/2005 | Knight, III et al. |
| 6,909,424 B2 | 6/2005 | Liebenow et al. |
| 6,924,789 B2 | 8/2005 | Bick |
| 6,927,761 B2 | 8/2005 | Badaye et al. |
| D509,819 S | 9/2005 | Yang |
| D509,833 S | 9/2005 | Yang |
| D510,081 S | 9/2005 | Yang |
| 6,942,571 B1 | 9/2005 | Mcallister et al. |
| 6,943,779 B2 | 9/2005 | Satoh |
| 6,950,094 B2 | 9/2005 | Gordon et al. |
| D511,512 S | 11/2005 | Yang |
| D511,528 S | 11/2005 | Yang |
| 6,965,375 B1 | 11/2005 | Gettemy et al. |
| D512,403 S | 12/2005 | Yang |
| D512,435 S | 12/2005 | Yang |
| 6,972,401 B2 | 12/2005 | Akitt et al. |
| 6,977,666 B1 | 12/2005 | Hedrick |
| 6,985,801 B1 | 1/2006 | Straub et al. |

(56) References Cited

U.S. PATENT DOCUMENTS

| | | | |
|---|---|---|---|
| 6,992,656 B2 | 1/2006 | Hughes | |
| 6,992,659 B2 | 1/2006 | Gettemy | |
| 6,995,744 B1 | 2/2006 | Moore et al. | |
| 7,013,228 B2 | 3/2006 | Ritt | |
| 7,015,894 B2 | 3/2006 | Morohoshi | |
| 7,031,228 B2 | 4/2006 | Born et al. | |
| 7,034,802 B1 | 4/2006 | Gettemy et al. | |
| D520,516 S | 5/2006 | Yang | |
| 7,046,230 B2 | 5/2006 | Zadesky et al. | |
| 7,051,291 B2 | 5/2006 | Sciammarella et al. | |
| 7,068,256 B1 | 6/2006 | Gettemy et al. | |
| 7,109,978 B2 | 9/2006 | Gillespie et al. | |
| 7,113,196 B2 | 9/2006 | Kerr | |
| 7,119,792 B1 | 10/2006 | Andre et al. | |
| 7,129,416 B1 | 10/2006 | Steinfeld et al. | |
| 7,142,193 B2 | 11/2006 | Hayama et al. | |
| 7,145,552 B2 | 12/2006 | Hollingsworth | |
| 7,164,412 B2 | 1/2007 | Kao | |
| 7,168,047 B1 | 1/2007 | Huppi | |
| 7,170,488 B2 | 1/2007 | Kehlstadt et al. | |
| 7,170,496 B2 | 1/2007 | Middleton | |
| 7,183,948 B2 | 2/2007 | Roberts | |
| 7,184,064 B2 | 2/2007 | Zimmerman et al. | |
| 7,191,024 B2 | 3/2007 | Kano | |
| 7,233,318 B1 | 6/2007 | Farag et al. | |
| 7,236,159 B1 | 6/2007 | Siversson | |
| 7,239,800 B2 | 7/2007 | Bilbrey | |
| 7,240,289 B2 | 7/2007 | Naughton et al. | |
| 7,312,981 B2 | 12/2007 | Carroll | |
| 7,336,260 B2 | 2/2008 | Martin et al. | |
| RE40,153 E | 3/2008 | Westerman et al. | |
| 7,366,995 B2 | 4/2008 | Montague | |
| 7,388,578 B2 | 6/2008 | Tao | |
| 7,423,636 B2 | 9/2008 | Sano et al. | |
| 7,452,098 B2 | 11/2008 | Kerr | |
| 7,453,439 B1 | 11/2008 | Kushler et al. | |
| 7,495,659 B2 | 2/2009 | Marriott et al. | |
| 7,499,039 B2 | 3/2009 | Roberts | |
| 7,499,040 B2 | 3/2009 | Zadesky et al. | |
| 7,505,785 B2 | 3/2009 | Callaghan et al. | |
| D592,665 S | 5/2009 | Andre et al. | |
| RE40,993 E | 11/2009 | Westerman | |
| 7,629,961 B2 | 12/2009 | Casebolt et al. | |
| 7,652,589 B2 | 1/2010 | Autor | |
| 7,663,607 B2 | 2/2010 | Hotelling et al. | |
| 7,683,889 B2 | 3/2010 | Rimas et al. | |
| 7,800,592 B2 | 9/2010 | Kerr et al. | |
| 7,808,479 B1 | 10/2010 | Hotelling et al. | |
| 7,932,893 B1 | 4/2011 | Berthaud | |
| 8,479,122 B2 | 7/2013 | Hotelling et al. | |
| 8,537,115 B2 | 9/2013 | Hotelling et al. | |
| 8,665,209 B2 | 3/2014 | Rimas-Ribikauskas et al. | |
| 8,704,769 B2 | 4/2014 | Hotelling et al. | |
| 8,704,770 B2 | 4/2014 | Hotelling et al. | |
| 9,047,009 B2 | 6/2015 | King et al. | |
| 9,335,868 B2 | 5/2016 | Hotelling et al. | |
| 9,785,258 B2 | 10/2017 | Hotelling et al. | |
| 9,794,397 B2 | 10/2017 | Min et al. | |
| 9,983,742 B2 | 5/2018 | King et al. | |
| 10,156,914 B2 | 12/2018 | Hotelling et al. | |
| 2001/0011991 A1 | 8/2001 | Wang et al. | |
| 2001/0011995 A1 | 8/2001 | Hinckley et al. | |
| 2001/0035854 A1 | 11/2001 | Rosenberg et al. | |
| 2001/0043189 A1 | 11/2001 | Brisebois et al. | |
| 2001/0043545 A1 | 11/2001 | Aratani | |
| 2001/0050673 A1 | 12/2001 | Davenport | |
| 2001/0051046 A1 | 12/2001 | Watanabe et al. | |
| 2002/0008691 A1 | 1/2002 | Hanajima et al. | |
| 2002/0015024 A1 | 2/2002 | Westerman et al. | |
| 2002/0033795 A1 | 3/2002 | Shahoian et al. | |
| 2002/0033848 A1 | 3/2002 | Sciammarella et al. | |
| 2002/0063688 A1 | 5/2002 | Shaw et al. | |
| 2002/0067334 A1 | 6/2002 | Hinckley et al. | |
| 2002/0084986 A1 | 7/2002 | Armstrong | |
| 2002/0089545 A1 | 7/2002 | Levi Montalcini | |
| 2002/0093487 A1 | 7/2002 | Rosenberg | |
| 2002/0093492 A1 | 7/2002 | Baron | |
| 2002/0118169 A1 | 8/2002 | Hinckley et al. | |
| 2002/0118174 A1 | 8/2002 | Rodgers | |
| 2002/0118848 A1 | 8/2002 | Karpenstein | |
| 2002/0130839 A1 | 9/2002 | Wallace et al. | |
| 2002/0130841 A1 | 9/2002 | Scott | |
| 2002/0140676 A1 | 10/2002 | Kao | |
| 2002/0154090 A1 | 10/2002 | Lin | |
| 2002/0158838 A1 | 10/2002 | Smith et al. | |
| 2002/0164156 A1 | 11/2002 | Bilbrey | |
| 2002/0180763 A1 | 12/2002 | Kung | |
| 2002/0190975 A1 | 12/2002 | Kerr | |
| 2003/0002246 A1 | 1/2003 | Kerr | |
| 2003/0006974 A1 | 1/2003 | Clough et al. | |
| 2003/0011574 A1* | 1/2003 | Goodman | G06F 3/0237 345/172 |
| 2003/0025735 A1 | 2/2003 | Polgar et al. | |
| 2003/0038776 A1 | 2/2003 | Rosenberg et al. | |
| 2003/0043121 A1 | 3/2003 | Chen | |
| 2003/0043174 A1 | 3/2003 | Hinckley et al. | |
| 2003/0048260 A1 | 3/2003 | Matusis | |
| 2003/0050092 A1 | 3/2003 | Yun | |
| 2003/0063072 A1 | 4/2003 | Brandenberg et al. | |
| 2003/0074977 A1 | 4/2003 | Doemens et al. | |
| 2003/0076301 A1 | 4/2003 | Tsuk et al. | |
| 2003/0076303 A1 | 4/2003 | Huppi | |
| 2003/0076306 A1 | 4/2003 | Zadesky et al. | |
| 2003/0085870 A1 | 5/2003 | Hinckley | |
| 2003/0085882 A1 | 5/2003 | Lu | |
| 2003/0095095 A1 | 5/2003 | Pihlaja | |
| 2003/0095096 A1 | 5/2003 | Robbin et al. | |
| 2003/0098851 A1 | 5/2003 | Brink | |
| 2003/0098858 A1 | 5/2003 | Perski et al. | |
| 2003/0107551 A1 | 6/2003 | Dunker | |
| 2003/0107552 A1 | 6/2003 | Lu | |
| 2003/0107607 A1 | 6/2003 | Nguyen | |
| 2003/0117377 A1 | 6/2003 | Horie et al. | |
| 2003/0122779 A1 | 7/2003 | Martin et al. | |
| 2003/0142855 A1 | 7/2003 | Kuo et al. | |
| 2003/0156098 A1 | 8/2003 | Shaw et al. | |
| 2003/0179223 A1 | 9/2003 | Ying et al. | |
| 2003/0184517 A1 | 10/2003 | Senzui et al. | |
| 2003/0184520 A1 | 10/2003 | Wei | |
| 2003/0206162 A1 | 11/2003 | Roberts | |
| 2003/0206202 A1 | 11/2003 | Moriya | |
| 2003/0210286 A1 | 11/2003 | Gerpheide et al. | |
| 2003/0222848 A1 | 12/2003 | Solomon et al. | |
| 2003/0222858 A1 | 12/2003 | Kobayashi | |
| 2003/0234768 A1 | 12/2003 | Rekimoto et al. | |
| 2004/0003947 A1 | 1/2004 | Kesselman et al. | |
| 2004/0012572 A1 | 1/2004 | Sowden et al. | |
| 2004/0021643 A1 | 2/2004 | Hoshino et al. | |
| 2004/0021681 A1 | 2/2004 | Liao | |
| 2004/0046739 A1 | 3/2004 | Gettemy | |
| 2004/0046741 A1 | 3/2004 | Low et al. | |
| 2004/0075676 A1 | 4/2004 | Rosenberg et al. | |
| 2004/0099131 A1 | 5/2004 | Ludwig | |
| 2004/0109013 A1 | 6/2004 | Goertz | |
| 2004/0125086 A1 | 7/2004 | Hagermoser et al. | |
| 2004/0130526 A1 | 7/2004 | Rosenberg | |
| 2004/0138569 A1 | 7/2004 | Grunwald et al. | |
| 2004/0139348 A1 | 7/2004 | Norris | |
| 2004/0156192 A1 | 8/2004 | Kerr et al. | |
| 2004/0212586 A1 | 10/2004 | Denny | |
| 2004/0222979 A1 | 11/2004 | Knighton | |
| 2004/0227736 A1 | 11/2004 | Kamrath et al. | |
| 2004/0239622 A1 | 12/2004 | Proctor et al. | |
| 2004/0242269 A1 | 12/2004 | Fadell | |
| 2004/0242295 A1 | 12/2004 | Ghaly | |
| 2004/0246231 A1 | 12/2004 | Large | |
| 2004/0252109 A1 | 12/2004 | Trent et al. | |
| 2004/0263483 A1 | 12/2004 | Aufderheide | |
| 2004/0263484 A1 | 12/2004 | Mantysalo et al. | |
| 2005/0012723 A1 | 1/2005 | Pallakoff | |
| 2005/0030278 A1 | 2/2005 | Fu | |
| 2005/0035951 A1 | 2/2005 | Bjorkengren | |
| 2005/0035955 A1 | 2/2005 | Carter et al. | |
| 2005/0043060 A1 | 2/2005 | Brandenberg et al. | |

(56) References Cited

U.S. PATENT DOCUMENTS

| | | |
|---|---|---|
| 2005/0048955 A1 | 3/2005 | Ring |
| 2005/0052425 A1 | 3/2005 | Zadesky et al. |
| 2005/0057524 A1 | 3/2005 | Hill et al. |
| 2005/0068322 A1 | 3/2005 | Falcioni |
| 2005/0084138 A1 | 4/2005 | Inkster et al. |
| 2005/0104867 A1 | 5/2005 | Westerman et al. |
| 2005/0110767 A1 | 5/2005 | Gomes et al. |
| 2005/0110768 A1 | 5/2005 | Marriott et al. |
| 2005/0115816 A1 | 6/2005 | Gelfond et al. |
| 2005/0135053 A1 | 6/2005 | Carroll |
| 2005/0146509 A1 | 7/2005 | Geaghan et al. |
| 2005/0146513 A1 | 7/2005 | Hill et al. |
| 2005/0154798 A1 | 7/2005 | Nurmi |
| 2005/0168488 A1 | 8/2005 | Montague |
| 2005/0183035 A1 | 8/2005 | Ringel et al. |
| 2005/0190158 A1 | 9/2005 | Casebolt et al. |
| 2005/0212760 A1 | 9/2005 | Marvit et al. |
| 2005/0219228 A1 | 10/2005 | Alameh et al. |
| 2005/0228320 A1 | 10/2005 | Klinghult |
| 2005/0253818 A1 | 11/2005 | Nettamo |
| 2005/0259077 A1 | 11/2005 | Adams et al. |
| 2005/0264540 A1 | 12/2005 | Niwa |
| 2005/0275637 A1 | 12/2005 | Hinckley et al. |
| 2006/0010400 A1 | 1/2006 | Dehlin et al. |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0033724 A1 | 2/2006 | Chaudhri et al. |
| 2006/0044259 A1 | 3/2006 | Hotelling et al. |
| 2006/0050011 A1 | 3/2006 | Kamio |
| 2006/0053387 A1 | 3/2006 | Ording |
| 2006/0066582 A1 | 3/2006 | Lyon et al. |
| 2006/0073272 A1 | 4/2006 | Carel |
| 2006/0079969 A1 | 4/2006 | Seguin |
| 2006/0085757 A1 | 4/2006 | Andre et al. |
| 2006/0097991 A1 | 5/2006 | Hotelling et al. |
| 2006/0109252 A1 | 5/2006 | Kolmykov-zotov et al. |
| 2006/0109256 A1 | 5/2006 | Grant et al. |
| 2006/0146036 A1 | 7/2006 | Prados et al. |
| 2006/0181517 A1 | 8/2006 | Zadesky et al. |
| 2006/0181518 A1 | 8/2006 | Shen et al. |
| 2006/0183505 A1 | 8/2006 | Willrich |
| 2006/0197750 A1 | 9/2006 | Kerr et al. |
| 2006/0197753 A1 | 9/2006 | Hotelling |
| 2006/0232567 A1 | 10/2006 | Westerman et al. |
| 2006/0238517 A1 | 10/2006 | King et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2006/0244733 A1 | 11/2006 | Geaghan |
| 2006/0250357 A1 | 11/2006 | Safai |
| 2006/0267934 A1 | 11/2006 | Harley et al. |
| 2006/0267953 A1 | 11/2006 | Peterson et al. |
| 2006/0279548 A1 | 12/2006 | Geaghan |
| 2006/0284855 A1 | 12/2006 | Shintome |
| 2007/0043725 A1 | 2/2007 | Hotelling et al. |
| 2007/0046646 A1 | 3/2007 | Kwon et al. |
| 2007/0063923 A1 | 3/2007 | Koenig |
| 2007/0075968 A1 | 4/2007 | Hall et al. |
| 2007/0136064 A1 | 6/2007 | Carroll |
| 2007/0229464 A1 | 10/2007 | Hotelling et al. |
| 2007/0236466 A1 | 10/2007 | Hotelling |
| 2007/0247429 A1 | 10/2007 | Westerman |
| 2007/0257890 A1 | 11/2007 | Hotelling et al. |
| 2008/0012835 A1 | 1/2008 | Rimon et al. |
| 2008/0012838 A1 | 1/2008 | Rimon |
| 2008/0088602 A1 | 4/2008 | Hotelling |
| 2008/0158172 A1 | 7/2008 | Hotelling et al. |
| 2008/0211772 A1 | 9/2008 | Loucks |
| 2008/0238879 A1 | 10/2008 | Jaeger et al. |
| 2008/0266257 A1 | 10/2008 | Chiang |
| 2008/0278450 A1 | 11/2008 | Lashina |
| 2008/0297476 A1 | 12/2008 | Hotelling et al. |
| 2008/0297477 A1 | 12/2008 | Hotelling et al. |
| 2008/0297478 A1 | 12/2008 | Hotelling et al. |
| 2009/0059730 A1 | 3/2009 | Lyons et al. |
| 2009/0066670 A1 | 3/2009 | Hotelling et al. |
| 2009/0085894 A1 | 4/2009 | Gandhi et al. |
| 2009/0096757 A1 | 4/2009 | Hotelling et al. |
| 2009/0096758 A1 | 4/2009 | Hotelling et al. |
| 2009/0236648 A1 | 9/2009 | Maeda et al. |
| 2009/0295738 A1 | 12/2009 | Chiang |
| 2009/0295753 A1 | 12/2009 | King et al. |
| 2010/0026656 A1 | 2/2010 | Hotelling et al. |
| 2010/0112964 A1 | 5/2010 | Yi et al. |
| 2010/0164878 A1 | 7/2010 | Bestle et al. |
| 2011/0012835 A1 | 1/2011 | Hotelling et al. |
| 2012/0075238 A1 | 3/2012 | Minami et al. |
| 2012/0099406 A1 | 4/2012 | Lau et al. |
| 2012/0299859 A1 | 11/2012 | Kinoshita |
| 2014/0171156 A1 | 6/2014 | Pattikonda et al. |
| 2014/0375577 A1 | 12/2014 | Yeh et al. |
| 2015/0002440 A1 | 1/2015 | Huang et al. |
| 2015/0062050 A1 | 3/2015 | Zadesky et al. |
| 2015/0091790 A1 | 4/2015 | Forutanpour et al. |
| 2015/0111558 A1 | 4/2015 | Yang |
| 2015/0153895 A1 | 6/2015 | Hotelling |
| 2015/0186092 A1 | 7/2015 | Francis et al. |
| 2015/0261310 A1 | 9/2015 | Walmsley et al. |
| 2015/0261362 A1 | 9/2015 | King et al. |
| 2015/0346026 A1 | 12/2015 | Maass et al. |
| 2016/0070399 A1 | 3/2016 | Hotelling |
| 2016/0197753 A1 | 7/2016 | Hwang et al. |
| 2017/0068352 A1 | 3/2017 | Blondin et al. |
| 2017/0336964 A1 | 11/2017 | Kim et al. |
| 2018/0032158 A1 | 2/2018 | Hotelling et al. |
| 2018/0059809 A1 | 3/2018 | Mcclendon et al. |
| 2018/0067639 A1 | 3/2018 | Balaram |
| 2018/0217709 A1 | 8/2018 | Hotelling |
| 2018/0253172 A1 | 9/2018 | King et al. |
| 2019/0041991 A1 | 2/2019 | Hotelling et al. |
| 2019/0113988 A1 | 4/2019 | Hotelling et al. |
| 2019/0258395 A1 | 8/2019 | Balaram |
| 2019/0354215 A1 | 11/2019 | King et al. |

FOREIGN PATENT DOCUMENTS

| | | |
|---|---|---|
| CN | 1343330 A | 4/2002 |
| CN | 1397870 A | 2/2003 |
| CN | 1529869 A | 9/2004 |
| CN | 1588432 A | 3/2005 |
| CN | 1720499 A | 1/2006 |
| CN | 1737827 A | 2/2006 |
| CN | 1942853 A | 4/2007 |
| DE | 4125049 A1 | 1/1992 |
| DE | 19722636 A1 | 12/1998 |
| DE | 10022537 A1 | 11/2000 |
| DE | 10201193 A1 | 7/2003 |
| DE | 10251296 A1 | 5/2004 |
| EP | 0288692 A2 | 11/1988 |
| EP | 0464908 A2 | 1/1992 |
| EP | 0498540 A2 | 8/1992 |
| EP | 0288692 B1 | 7/1993 |
| EP | 0653725 A2 | 5/1995 |
| EP | 0664504 A2 | 7/1995 |
| EP | 0464908 B1 | 9/1996 |
| EP | 0768619 A1 | 4/1997 |
| EP | 0795837 A1 | 9/1997 |
| EP | 0880091 A2 | 11/1998 |
| EP | 1026713 A1 | 8/2000 |
| EP | 1014295 A3 | 1/2002 |
| EP | 1241557 A2 | 9/2002 |
| EP | 1241558 A2 | 9/2002 |
| EP | 1505484 A1 | 2/2005 |
| EP | 1571537 A1 | 9/2005 |
| EP | 0899650 B1 | 6/2011 |
| GB | 2380583 A | 4/2003 |
| GB | 2393688 A | 4/2004 |
| GB | 2393688 B | 1/2006 |

(56) References Cited

FOREIGN PATENT DOCUMENTS

| | | |
|---|---|---|
| JP | 63106826 A | 5/1988 |
| JP | S63257824 A | 10/1988 |
| JP | S63292774 A | 11/1988 |
| JP | H03237520 A | 10/1991 |
| JP | H0764725 A | 3/1995 |
| JP | H07160396 A | 6/1995 |
| JP | H07182101 A | 7/1995 |
| JP | H07319001 A | 12/1995 |
| JP | H08161138 A | 6/1996 |
| JP | H08166866 A | 6/1996 |
| JP | H08211992 A | 8/1996 |
| JP | H096525 A | 1/1997 |
| JP | H09244810 A | 9/1997 |
| JP | H09305262 A | 11/1997 |
| JP | H10228350 A | 8/1998 |
| JP | H10326149 A | 12/1998 |
| JP | H11143606 A | 5/1999 |
| JP | H11194863 A | 7/1999 |
| JP | H11194872 A | 7/1999 |
| JP | H11194883 A | 7/1999 |
| JP | H11215217 A | 8/1999 |
| JP | 2000163031 A | 6/2000 |
| JP | 2000215549 A | 8/2000 |
| JP | 2000242424 A | 9/2000 |
| JP | 2000242428 A | 9/2000 |
| JP | 2000293289 A | 10/2000 |
| JP | 2000330946 A | 11/2000 |
| JP | 2001051790 A | 2/2001 |
| JP | 2001356878 A | 12/2001 |
| JP | 2002501271 A | 1/2002 |
| JP | 2002062972 A | 2/2002 |
| JP | 2002185630 A | 6/2002 |
| JP | 2002229719 A | 8/2002 |
| JP | 2002342033 A | 11/2002 |
| JP | 2002342034 A | 11/2002 |
| JP | 2003058316 A | 2/2003 |
| JP | 2003122506 A | 4/2003 |
| JP | 2003241872 A | 8/2003 |
| JP | 2003271309 A | 9/2003 |
| JP | 2003280807 A | 10/2003 |
| JP | 2003330611 A | 11/2003 |
| JP | 2004021933 A | 1/2004 |
| JP | 2004070920 A | 3/2004 |
| JP | 2004177993 A | 6/2004 |
| JP | 2004226715 A | 8/2004 |
| JP | 2004527847 | 9/2004 |
| JP | 2004340991 A | 12/2004 |
| JP | 2005006259 A | 1/2005 |
| JP | 2005346244 A | 12/2005 |
| KR | 20010047975 A | 6/2001 |
| KR | 20020016080 A | 3/2002 |
| TW | 431607 U | 4/2001 |
| WO | 9005972 A1 | 5/1990 |
| WO | 9210823 A1 | 6/1992 |
| WO | 9417494 A2 | 8/1994 |
| WO | 9718547 A1 | 5/1997 |
| WO | 9723738 A1 | 7/1997 |
| WO | 9814863 A2 | 4/1998 |
| WO | 9926330 A1 | 5/1999 |
| WO | 9938149 A1 | 7/1999 |
| WO | 9949443 A2 | 9/1999 |
| WO | 0039907 A1 | 7/2000 |
| WO | 0055716 A1 | 9/2000 |
| WO | 0235461 A1 | 5/2002 |
| WO | 02052494 A2 | 7/2002 |
| WO | 03007227 A2 | 1/2003 |
| WO | 03001576 A3 | 4/2003 |
| WO | 03065192 A1 | 8/2003 |
| WO | 03077110 A2 | 9/2003 |
| WO | 03088176 A1 | 10/2003 |
| WO | 2004111816 A2 | 12/2004 |
| WO | 2005052773 A2 | 6/2005 |
| WO | 2006020305 A2 | 2/2006 |
| WO | 2006023569 A1 | 3/2006 |
| WO | 2004111816 A3 | 4/2006 |
| WO | 2006094308 A2 | 9/2006 |
| WO | 2006096501 A1 | 9/2006 |
| WO | 2006094308 A3 | 12/2006 |
| WO | 2006132817 A2 | 12/2006 |
| WO | 2006132817 A3 | 8/2007 |
| WO | 2007103631 A2 | 9/2007 |
| WO | 2007103631 A3 | 11/2008 |
| WO | 2010014560 A1 | 2/2010 |

OTHER PUBLICATIONS

5-Wire Resistive Touchscreens, Available online at: <http://www.touchscreens.com/intro-touchtypes-resistive.html>, Accessed on Aug. 5, 2005.

A Brief Overview of Gesture Recognition, Available online at: <http://www.dai.ed.ac.uk/Cvonline/LOCA_COPIES/COHEN/gesture_overview.html>, Accessed on Apr. 20, 2004.

About Quicktip, Available online at: <www.logicad3d.com/docs/qt.html>, Accessed on Apr. 8, 2002, 2 pages.

Advisory Action received for U.S. Appl. No. 10/654,108, dated Apr. 17, 2007, 3 pages.

Advisory Action received for U.S. Appl. No. 10/654,108, dated Apr. 20, 2009, 3 pages.

Advisory Action received for U.S. Appl. No. 10/654,108, dated Feb. 12, 2008, 3 pages.

Advisory Action received for U.S. Appl. No. 10/654,108, dated Mar. 25, 2010, 3 pages.

Advisory Action received for U.S. Appl. No. 11/204,873, dated Jun. 17, 2009, 3 pages.

Advisory Action received for U.S. Appl. No. 11/204,873, dated Mar. 3, 2017, 7 pages.

Advisory Action received for U.S. Appl. No. 11/204,873, dated Sep. 17, 2018, 4 pages.

Advisory Action received for U.S. Appl. No. 11/367,749, dated Aug. 25, 2010, 3 pages.

Advisory Action received for U.S. Appl. No. 11/966,948, dated Sep. 23, 2016, 3 pages.

Advisory Action received for U.S. Appl. No. 12/184,190, dated Feb. 25, 2013, 5 pages.

Advisory Action received for U.S. Appl. No. 12/189,030, dated Nov. 8, 2013, 3 pages.

Advisory Action received for U.S. Appl. No. 12/189,030, dated Nov. 12, 2013, 3 pages.

Apple Unveils Optical Mouse and New Pro Keyboard, Available online at: http://www.apple.com/pr/library/2000/jul/19mousekeyboard.html, Jul. 19, 2000, 2 pages.

Capacitive Position Sensing, Available online at: <http://www.synaptics.com/technology/cps.cfm>, Accessed on Aug. 5, 2005.

Capacitive Touchscreens, Available online at: <http://www.touchscreens.com/intro-touchtypes-capacitive.html>, Accessed on Aug. 5, 2005.

Comparing Touch Technologies, Available online at: <http://www.touchscreens.com/intro-touchtypes.html>, Accessed on Oct. 10, 2004.

EPO Form 1507 received for European Patent Application No. 02761784.4, dated Nov. 19, 2004, 6 pages.

Examination Report received for European Patent Application No. 06737515.4, dated Apr. 21, 2008, 5 pages.

Examiner's Answer to Appeal Brief received for U.S. Appl. No. 11/204,873, dated Mar. 29, 2013, 22 pages.

Examiner's Answer to Appeal Brief received for U.S. Appl. No. 11/367,749, dated Mar. 15, 2019, 5 pages.

Examiner's Answer to Appeal Brief received for U.S. Appl. No. 12/184,190, dated Aug. 16, 2013, 6 pages.

Examiner's Answer to Appeal Brief received for U.S. Appl. No. 12/189,030, dated May 30, 2014, 10 pages.

Extended Search Report received for European Patent Application No. 09170572.3, dated Nov. 7, 2013, 8 pages.

Final Office Action received for U.S. Appl. No. 10/654,108, dated Feb. 2, 2007, 17 pages.

Final Office Action received for U.S. Appl. No. 10/654,108, dated Feb. 18, 2009, 13 pages.

Final Office Action received for U.S. Appl. No. 10/654,108, dated Jan. 19, 2010, 16 pages.

(56) References Cited

OTHER PUBLICATIONS

Final Office Action received for U.S. Appl. No. 10/654,108, dated Nov. 16, 2007, 13 pages.
Final Office Action received for U.S. Appl. No. 11/115,539, dated Nov. 21, 2008, 24 pages.
Final Office Action received for U.S. Appl. No. 11/115,539, dated Oct. 14, 2009, 11 pages.
Final Office Action received for U.S. Appl. No. 11/204,873, dated Apr. 11, 2018, 29 pages.
Final Office Action received for U.S. Appl. No. 11/204,873, dated Apr. 28, 2009, 19 pages.
Final Office Action received for U.S. Appl. No. 11/204,873, dated Aug. 13, 2012, 22 pages.
Final Office Action received for U.S. Appl. No. 11/204,873, dated Jan. 15, 2010, 24 pages.
Final Office Action received for U.S. Appl. No. 11/204,873, dated Jun. 20, 2011, 17 pages.
Final Office Action received for U.S. Appl. No. 11/204,873, dated Sep. 7, 2016, 25 pages.
Final Office Action received for U.S. Appl. No. 11/204,873, dated Sep. 20, 2010, 15 pages.
Final Office Action received for U.S. Appl. No. 11/367,749, dated Aug. 25, 2009, 13 pages.
Final Office Action received for U.S. Appl. No. 11/367,749, dated Jan. 8, 2016, 11 pages.
Final Office Action received for U.S. Appl. No. 11/367,749, dated Jan. 17, 2014, 13 pages.
Final Office Action received for U.S. Appl. No. 11/367,749, dated Jul. 14, 2017, 11 pages.
Final Office Action received for U.S. Appl. No. 11/367,749, dated Jun. 30, 2010, 10 pages.
Final Office Action received for U.S. Appl. No. 11/367,749, dated Mar. 16, 2018, 13 pages.
Final Office Action received for U.S. Appl. No. 11/966,948, dated Jul. 13, 2011, 10 pages.
Final Office Action received for U.S. Appl. No. 11/966,948, dated Mar. 10, 2016, 15 pages.
Final Office Action received for U.S. Appl. No. 11/966,948, dated Oct. 9, 2014, 11 pages.
Final Office Action received for U.S. Appl. No. 12/184,190, dated Nov. 8, 2012, 21 pages.
Final Office Action received for U.S. Appl. No. 12/188,948, dated Dec. 7, 2011, 13 pages.
Final Office Action received for U.S. Appl. No. 12/188,988, dated Dec. 8, 2011, 15 pages.
Final Office Action received for U.S. Appl. No. 12/189,030, dated Jun. 20, 2013, 17 pages.
Final Office Action received for U.S. Appl. No. 12/189,030, dated Oct. 14, 2011, 15 pages.
Final Office Action received for U.S. Appl. No. 12/486,710, dated Jan. 2, 2014, 30 pages.
Final Office Action received for U.S. Appl. No. 12/486,710, dated Jul. 1, 2011, 20 pages.
Final Office Action received for U.S. Appl. No. 12/486,710, dated Sep. 4, 2012, 25 pages.
Final Office Action received for U.S. Appl. No. 12/890,437, dated Apr. 19, 2011, 20 pages.
Final Office Action received for U.S. Appl. No. 14/535,101, dated Apr. 28, 2017, 9 pages.
Final Office Action received for U.S. Appl. No. 14/535,101, dated Feb. 4, 2016, 7 pages.
Final Office Action received for U.S. Appl. No. 14/535,101, dated May 18, 2018, 10 pages.
Final Office Action received for U.S. Appl. No. 14/595,032, dated Aug. 3, 2015, 10 pages.
Final Office Action received for U.S. Appl. No. 14/595,032, dated Feb. 15, 2017, 10 pages.
Final Office Action received for U.S. Appl. No. 14/724,753, dated Nov. 25, 2016, 16 pages.
Final Office Action received for U.S. Appl. No. 14/940,010, dated Aug. 23, 2016, 12 pages.
Final Office Action received for U.S. Appl. No. 14/940,010, dated Feb. 2, 2018, 14 pages.
Final Office Action received for U.S. Appl. No. 14/940,010, dated Feb. 26, 2019, 12 pages.
Final Office Action received for U.S. Appl. No. 15/933,196, dated Oct. 31, 2019, 10 pages.
Final Office Action received for U.S. Appl. No. 16/155,508, dated Oct. 11, 2019, 17 pages.
FingerWorks—Gesture Guide—Application Switching, Available online at: <http://www.fingerworks.com/gesture_guide_apps.html>, Accessed on Aug. 27, 2004, 1 page.
FingerWorks—Gesture Guide—Editing, Available online at: <http://www.fingerworks.com/gesure_guide_editing.html> Feb. 13, 2004, Accessed on Aug. 27, 2004, 1 page.
FingerWorks—Gesture Guide—File Operations, Available online at: <http://www.fingerworks.com/gesture_guide_files.html> Jun. 18, 2004, Accessed on Aug. 27, 2004, 1 page.
FingerWorks—Gesture Guide—Text Manipulation, Available online at: <http://www.fingerworks.com/gesture_guide_text_manip.html> Jun. 6, 2004, Accessed on Aug. 27, 2004, 2 pages.
FingerWorks—Gesture Guide—Tips and Tricks, Available online at: <http://www.fingerworks.com/gesture_guide_tips.html>, Accessed on Aug. 27, 2004, 1 page.
FingerWorks—Gesture Guide—Web, Available online at: <http://www.fingerworks.com/gesture_guide_web.html> Jun. 5, 2004, Accessed on Aug. 27, 2004, 1 page.
FingerWorks—Guide to Hand Gestures for USB Touchpads, Available online at: <http://www.fingerworks.com/igesture_userguide.html>, Accessed on Aug. 27, 2004, 1 page.
FingerWorks—iGesture—Technical Details, Available online at: <http://www.fingerworks.com/igesture_tech.html>, Accessed on Aug. 27, 2004, 1 page.
FingerWorks—The Only Touchpads with Ergonomic Full-Hand Resting and Relaxation!, Available online at: <http://www.fingerworks.com/resting.html>, 2001, 1 page.
FingerWorks—Tips for Typing on the Mini, Available online at: <http://www.fingerworks.com/mini_typing.html> Jun. 5, 2004, Accessed on Aug. 27, 2004, 2 pages.
Gesture Recognition, Available online at: <http://www.fingerworks.com/gesture_recognition.html>, downloaded on Aug. 30, 2005, 2 pages.
Glidepoint, Available online at: <http://www.cirque.com/technology/technology_gp.html>, Accessed on Aug. 5, 2005.
How Do Touchscreen Monitors Know Where You're Touching?, Available online at: <http://electronics.howstuffworks.com/question716.html>, Jul. 7, 2008, 2 pages.
How Does a Touchscreen Work?, Available online at: <http://www.touchscreens.com/intro-anatomy.html>, Accessed on Aug. 5, 2005.
IGesture Pad-the MultiFinger USB TouchPad with Whole-Hand Gestures, Available online at: <http://www.fingerworks.com/igesture.html>, Accessed on Aug. 27, 2004, 2 pages.
IGesture Products for Everyone (learn in minutes) Product Overview, Available online at: <FingerWorks.com>, Accessed on Aug. 30, 2005.
Infrared Touchscreens, Available online at: <http://www.touchscreens.com/intro-touchtypes-infrared.html>, Accessed on Aug. 5, 2005.
Intention to Grant received for European Patent Application No. 16186726.2, dated Jan. 24, 2020, 7 pages.
International Search Report and Written Opinion received for PCT Patent Application No. PCT/US2006/007585, dated Jul. 25, 2006, 9 pages.
International Search Report received for PCT Patent Application No. PCT/US2005/003325, dated Mar. 3, 2006.
International Search Report received for PCT Patent Application No. PCT/US2006/008349, dated Oct. 6, 2006, 3 pages.
International Search Report received for PCT Patent Application No. PCT/US2006/020341, dated Jun. 12, 2007, 7 pages.
International Search Report received for PCT Patent Application No. PCT/US2007/062474, dated Jan. 3, 2008, 3 pages.
International Search Report received for PCT Patent Application No. PCT/US2009/051874, dated Nov. 27, 2009, 3 pages.

(56) References Cited

OTHER PUBLICATIONS

IRiver Clix Quick Start Guide, 2 pages.
IRiver Clix User Guide, 1999-2006, 38 pages.
Letter Restarting Period for Response received for U.S. Appl. No. 12/189,030, dated May 26, 2011, 16 pages.
Mouse Emulation, FingerWorks, Available online at: <http://www.fingerworks.com/gesture_guide_mouse.html> Dec. 10, 2002, Accessed on Aug. 30, 2005.
Mouse Gestures, Optim oz, May 21, 2004.
Mouse Gestures in Opera, Available online at: <http://www.opera.com/products/desktop/xmouse/index.dml>, Accessed on Aug. 30, 2005.
MultiTouch Overview, FingerWorks, Available online at: <http://www.fingerworks.com/multoverview.html>, Accessed on Aug. 30, 2005.
Near Field Imaging Touchscreens, Available online at: <http://www.touchscreens.com/intro-touchtypes-nfi.html>, Accessed on Aug. 5, 2005.
Neuros MP3 Digital Audio Computer, Available online at: <www.neurosaudio.com>, Accessed on Apr. 9, 2003., 1 page.
Non-Final Office Action received for U.S. Appl. No. 10/654,108, dated Jul. 6, 2007, 14 pages.
Non-Final Office Action received for U.S. Appl. No. 10/654,108, dated Jul. 14, 2009, 17 pages.
Non-Final Office Action received for U.S. Appl. No. 10/654,108, dated Jun. 16, 2006, 8 pages.
Non-Final Office Action received for U.S. Appl. No. 10/654,108, dated Oct. 28, 2008, 11 pages.
Non-Final Office Action received for U.S. Appl. No. 11/115,539, dated Apr. 6, 2009, 32 pages.
Non-Final Office Action received for U.S. Appl. No. 11/115,539, dated Jan. 15, 2010, 11 pages.
Non-Final Office Action received for U.S. Appl. No. 11/115,539, dated Jul. 2, 2008, 19 pages.
Non-Final Office Action received for U.S. Appl. No. 11/204,873, dated Apr. 6, 2016, 33 pages.
Non-Final Office Action received for U.S. Appl. No. 11/204,873, dated Aug. 9, 2017, 27 pages.
Non-Final Office Action received for U.S. Appl. No. 11/204,873, dated Feb. 28, 2011, 16 pages.
Non-Final Office Action received for U.S. Appl. No. 11/204,873, dated Mar. 8, 2012, 21 pages.
Non-Final Office Action received for U.S. Appl. No. 11/204,873, dated May 20, 2010, 14 pages.
Non-Final Office Action received for U.S. Appl. No. 11/204,873, dated Nov. 13, 2008, 11 pages.
Non-Final Office Action received for U.S. Appl. No. 11/204,873, dated Sep. 30, 2009, 21 pages.
Non-Final Office Action received for U.S. Appl. No. 11/367,749, dated Feb. 26, 2009, 11 pages.
Non-Final Office Action received for U.S. Appl. No. 11/367,749, dated Jan. 12, 2010, 9 pages.
Non-Final Office Action received for U.S. Appl. No. 11/367,749, dated Jul. 5, 2013, 9 pages.
Non-Final Office Action received for U.S. Appl. No. 11/367,749, dated May 14, 2015, 14 pages.
Non-Final Office Action received for U.S. Appl. No. 11/367,749, dated Nov. 10, 2016, 10 pages.
Non-Final Office Action received for U.S. Appl. No. 11/426,078, dated Apr. 2, 2009, 22 pages.
Non-Final Office Action received for U.S. Appl. No. 11/966,948, dated Apr. 6, 2017, 14 pages.
Non-Final Office Action received for U.S. Appl. No. 11/966,948, dated Aug. 26, 2015, 10 pages.
Non-Final Office Action received for U.S. Appl. No. 11/966,948, dated Feb. 27, 2014, 11 pages.
Non-Final Office Action received for U.S. Appl. No. 11/966,948, dated Jan. 28, 2011, 12 pages.
Non-Final Office Action received for U.S. Appl. No. 12/184,190, dated Dec. 2, 2011, 22 pages.
Non-Final Office Action received for U.S. Appl. No. 12/184,190, dated Jul. 5, 2012, 20 pages.
Non-Final Office Action received for U.S. Appl. No. 12/188,948, dated Aug. 21, 2013, 14 pages.
Non-Final Office Action received for U.S. Appl. No. 12/188,948, dated May 6, 2011, 11 pages.
Non-Final Office Action received for U.S. Appl. No. 12/188,988, dated Aug. 14, 2013, 18 pages.
Non-Final Office Action received for U.S. Appl. No. 12/188,988, dated May 16, 2011, 15 pages.
Non-Final Office Action received for U.S. Appl. No. 12/189,030, dated Aug. 24, 2016, 19 pages.
Non-Final Office Action received for U.S. Appl. No. 12/189,030, dated Feb. 22, 2017, 23 pages.
Non-Final Office Action received for U.S. Appl. No. 12/189,030, dated May 6, 2011, 8 pages.
Non-Final Office Action received for U.S. Appl. No. 12/189,030, dated Nov. 28, 2012, 16 pages.
Non-Final Office Action received for U.S. Appl. No. 12/486,710, dated Aug. 25, 2014, 29 pages.
Non-Final Office Action received for U.S. Appl. No. 12/486,710, dated Jun. 6, 2013, 29 pages.
Non-Final Office Action received for U.S. Appl. No. 12/486,710, dated Mar. 9, 2011, 14 pages.
Non-Final Office Action received for U.S. Appl. No. 12/486,710, dated Mar. 28, 2012, 25 pages.
Non-Final Office Action received for U.S. Appl. No. 12/890,437, dated Dec. 28, 2010, 17 pages.
Non-Final Office Action received for U.S. Appl. No. 14/535,101, dated Aug. 11, 2016, 9 pages.
Non-Final Office Action received for U.S. Appl. No. 14/535,101, dated May 12, 2015, 8 pages.
Non-Final Office Action received for U.S. Appl. No. 14/535,101, dated Nov. 15, 2017, 9 pages.
Non-Final Office Action received for U.S. Appl. No. 14/595,032, dated Apr. 10, 2015, 12 pages.
Non-Final Office Action received for U.S. Appl. No. 14/595,032, dated Jun. 27, 2016, 9 pages.
Non-Final Office Action received for U.S. Appl. No. 14/724,753, dated Apr. 20, 2016, 16 pages.
Non-Final Office Action received for U.S. Appl. No. 14/724,753, dated Jun. 22, 2017, 9 pages.
Non-Final Office Action received for U.S. Appl. No. 14/940,010, dated Feb. 2, 2016, 9 pages.
Non-Final Office Action received for U.S. Appl. No. 14/940,010, dated May 17, 2017, 11 pages.
Non-Final Office Action received for U.S. Appl. No. 14/940,010, dated Oct. 12, 2018, 12 pages.
Non-Final Office Action received for U.S. Appl. No. 15/257,713, dated Oct. 17, 2018, 9 pages.
Non-Final Office Action received for U.S. Appl. No. 15/727,455, dated Nov. 2, 2017, 17 pages.
Non-Final Office Action received for U.S. Appl. No. 15/933,196, dated Mar. 1, 2019, 9 pages.
Non-Final Office Action received for U.S. Appl. No. 16/155,508, dated Mar. 14, 2019, 15 pages.
Non-Final Office Action received for U.S. Appl. No. 16/209,137, dated Jan. 25, 2019, 18 pages.
Non-Final Office Action received for U.S. Appl. No. 15/933,196, dated Apr. 6, 2020, 10 pages.
Non-Final Office Action received for U.S. Appl. No. 16/403,370, dated Jul. 8, 2020, 10 pages.
Non-Final Office Action received for U.S. Appl. No. 16/529,690, dated Apr. 6, 2020, 17 pages.
Notice of Allowance received for Canadian Patent Application No. 2,820,737, dated Feb. 1, 2019, 1 page.
Notice of Allowance received for U.S. Appl. No. 10/654,108, dated Jun. 1, 2010, 6 pages.
Notice of Allowance received for U.S. Appl. No. 11/115,539, dated Jun. 2, 2010, 9 pages.
Notice of Allowance received for U.S. Appl. No. 11/426,078, dated Sep. 25, 2009, 14 pages.

(56) References Cited

OTHER PUBLICATIONS

Notice of Allowance received for U.S. Appl. No. 12/184,190, dated Jan. 11, 2016, 7 pages.
Notice of Allowance received for U.S. Appl. No. 12/188,948, dated Jan. 2, 2014, 7 pages.
Notice of Allowance received for U.S. Appl. No. 12/188,988, dated Dec. 30, 2013, 10 pages.
Notice of Allowance received for U.S. Appl. No. 12/189,030, dated Jun. 5, 2017, 5 pages.
Notice of Allowance received for U.S. Appl. No. 12/486,710, dated Jan. 29, 2015, 5 pages.
Notice of Allowance received for U.S. Appl. No. 12/890,437, dated Jun. 18, 2013, 11 pages.
Notice of Allowance received for U.S. Appl. No. 14/724,753, dated Jan. 24, 2018, 9 pages.
Notice of Allowance received for U.S. Appl. No. 15/257,713, dated Feb. 21, 2019, 7 pages.
Notice of Allowance received for U.S. Appl. No. 15/727,455, dated Apr. 12, 2018, 6 pages.
Notice of Allowance received for U.S. Appl. No. 15/727,455, dated Aug. 15, 2018, 5 pages.
Notice of Allowance received for U.S. Appl. No. 15/970,571, dated Apr. 5, 2019, 10 pages.
Notice of Allowance received for U.S. Appl. No. 16/209,137, dated Jun. 14, 2019, 5 pages.
Notice of Allowance received for U.S. Appl. No. 16/529,690, dated Oct. 20, 2020, 8 pages.
Notice of Allowance received for U.S. Appl. No. 16/209,137, dated Sep. 27, 2019, 5 pages.
Office Action received for Australian Patent Application No. 2017258903, dated Nov. 6, 2019, 6 Pages.
Office Action received for Canadian Patent Application No. 2600326, dated Oct. 21, 2019, 5 Pages.
Office Action received for Chinese Patent Application No. 201510846284.0, dated May 5, 2019, 14 pages (5 pages of English Translation and 9 pages of Official copy).
Office Action received for European Patent Application No. 09170572.3, dated Mar. 12, 2020, 5 pages.
Office Action received for Indian Patent Application No. 2266/KOLNP/2013, dated Apr. 30, 2019, 6 pages.
Office Action received for Japanese Patent Application No. 2017-224353, dated May 13, 2019, 7 pages (4 pages of English Translation and 3 pages of Official Copy).
Patent Board Decision received for U.S. Appl. No. 11/204,873, dated Dec. 14, 2015, 10 pages.
Patent Board Decision received for U.S. Appl. No. 12/184,190, dated Dec. 23, 2015, 5 pages.
Patent Board Decision received for U.S. Appl. No. 12/189,030, dated Jun. 2, 2016, 8 pages.
PenTouch Capacitive Touchscreens, Available online at <http://www.touchscreens.com/intro-touchtypes-pentouch.html>, Accessed on Aug. 5, 2005.
Photographs of Innovations 2000 Best of Show Award Presented at the 2000 International CES Innovations 2000 Design & Engineering Showcase, Jan. 6, 2000, 1 page.
Pre-interview First Office Action received for U.S. Appl. No. 15/257,713, dated May 9, 2018, 5 pages.
Pre-interview First Office Action received for U.S. Appl. No. 16/403,370, dated Feb. 20, 2020, 3 pages.
Product Overview—ErgoCommander, Available online at: <www.logicad3d.com/products/ErgoCommander.htm>, Accessed on Apr. 8, 2002, 2 pages.
Product Overview—SpaceMouse Classic, Available online at: <www.logicad3d.com/products/Classic.htm>, Apr. 8, 2002, 2 pages.
Restriction Requirement received for U.S. Appl. No. 10/654,108, dated Mar. 20, 2006, 6 pages.
Restriction Requirement received for U.S. Appl. No. 10/654,108, dated May 23, 2008, 7 pages.
Restriction Requirement received for U.S. Appl. No. 11/966,948, dated Aug. 17, 2010, 5 pages.
Restriction Requirement received for U.S. Appl. No. 12/184,190, dated Sep. 15, 2011, 6 pages.
Search Report received for Chinese Patent Application No. 201310264394.7, dated Jan. 14, 2016, 4 pages (2 pages of English Translation and 2 pages of Official copy).
Search Report received for Chinese Patent Application No. 201410259240.3, dated Sep. 27, 2016, 4 pages.
Search Report received for European Patent Application No. 10010075.9, dated Nov. 9, 2010, 6 pages.
Search Report received for European Patent Application No. 14169441.4, dated Jul. 7, 2014, 3 pages.
Search Report received for European Patent Application No. 1621989, dated Mar. 27, 2006.
Search Report received for European Patent Application No. 17203125.4, dated Mar. 5, 2018, 4 pages.
Surface Acoustic Wave Touchscreens, Available online at: <http://www.touchscreens.com/intro-touchtypes-saw.html>, Accessed on Aug. 5, 2005.
Symbol Commander, Available online at: <http://www.sensiva.com/symbolcomander/>, Accessed on Aug. 30, 2005.
Synaptics Touch Pad Interfacing Guide, Synaptics Inc., Second Edition, San Jose, Mar. 25, 1998, pp. 1-90.
Tips for Typing, FingerWorks, Available online at: <http://www.fingerworks.com/mini_typing.html>, Accessed on Aug. 30, 2005.
Touch Technologies Overview, 3M Touch Systems, Massachusetts, 2001.
Wacom Components—Technology, Available online at: <http://www.wacom-components.com/english/tech.asp>, Accessed on Oct. 10, 2004.
Watershed Algorithm, Available online at: <http://rsb.info.nih.gov/ij/plugins/watershed.html>, Accessed on Aug. 5, 2005.
Abraham et al., U.S. Appl. No. 60/364,400, filed Mar. 13, 2002, titled "Multi-button mouse".
Ahmad Subatai, "A Usable Real-Time 3D Hand Tracker", Proceedings of the 28th Asilomar Conference on Signals, Systems and Computers—Part 2 (of 2), vol. 2, Oct. 1994, 5 pages.
Apple Computer, Inc., "Apple Pro Mouse", Apple Pro Mouse Design Innovations Product Specification, Jul. 2000, pp. 1-11.
Bang & Olufsen,"BeoCom 6000 User Guide and Sales Training Brochure Cover Sheets", 2000, 53 pages.
Bier et al., "Toolglass and Magic Lenses: The See-Through Interface", In James Kijiya, editor, Computer Graphics (SIGGRAPH '93 Proceedings), vol. 27, Aug. 1993, pp. 73-80.
Chapweske Adam, "PS/2 Mouse/Keyboard Protocol", Available online at: <http://panda.cs.ndsu.nodak.edu/ ~achapwes/PICmicro/PS2/ps2. htm>, 1999, 7 pages.
Cirque Corporation,"OEM Touchpad Modules", Available online at: <www.glidepoint.com/sales/modules.index.shtml>, Accessed on Feb. 13, 2002, 5 pages.
David Nagel, "More Details on the New Pro Keyboard and ButtonLess Mouse", Available online at: <http://www.creativemac.com/HTM/News/07_00/detailskeyboardmouse,htm>, Jul. 2000, 2 pages.
De Meyer Kevin, "Buttonless and Finger Mouse: Crystal Optical Mouse", Available online at: http://www. heatseekerz. net/index.php?page=articles&id= 19&pagenum=2, Feb. 14, 2002, 2 pages.
Douglas et al., "The Ergonomics of Computer Pointing Devices", 1997.
Dreier Troy, "The Comfort Zone", Available online at http://www.pcmag.com/print_article/0,3048,a=22807,00asp, Mar. 12, 2002, 6 pages.
Edwards Andru, "Gear Live Review: iRiver Clix Review", Available online at: <http://www.gearlive.com/index.php/news/article/gear-live-review-iriver-clix-review-713400/>, Jul. 13, 2006, 5 pages.
EVB Elektronik,"TSOP6238 IR Receiver Modules for Infrared Remote Control Systems", Jan. 2004, 1 page.
Fiore Andrew, "Zen Touchpad", Available online at: http://instruct1.cit.cornell.edu/courses/ee476/FinalProjects/s2000/fiore/touchpad. html, May 2000, 6 pages.
Fisher et al., "Repetitive Motion Disorders: The Design of Optimal Rate-Rest Profiles", Human Factors, vol. 35, No. 2, Jun. 1993, pp. 283-304.

(56) References Cited

OTHER PUBLICATIONS

Flaminio Michael, "IntelliMouse Explorer", Available online at: http://www.insanely-great.com/reviews/intellimouse.html., Oct. 4, 1999, 4 pages.
Fukumoto et al., "ActiveClick: Tactile Feedback for Touch Panels", In CHI 2001 Summary, 2001, pp. 121-122.
Fukumoto et al., "Body Coupled Fingering: Wireless Wearable Keyboard", CHI 97, Mar. 1997, pp. 147-154.
Gadgetboy,"Point and Click with The Latest Mice", CNETAsia Product Review, Available online at: <www.asia.cnet.com/reviews... are/gadgetboy/0,39001770,38023590,00.htm>, Accessed on Dec. 5, 2001, 1 page.
Gizmodo,"Logitech's MX Air Is No Longer Vapor", Available online at: <http://www.gizmodo.com.au/2007/07/logitechs_mx_air_is_no_longer.html>, 2007, 2 pages.
Grevstad Eric, "Microsoft Wireless IntelliMouse Explorer Review the Ultimate Pointing Machine", HardwareCentral Review, Jun. 24, 2003.
Grevstad Eric, "Microsoft Wireless IntelliMouse Explorer Review the Ultimate Pointing Machine", Available online at: <http://www.hardwarecentral.com/hardwarecentral/print/3826/1>, Oct. 9, 2001, 3 pages.
Hardy Ian, "Fingerworks", BBC World on Line, Mar. 7, 2002.
Hillier et al., "Introduction to Operations Research", 1986.
Integration Associates Inc.,"Proximity Sensor Demo Kit", User Guide, Version 0.62-Preliminary, Apr. 13, 2004, 14 pages.
Jacob et al., "Integrality and Separability of Input Devices", ACM Transactions on Computer-Human Interaction, vol. 1, Mar. 1994, pp. 3-26.
Kinkley et al., "Touch-Sensing Input Devices", CHI '99 Proceedings, May 1999, pp. 223-230.
KIONX,"KXP84 Series Summary Data Sheet", Oct. 21, 2005, 4 pages.
Lee et al., "A Multi-Touch Three Dimensional Touch-Sensitive Tablet", CHI '85 Proceedings, Apr. 1985, pp. 121-128.
Lee et al., "A Multi-Touch Three Dimensional Touch-Sensitive Tablet", CHI'85 Proceedings, Apr. 1985, pp. 21-25.
Lee S., "A Fast Multiple-Touch-Sensitive Input Device", A Thesis Submitted in Conformity with the Requirements for the Degree of Master of Applied Science in the Department of Electrical Engineering, University of Toronto, Oct. 1984, 115 pages.
Matsushita et al., "HoloWall: Designing a Finger, Hand, Body and Object Sensitive Wall", In Proceedings of UIST '97, Oct. 1997.
Mattel,"System Service and Troubleshooting Manual", Available online at: <www.dsplib.com/intv/Master>, Accessed on Dec. 11, 2002, 1 page.
Microsoft Inc.,"Scroll and Zoom on a Microsoft Excel Sheet by Using the Microsoft Intellimouse pointing Device", Available online at: <mk:@MSITStore:C:\Program%20Files\Microsoft%200ffice\Office\1033\xlmain9.chm::/html/xlhowScrol>, 1999, 1 page.
Peter et al., Unpublished U.S. Appl. No. 10/789,676, filed Feb. 27, 2004, titled "Shape Detecting Input Device".
Press Release,"iRiver Clix Delivers Complete Package for Portable Entertainment Fans", Available online at: <www.iriveramerican.com/images.pdf/iriv_clix.pdf>, May 17, 2006, 3 pages.
Quantum Research Group,"QT510/QWheel Touch Slider IC", 2004-2005, 14 pages.
Quek,"Unencumbered Gestural Interaction", IEEE Multimedia, vol. 3, 1996, pp. 36-47.
Radwin,"Activation Force and Travel Effects on Overexertion in Repetitive Key Tapping", Human Factors, vol. 39, No. 1, Mar. 1997, pp. 130-140.
Rekimoto et al., "ToolStone: Effective Use of the Physical Manipulation Vocabularies of Input Devices", In Proc. of UIST 2000, 2000.
Rekimoto J., "SmartSkin: An Infrastructure for Freehand Manipulation on Interactive Surfaces", CHI 2002 Conference Proceedings, Conference on Human Factors in Computing Systems, Minneapolis, vol. 4, No. 1, Apr. 20-25, 2002, pp. 113-120.
Rubine et al., "Programmable Finger-Tracking Instrument Controllers", Computer Music Journal, vol. 14, No. 1, 1990, pp. 26-41.
Rubine Dean, "Combining Gestures and Direct Manipulation", CHI'92, May 3-7, 1992, pp. 659-660.
Rubine Dean H. , "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Rutledge et al., "Force-to-Motion Functions for Pointing", Human-Computer Interaction—INTERACT, 1990.
Safran David, "Letter re: Bang & Olufsen A/S", Nixon Peabody, LLP with BeoCom 6000 Sales Training Brochure, May 21, 2004, 7 pages.
Siracusa John, "The Puck is Dead (and the Little Keyboard Too)", Available online at: <http://www.arstechnic.com/wanderdesk/3q00/macworld2k/mwny-2.html>, Jul. 2000, 6 pages.
Sylvania,"Intellivision Intelligent Television Master Component Service Manual", 1979, pp. 1, 2 & 8.
Tessler et al., "Touchpads Three new input devices", Available online at: <www.macworld.com/1996/02/review/1806.html>, 1996, 2 pages.
Texas Instruments,"TSC2003/I2C Touch Screen Controller", Data Sheet SBAS 162, Oct. 2001, 20 pages.
Wellner Pierre, "The Digital Desk Calculators: Tangible Manipulation on a DeskTop Display", In ACM UIST'91 Proceedings, Nov. 11-13, 1991, pp. 27-34.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Williams Jim, "Applications for a Switched-Capacitor Instrumentation Building Block", Linear Technology Application Note 3, Jul. 1985, pp. 1-16.
Yamada et al., "A Switched-Capacitor Interface for Capacitive Pressure Sensors", IEEE Transactions on Instrumentation and Measurement, vol. 41, No. 1, Feb. 1992, pp. 81-86.
Yeh et al., "Switched Capacitor Interface Circuit for Capacitive Transducers", IEEE, 1985.
Zhai et al., "Dual Stream Input for Pointing and Scrolling", Proceedings of CHI '97 Extended Abstracts, 1997.
Zimmerman et al., "Applying Electric Field Sensing to Human-Computer Interfaces", In CHI '85 Proceedings, 1995, pp. 280-287.
Zuber, "Der Klanomeister", Connect Magazine, Aug. 1998, pp. 52-53.
Notice of Allowance received for U.S. Appl. No. 16/403,370, dated Nov. 19, 2020, 5 pages.

* cited by examiner

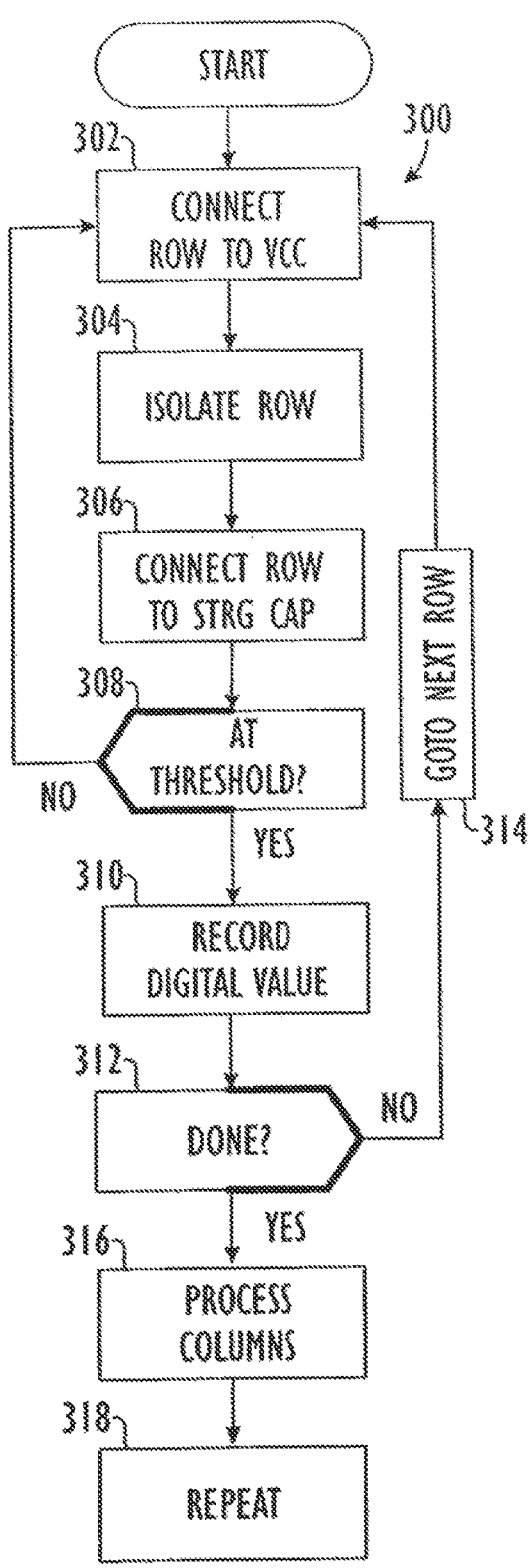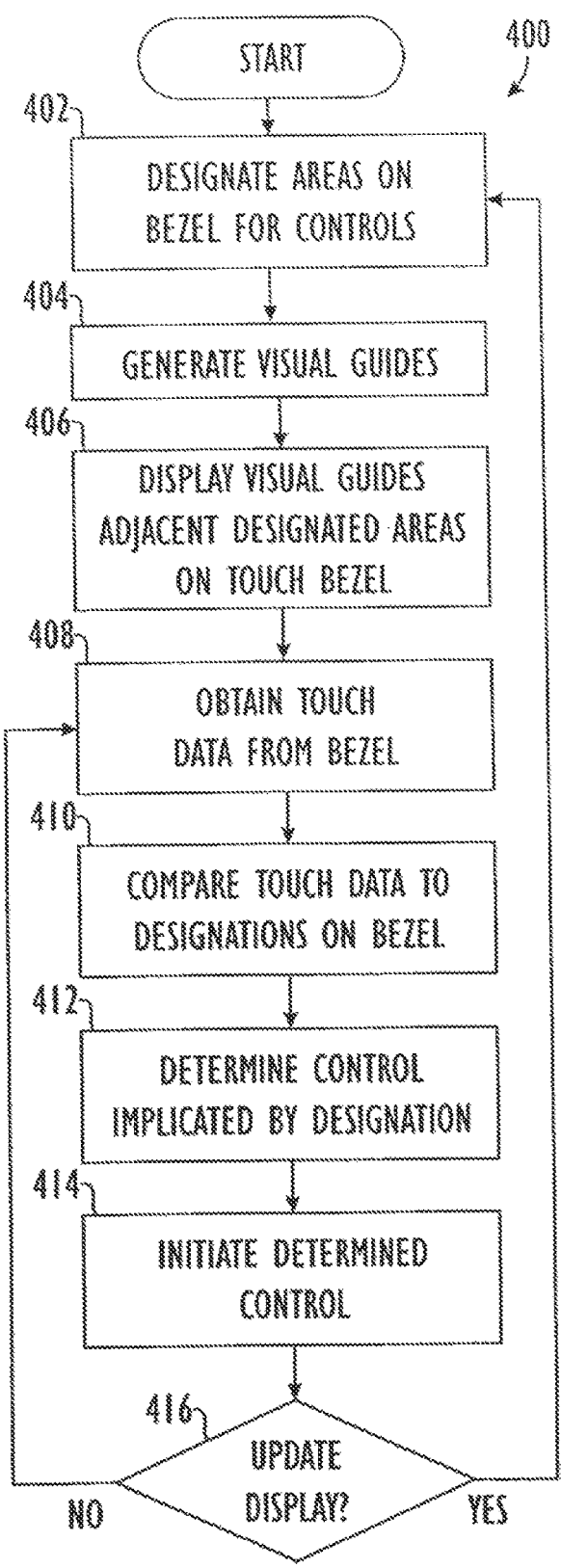
FIG. 6
FIG. 7

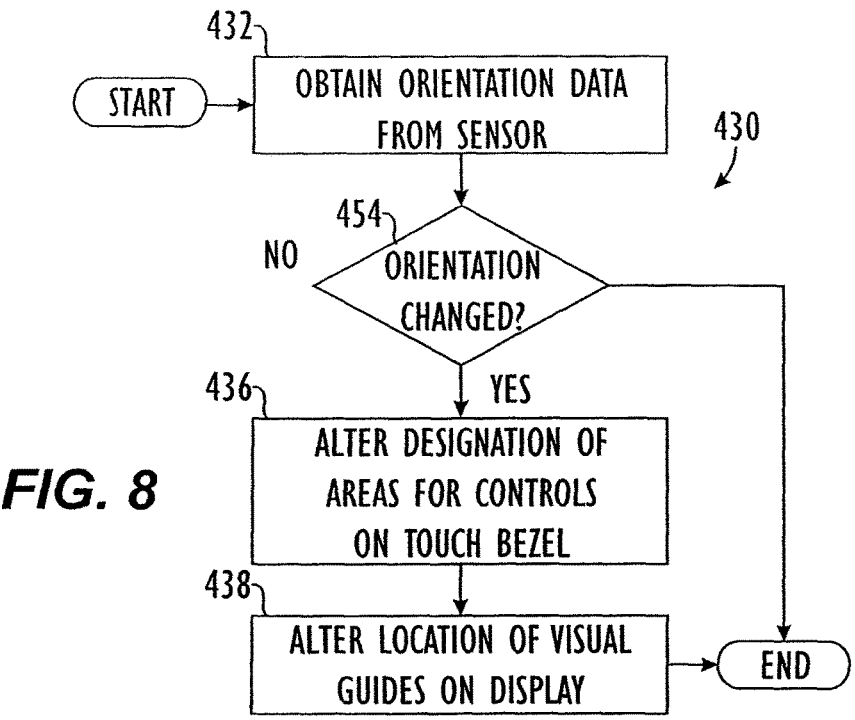
*FIG. 8*
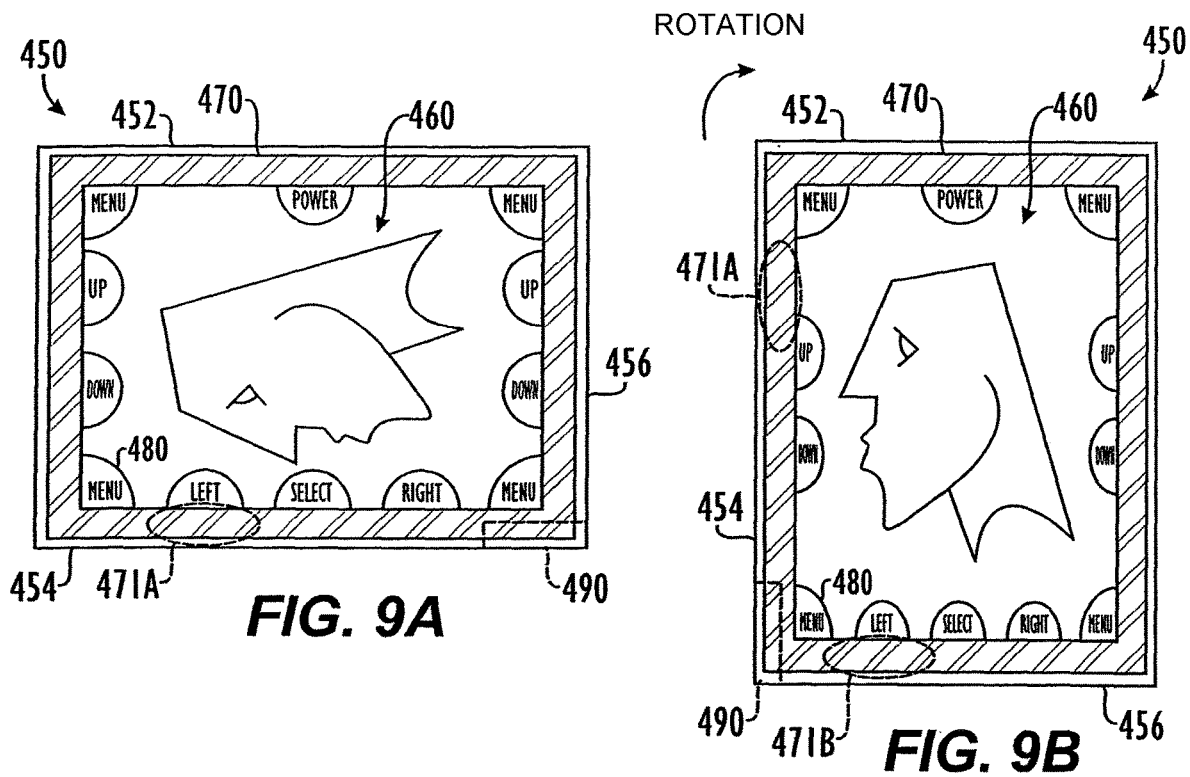
*FIG. 9A*
*FIG. 9B*

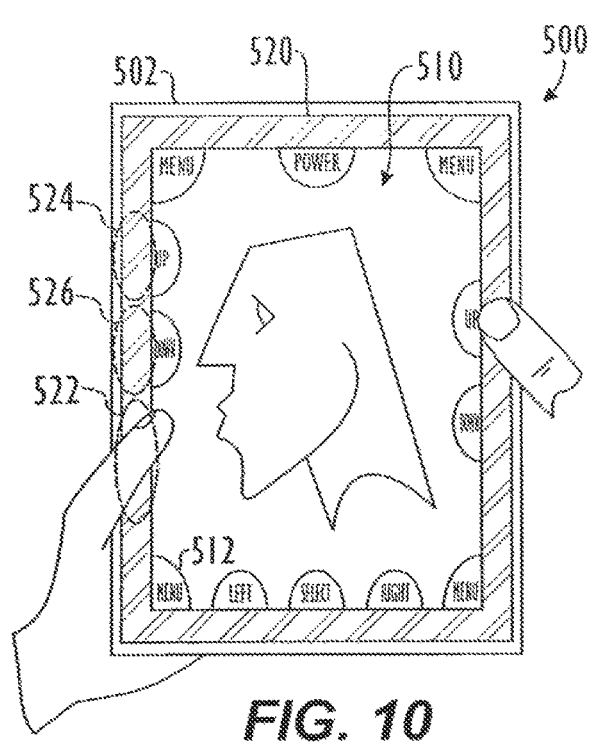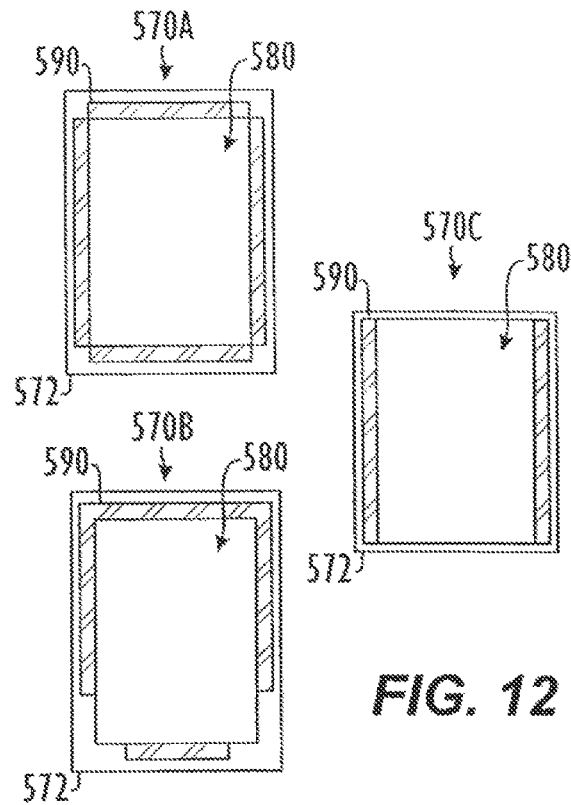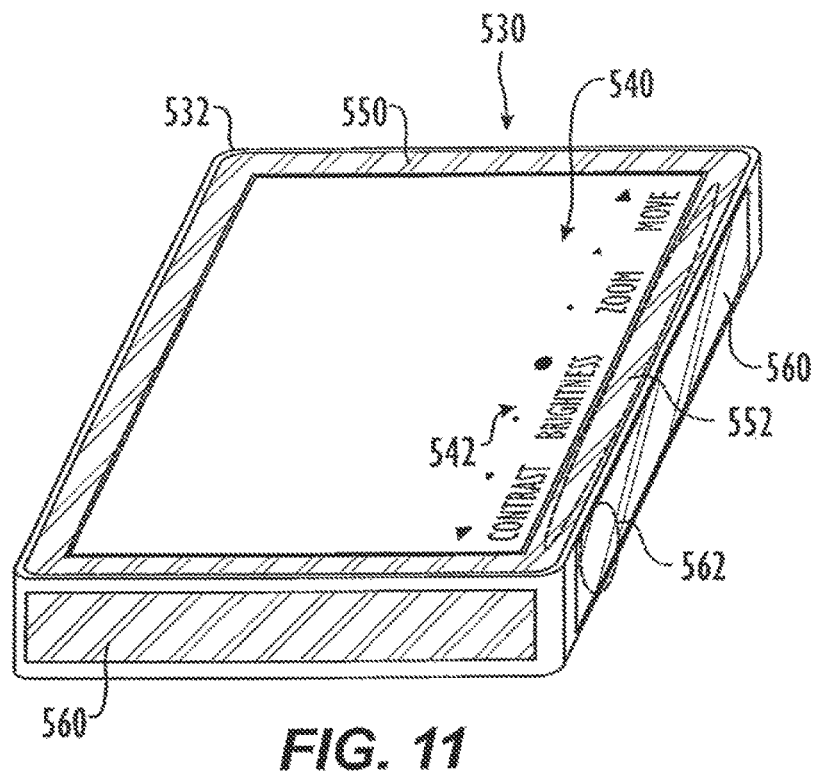
FIG. 10
FIG. 12
FIG. 11

ELECTRONIC DEVICE HAVING DISPLAY AND SURROUNDING TOUCH SENSITIVE SURFACES FOR USER INTERFACE AND CONTROL

CROSS-REFERENCE TO RELATED APPLICATIONS

This is a continuation of U.S. patent application Ser. No. 16/529,690, filed Aug. 1, 2019, (now U.S. Publication No. 2019-0354215, published on Nov. 21, 2019), which is a continuation of U.S. patent application Ser. No. 15/970,571, filed May 3, 2018, (now U.S. Pat. No. 10,386,980, issued on Aug. 20, 2019), which is a continuation of U.S. patent application Ser. No. 14/724,753, filed May 28, 2015 (now U.S. Pat. No. 9,983,742, issued on May 29, 2018), which is a continuation of U.S. patent application Ser. No. 12/486,710, filed Jun. 17, 2009 (now U.S. Pat. No. 9,047,009, issued Jun. 2, 2015), which is a continuation of U.S. patent application Ser. No. 11/426,078, filed Jun. 23, 2006, (now U.S. Pat. No. 7,656,393, issued on Feb. 2, 2010), which is a continuation-in-part of U.S. patent application Ser. No. 11/367,749, filed Mar. 3, 2006 (U.S. Publication No. 2006-0197753, published on Sep. 7, 2006), which claims priority to U.S. Provisional Patent Application No. 60/658,777, filed Mar. 4, 2005 and U.S. Provisional Patent Application No. 60/663,345, filed Mar. 16, 2005, the entire disclosures of which are incorporated by reference herein in their entirety for all purposes.

This application is also related to the following applications, which are all herein incorporated by reference in their entirety for all purposes: (1) U.S. patent application Ser. No. 10/188,182, entitled "Touch Pad for Handheld Device," filed on Jul. 1, 2002, (now U.S. Pat. No. 7,046,230, issued on May 16, 2016); (2) U.S. patent application Ser. No. 10/722,948, entitled "Touch Pad for Handheld Device," filed on Nov. 25, 2003, (now U.S. Pat. No. 7,495,659, issued on Feb. 24, 2009); (3) U.S. patent application Ser. No. 10/643,256, entitled "Movable Touch Pad with Added Functionality," filed on Aug. 18, 2003, (now U.S. Pat. No. 7,499,040, issued on Mar. 3, 2009); (4) U.S. patent application Ser. No. 10/654,108, entitled "Ambidextrous Mouse," filed on Sep. 2, 2003, (now U.S. Pat. No. 7,808,479, issued on Oct. 5, 2010); (5) U.S. patent application Ser. No. 10/840,862, entitled "Multipoint Touch Screen," filed on May 6, 2004 (now U.S. Pat. No. 7,663,607, issued on Feb. 16, 2010); (6) U.S. patent application Ser. No. 10/903,964, Untitled "Gestures for Touch Sensitive Input Devices," filed on Jul. 30, 2004, (now U.S. Pat. No. 8,479,122, issued on Jul. 2, 2013); (7) U.S. patent application Ser. No. 11/038,590, entitled "Mode-Based Graphical User Interfaces for Touch Sensitive Input Devices," filed on Jan. 18, 2005, (now U.S. Pat. No. 8,239,784, issued on Aug. 7, 2012); and (8) U.S. patent application Ser. No. 11/057,050, entitled "Display Actuator," filed on Feb. 11, 2005, (now abandoned); (9) U.S. patent application Ser. No. 11/115,539, entitled "Hand-Held Electronic Device with Multiple Touch Sensing Devices," filed Apr. 26, 2005, (now U.S. Pat. No. 7,800,592, issued on Sep. 21, 2010).

FIELD OF THE DISCLOSURE

The subject matter of the present disclosure relates to an electronic device having a display and a surrounding touch sensitive bezel for user interface and control.

BACKGROUND OF THE DISCLOSURE

There exist today many types of hand-held electronic devices, each of which utilizes some sort of user interface. The user interface typically includes an output device in the form of a display, such as a Liquid Crystal Display (LCD), and one or more input devices, which can be mechanically actuated (e.g., switches, buttons, keys, dials, joysticks, joy pads) or electrically activated (e.g., touch pads or touch screens). The display is typically configured to present visual information such as text and graphics, and the input devices are typically configured to perform operations such as issuing commands, making selections, or moving a cursor or selector of the electronic device. Each of these well-known devices has considerations such as size and shape limitations, costs, functionality, complexity, etc. that must be taken into account when designing the hand-held electronic device. In most cases, the user interface is positioned on the front face (or front surface) of the hand-held device for easy viewing of the display and easy manipulation of the input devices.

FIGS. 1A-1F are diagrams of various hand-held electronic devices including for example a telephone 10A (FIG. 1A), a PDA 10B (FIG. 1B), a media player 10C (FIG. 1C), a remote control 10D (FIG. 1D), a camera 10E (FIG. 1E), and a Global Positioning System (GPS) module 10F (FIG. 1F). In each of these devices 10, a display 12, which is secured inside the housing of the device 10 and which can be seen through an opening in the housing, is typically positioned in a first region of the electronic device 10. Each of these devices is also include one or more input devices 14, which are typically positioned in a second region of the electronic device 10 next to the display 12.

To elaborate, the telephone 10A typically includes a display 12 such as a character or graphical display, and input devices 14 such as a number pad and in some cases a navigation pad. The PDA 10B typically includes a display 12 such as a graphical display, and input devices 14 such as a stylus based resistive touch screen and buttons. The media player 10C typically includes a display 12 such as a character or graphic display and input devices 14 such as buttons or wheels. The iPod® media player manufactured by Apple Computer, Inc. of Cupertino, Calif. is one example of a media player that includes both a display and input devices disposed next to the display. The remote control 10D typically includes an input device 14 such as a keypad and may or may not have a character display 12. The camera 10E typically includes a display 12 such as a graphic display and input devices 14 such as buttons. The GPS module 10F typically includes a display 12 such as graphic display and input devices 14 such as buttons, and in some cases a joy pad.

Such prior art devices 10A-10F often employ a user interface in conjunction with the display 12 and input device 14. In one example, FIG. 2A shows an electronic device 20, such as a portable media player. The electronic device 20 has a display 24 and an input device 26 according to the prior art. The display 24 can show various forms of information (e.g., menu items, song titles stored in memory, etc.) of a user interface. The display 24 and input device 26 used in conjunction with the user interface allows the user to make selections (e.g., select a song), to operate functions of the device (e.g., play, stop, or pause a song, etc.), and to perform other functions. In this device 20, the input devices 26 is a "click wheel," such as used on an iPod® media player manufactured by Apple Computer, Inc. of Cupertino, Calif.

The electronic device 20 has a housing 22 that contains the display 24 and the input device 26. The input device 26 typically requires a number of components, such as pressure pads, printed circuit board, integrated circuits, etc. Accordingly, the housing 22 for the electronic device 20 must typically be extended or enlarged beyond the size of the display 24 so that the electronic device 20 can accommodate the components of the input device 26. Consequently, due to the required components for the input device 26, the size of the housing 22 may in some cases be larger than is actually required to house just the display 24 and any other necessary components (i.e., processor, memory, power supply, etc.) for the device 20. In addition, placement of the display 24 and the input device 26 typically accommodate only one orientation of the device 20 when held by a user.

In another example, FIG. 2B shows another electronic device 30 having a display 34 and an input device 36 according to the prior art. The electronic device 30 can be a laptop computer or the like, and the input device 36 can be a touch pad used to control functions of the device 30, such as moving a cursor, making selections, etc. The touch pad 36 is positioned on a housing 32 of the device 30 in conjunction with conventional components of a keyboard 38 and other physical inputs. The touch pad 36 can be categorized as either "resistive" or "capacitive." In the resistive category, the touch pad 36 is coated with a thin metallic electrically conductive layer and a resistive layer. When the touch pad 36 is touched, the conductive layers come into contact through the resistive layer causing a change in resistance (typically measured as a change in current) that is used to identify where on the touch pad 36 the touch event occurred. In the capacitive category, a first set of conductive traces run in a first direction on the touch pad 36 and are insulated by a dielectric insulator from a second set of conductive traces running in a second direction (generally orthogonal to the first direction) on the touch pad 36. The grid formed by the overlapping conductive traces creates an array of capacitors that can store electrical charge. When an object (e.g., a user's finger) is brought into proximity or contact with the touch pad 36, the capacitance of the capacitors at that location changes. This change can then be used to identify the location of the touch event.

In yet another example, FIG. 2C illustrates an electronic device 40 having a touch screen display 44 according to the prior art as an input device. The electronic device 40 is a Personal Digital Assistant or the like. The touch screen display 44 is positioned on a housing 42, and the electronic device 40 typically has some physical controls 46 on the housing 42. A stylus 48 is used to touch locations of the touch screen display 44 to perform various functions. The stylus 48 is typically used like a mouse and arrow, and the display 44 can show various menu items and other user interface features. Touching a menu item on the display 44 with the stylus 48 can generate a pop-up or window 45 in which the user can then make a selection with the stylus 48. The pop-ups or windows 45 overlay the content being displayed and tend to obscure it.

Recently, traditionally separate hand-held electronic devices have begun to be combined in limited ways. For example, the functionalities of a telephone have been combined with the functionalities of a PDA. One problem that has been encountered is in the way inputs are made into the device. Each of these devices has a particular set of input mechanisms or devices for providing inputs into the device. Some of these input mechanisms are generic to all the devices (e.g., power button) while others are not. The ones that are not generic are typically dedicated to a particular functionality of the device. By way of example, PDAs typically include a touch screen and a few dedicated buttons while cell phones typically include a numeric keypad and at least two dedicated buttons.

Thus, it is a challenge to design a device with limited input mechanisms without adversely affecting the numerous possible functions that the device can perform. As will be appreciated, it is preferable not to overload the electronic devices with a large number of input mechanisms as this tends to confuse 'the user and to take up valuable space, i.e., "real estate." In the case of hand-held devices, space is at a premium because of their small size. At some point, there is not enough space on the device to house all the necessary buttons and switches, etc. This is especially true when considering that all these devices need a display that typically takes up a large amount of space on its own. To increase the number of input devices beyond some level, designers would have to decrease the size of the display. However, this will often leave a negative impression on the user because the user typically desires the largest display possible. Alternatively, to accommodate more input devices designers may opt to increase the size of the device. This, too, will often leave a negative impression on a user because it would make one-handed operations difficult, and at some point, the size of the device becomes so large that it is no longer considered a hand-held device.

Therefore, what is needed in the art is an improved user interface that works for multi-functional hand-held devices.

SUMMARY OF THE DISCLOSURE

An electronic device has a display and has a touch sensitive bezel surrounding the display. Areas on the bezel are designated for controls used to operate the electronic device. Visual guides corresponding to the controls are displayed on the display adjacent the areas of the bezel designated for the controls. Touch data is generated by the bezel when a user touches an area of the bezel. The device determines which of the controls has been selected based on which designated area is associated with the touch data from the bezel. The device then initiates the determined control. The device can also have a sensor for determining the orientation of the device. Based on the orientation, the device can alter the areas designated on the bezel for the controls and can alter the location of the visual guides for the display so that they match the altered areas on the bezel if the orientation of the device has changed.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which:

FIG. 6 illustrates a process of operating the touch sensitive bezel in flow chart form.

FIG. 7 illustrates a process of operating the electronic device in flow chart form.

FIG. 8 illustrates a process of operating the electronic device having an orientation sensor in flow chart form.

FIGS. 9A-9B illustrate an electronic device with an orientation sensor in two different orientations.

FIG. 10 illustrates an embodiment of an electronic device capable of disregarding certain types of touch data.

FIG. 11 illustrates an embodiment of an electronic device having a touch sensitive bezel around the display and having addition touch sensitive pads incorporated throughout various sides of the housing for the device.

FIG. 12 illustrates some other possible bezel arrangements for an electronic device according to the present disclosure.

Figure 1A:
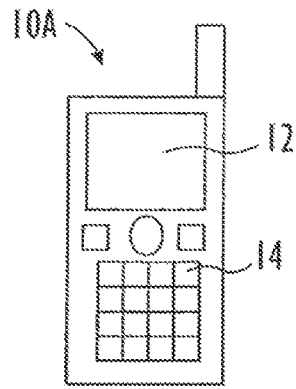
FIGS. 1A-1F are diagrams of various electronic devices according to the prior art.
Figure 1B:
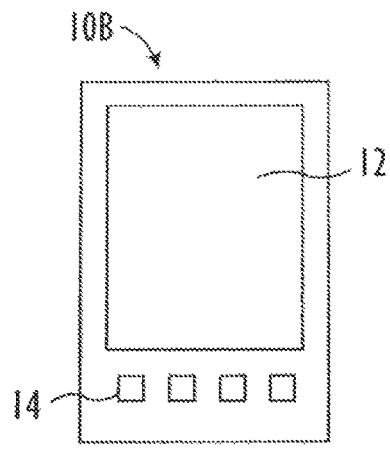
Figure 1C:
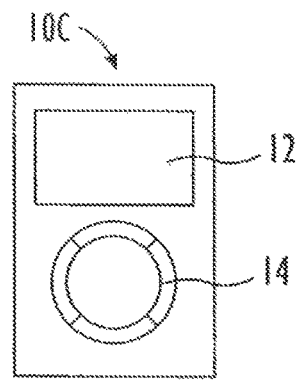
Figure 1D:
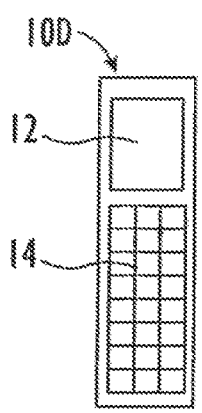
Figure 1E:
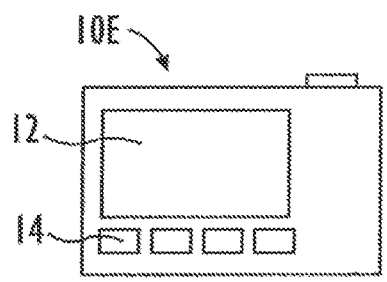
Figure 1F:
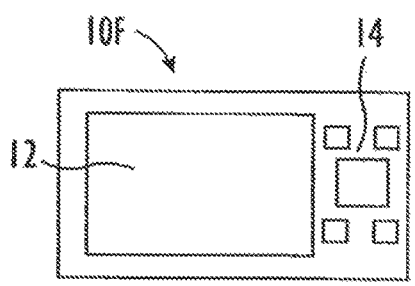
Figure 2A:
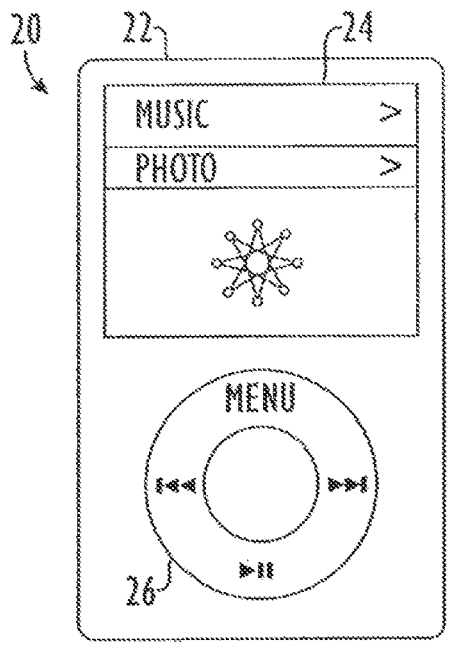
FIG. 2A illustrates an electronic device having a display and user controls according to the prior art.
Figure 2B:
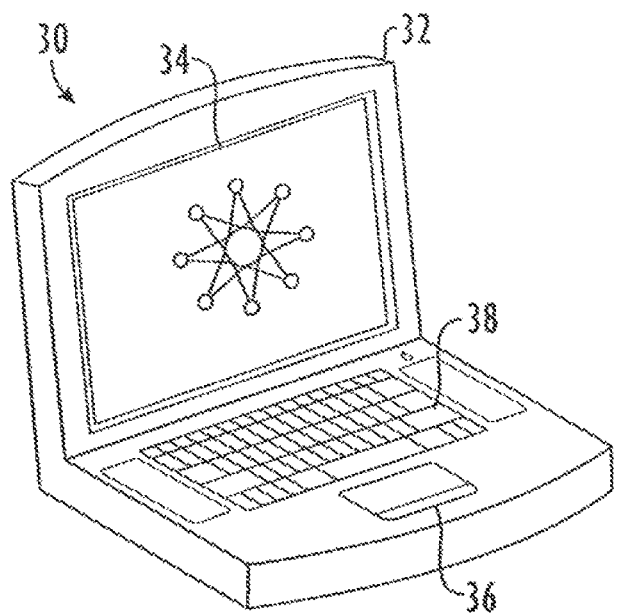
FIG. 2B illustrates an electronic device having a display and a touch pad according to the prior art.
Figure 2C:
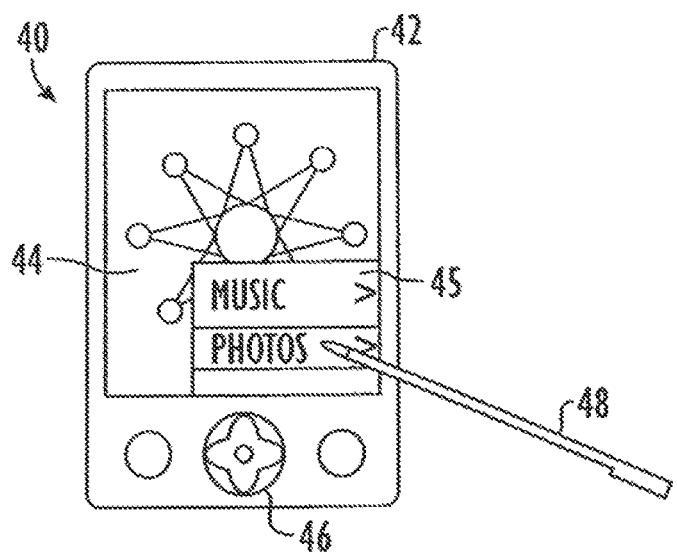
FIG. 2C illustrates an electronic device having a touch screen display according to the prior art.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

Co-pending U.S. patent application Ser. No. 11/426,078, which has been incorporated herein by reference in its entirety, discloses electronic devices capable of configuring user inputs based on how the devices are to be used. The electronic devices may be multi-functional hand-held devices. The electronic devices have a user interface that requires no (or at most only a few) physical buttons, keys, or switches so that the display size of the electronic devices—can be substantially increased. Preferably, the electronic devices eliminate such physical buttons, keys, or switches from a front surface of the electronic device so that additional surface area becomes available for a larger display on the electronic device. Ultimately, this strategy allows the electronic device to house a substantially full screen display. As used herein, a full screen display is a display that consumes, or at least dominates, a surface (e.g., a front surface) of the electronic device.

Figure 3A:
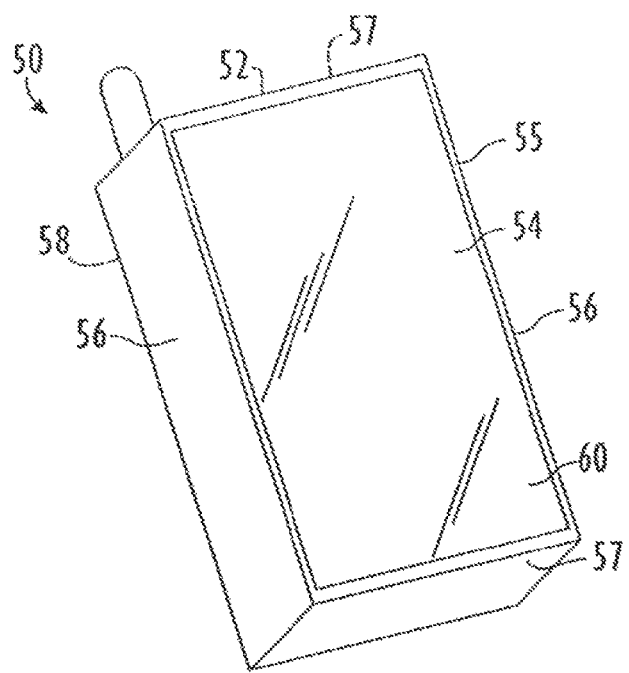
FIG. 3A is a perspective view of a substantially full screen hand-held device with a limited number of buttons according to certain teachings of the present disclosure.

FIG. 3A is a perspective view of a multi-functional hand-held device 50 having a housing 52 and a substantially full screen display 60. To accommodate the full screen display 60, the multi-functional hand-held device 50 is preferably configured with a limited number of physical buttons. Because a limited number of physical buttons are provided, the display 60 of the hand-held device 50 preferably uses a touch screen as the primary input mechanism for the electronic device 50. The touch screen of the display 60 is a transparent touch sensing mechanism that is positioned over or incorporated into the display 60. Typically, the touch screen display 60 works in conjunction with a graphical user interface (GUI) presented on the display 60. For example, the GUI may present an on-screen button or user control on the display 60, and the touch screen display 60 may detect when a user presses the on-screen button (e.g., places their finger or stylus over the on-screen button). Aspects of the touch screen display 60 and GUI for the electronic device 50 are described in greater detail below.

The hand-held device 50 may be constructed with only cross-functional physical buttons, i.e., there are no buttons dedicated to individual device functionalities. These types of buttons may include power buttons and hold switches. In another embodiment, the hand-held device 50 may not include any physical buttons at all. In some embodiments, the physical buttons are limited to only the sides 56 and back surface 58 of the hand-held device 50. In other embodiments, the physical buttons of the handheld device 50 are limited to the upper and lower portion of the sides 56 so that there are no buttons in the regions of the sides 56 where a user would physically support the device 50 (i.e., holding region). In still other embodiments, the physical buttons may be located on the front surface 54, but only in the bezel 55 surrounding the display 60. In some embodiments, the buttons may be located on only the top and bottom surfaces 57 of the device 50.

As shown in the embodiment of FIG. 3A, there are no physical buttons on the front surface 54 of the housing 52 so that the front surface 54 can be used almost entirely for the display 60. Further, because the side surfaces 56 are used for grasping the device 50, it may be preferred to leave the sides surfaces 56 free from buttons to prevent accidental actions in the event a user inadvertently presses a button while supporting the device 50. Although the top and bottom surfaces 57 would not typically be used to hold the device 50, these surfaces 57 are not ideal locations for buttons that are often actuated because it would be awkward to reach these buttons when operating the device 50 with one hand. Instead, the top surface 57 may be reserved for buttons that have limited action and generic functions that are cross-functional, for example, power and hold switches. The top and bottom surfaces 57 are also well suited for placement of I/O and communication ports. The top surface 57 may, for example, include a headset/microphone jack and an antenna, and the bottom surface 57 may include power and data ports.

Figure 3B:
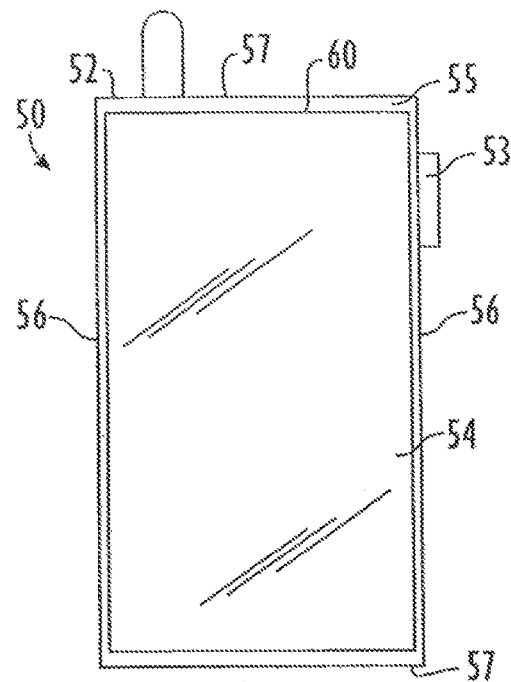
FIG. 3B is a front view of the hand-held device of FIG. 3A with at least one button.

In some cases, it may be desirable to place buttons in the upper or lower regions of the side surfaces 56 out of the way of the grasping hand of the user. This may be particularly well suited when the housing 52 of the device 50 is elongated more than the standard width of a user's grasping hand. As shown in FIG. 3B, the hand-held device 50 includes a button 53 in the upper region on the right side surface 54 of the housing 52. Because the button 53 is in the upper region, it tends to be out of the way of the grasping hand and therefore accidental activation is substantially eliminated. In one embodiment, the upper button 53 may be configured to switch the functionality of the multi-functional device 50. For example, by pressing the button 53, a new device functionality is activated, and the current device functionality is deactivated. Although the term "button" is used, it should be appreciated that the button 53 may correspond to a dial, wheel, switch, or the like.

Figure 3C:
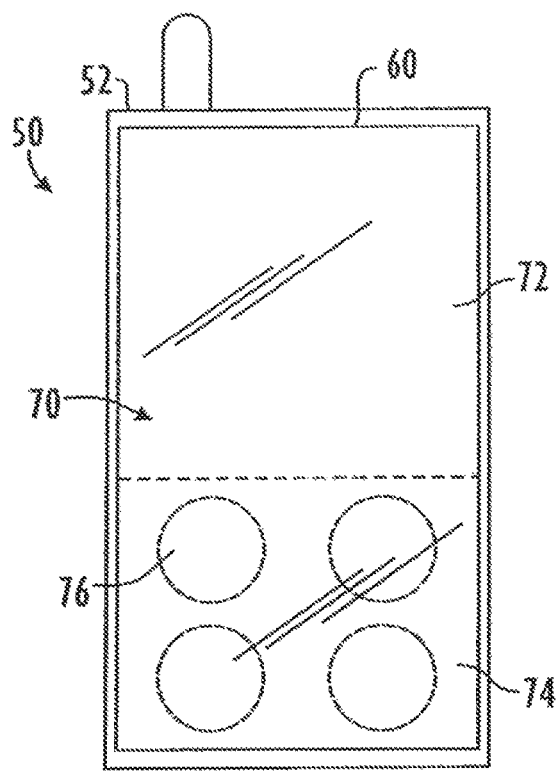
FIG. 3C is a diagram of a graphical user interface separated into a standard region and a control region for the electronic device of FIG. 3A.

As discussed above, the touch screen display 60 typically works in conjunction with a GUI presented on the display 60. The GUI shows user controls on the touch screen display 60, which in turn responds to user touches made in regions of the touch screen display 60 corresponding to the displayed user controls. The entire touch screen display 60 or only a portion may be used to show the user controls. Referring to FIG. 3C, for example, a GUI 70 for the electronic device 50 of FIG. 3A is separated into a standard region 72 and a control region 74 on the touch screen display 60. The standard region 72. represents what would normally be displayed on the display 60 when using the electronic device 50. That is, any standard GUI screens associated with the device 50 are displayed in the standard region 72. For example, when the device 50 is operated with a PDA functionality, a main menu (window with a set of icons), calendar, address book or date book may be displayed in the standard region 72.

On the other hand, the control region 74 virtually represents those physical controls 76 that would normally be physically placed on a particular type of electronic device. That is, the virtual controls 76 displayed in the control region 74 essentially mimic physical controls for a particular type of device. For example, when the device 50 is operated with a PDA functionality, the control region 74 may include virtual representations of a hand writing recognition area, a navigation pad, and the standard function buttons. The standard and control regions 72 and 74 can be positioned at any position on the display 60 (top, bottom, sides, center, etc.). For example, as shown in FIG. 3C, the control regions 72 and 74 may be positioned vertically relative to one another (one on top of the other) on the display 60.

Figure 3D:
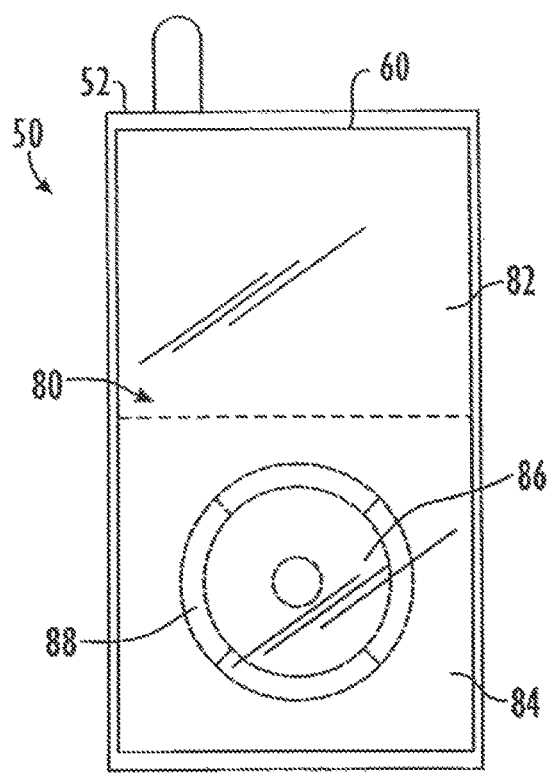
FIG. 3D illustrates an exemplary media player interface for the electronic device of FIG. 3A.

In another example, FIG. 3D is a diagram of a GUI 80 that can be used with the electronic device 50 when operated in a music player functionality. Again, the GUI 80 is divided into a standard region 82 and a control region 84. Located inside the control region 84 are a virtual scroll wheel 86 and five virtual buttons 88. Additional details on a virtual scroll wheel 86 are provided in U.S. patent application Ser. No. 11/038,590, entitled "Mode-Based Graphical User Interfaces for Touch Sensitive Input Devices," filed on Jan. 18, 2005, which has been incorporated herein by reference.

In the embodiments of FIGS. 3A-3D, the electronic device 50 includes the touch screen display 60. In additional embodiments, the electronic device 50 according to certain teachings of the present disclosure may incorporate one or more touch sensitive surfaces (not shown) on the housing 52 of the electronic device 50 itself. These touch sensitive surfaces (not shown) can provide a large surface for tracking touch inputs or can provide small-dedicated areas, such as touch buttons, for performing dedicated functions. Furthermore, the one or more touch sensitive surfaces can be used in addition to or in the alternative to the touch screen display 60 discussed in the embodiment of FIGS. 3A-3D.

The touch sensitive surfaces may be located on any surface of the housing 52, any side of the housing 52, any portion of any side of the housing 52, or at dedicated locations on the surface of the housing 52. For example, the touch sensitive surfaces may be located on the sides 56 or back surface 58 of the housing 52 and may even be located at the bezel (55; FIGS. 3A-3B) located at the front surface 54 of the housing 52. In all of these cases, a large portion of the front surface 54 of the housing 52 is saved for the display 60 so that the viewing area of the hand-held electronic device 50 can be maximized.

The touch sensitive surfaces of the housing 52 may take the form of one or more touch panels that are positioned within the housing 52. The touch sensitive surfaces may be alternatively or additionally be provided directly by the housing 52. That is, the touch sensing components of the touch sensitive surfaces may be integrated into, incorporated into, or disposed underneath the housing 52 such that the housing 52 itself is touch sensitive and forms part of the touch sensitive surfaces (rather than using a separate touch panel). Similar to a touch screen, such touch sensitive surfaces recognize touches and the positions of the touches on the surfaces. The electronic device 50 has circuitry (not shown), which can include a controller or the like, and the circuitry interprets the touches and thereafter performs actions based on the touch events. Touch sensitive surfaces can be constructed in the same manner as a touch screen, except the surfaces need not be substantially transparent. By way of example, the touch sensitive surfaces for the electronic device 50 may generally correspond to the touch sensitive housing described in detail in U.S. patent application Ser. No. 11/115,539, entitled "Hand-Held Electronic Device with Multiple Touch Sensing Devices," filed Apr. 26, 2005, which has been incorporated herein by reference in its entirety.

Figure 4:
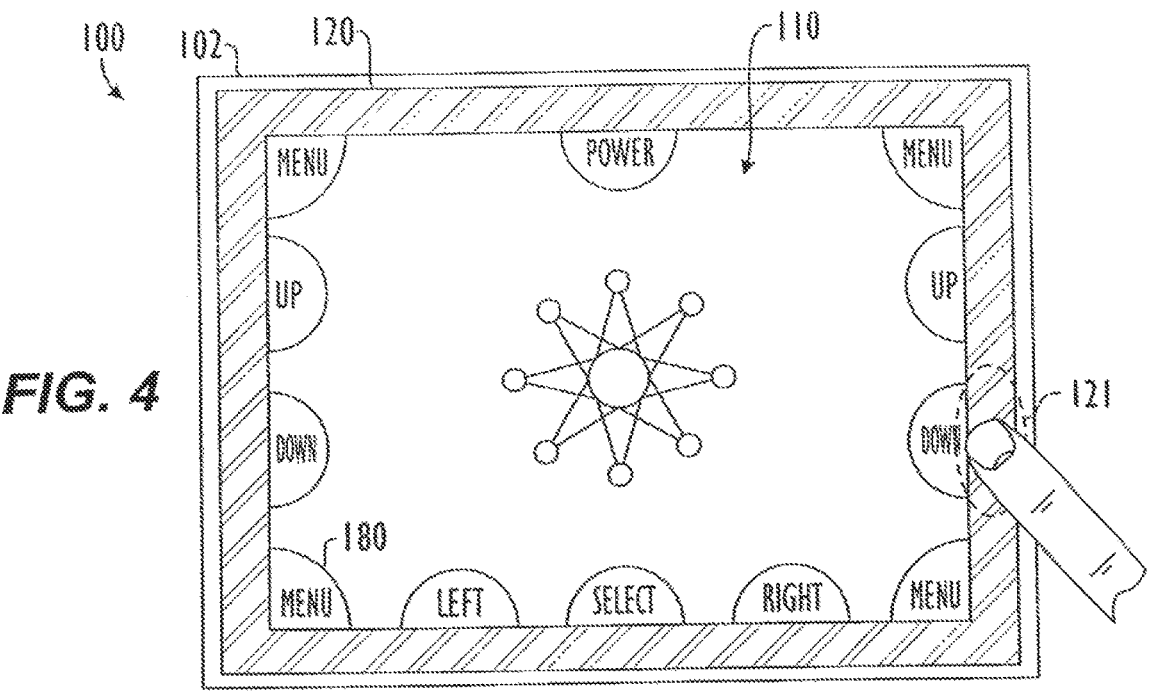
FIG. 4 illustrates an embodiment of an electronic device having a display and a touch sensitive bezel according to certain teachings of the present disclosure.

Having a display 60 that encompasses almost the entire front surface 54 of the housing 52 of the electronic device 50 has several advantages discussed herein. In addition, having one or more touch sensitive surfaces on various portions of the housing 52 that allows a user to control the electronic device 50 can also provide several advantages discussed herein. As alluded to above, one or more touch sensitive surfaces can be located on the bezel 55 (i.e., the portion of the front surface 54 of the housing 52 that surrounds the display 60). Turning then to FIG. 4, an embodiment of an electronic device 100 having a touch sensitive bezel 120 according to certain teachings of the present disclosure is illustrated. As will be discussed in more detail below, the touch sensitive bezel 120 is used for user interface and control of the electronic device 100 and is used in conjunction with a graphical user interface operating on the device 100.

The electronic device 100 includes a housing 102 and a display 110. The housing 102 holds the display 110, which can be any conventional display known and used in the art for electronic devices. Some common examples for the display 110 include a Liquid Crystal display (LCD), an electroluminescent display, and a touch screen display. The housing 102 also holds the touch sensitive bezel 120, which is positioned substantially around the perimeter of the display 110. (In the present embodiment, the bezel 120 is positioned entirely around the perimeter of the display 110 so that the bezel 120 essentially frames the display 110.) The housing 102 of the electronic device 100 also contains electronic components that provide a number of operations and features, such as memory access, communications, sound, power, etc. In addition, the electronic device 100 houses electronic components (discussed in more detail below) that are used to control operation of the display 110 and the bezel 120.

In one example, the electronic device 100 can be a picture frame having memory for storing digital pictures and for viewing on the display 110. In another example, the electronic device 100 can be a digital media device having the display 110, the touch sensitive bezel 120, and lacking most or all buttons or similar physical controls on the housing 52. In other examples, the electronic device 100 can be an electronic game, a personal digital assistant, a multimedia device, a cellular telephone, a portable video player, a portable navigation device, or the like.

The bezel 120 is touch sensitive and is used to obtain touch data from the user in response to touch events made by the user on the bezel 120. The electronic device 100 uses the touch data obtained with the bezel 120 to perform various operations and functions related to user interface and user control of the device 100. For example, the touch data obtained with the bezel 120 can control what is displayed with the device 100, what files are played, what the volume level is, what the settings for the display 110 are, etc.

A number of techniques can be used to obtain touch data with the touch sensitive bezel 120. In one embodiment, at least a portion of the bezel 120 includes a multi-touch input surface capable of generating touch data for a plurality of touch events made by the user simultaneously at different locations of the bezel 120. For example, the bezel 120 can include a capacitive sensor array and data acquisition circuitry for detecting when a user touches areas or location s on the bezel 120. The capacitive sensor array and data acquisition circuitry can be similar to those disclosed in U.S. patent application Ser. No. 10/949,060, filed Sep. 24, 2004 and entitled "Raw Data Track Pad Device and System," which is incorporated herein by reference in its entirety. An example of such an embodiment for the bezel 120 is discussed below with reference to FIGS. 5 and 6. During operation, the multi-touch input surface of the bezel 120 can be used to generate touch data that can be recognized as touch gestures discussed in more detail later.

In another embodiment, at least a portion of the bezel 120 includes a plurality of resistive or capacitive sensors and an integrated circuit for analyzing resistive or capacitive values caused by a user touching the bezel 120. An example of an embodiment for such a bezel 120 is discussed below with reference to FIGS. 13A and 13B. In yet another embodiment, at least a portion of the bezel 120 includes force detection layers as disclosed in U.S. patent application Ser. No. 11/278,080, filed Mar. 30, 2006 and entitled "Force Imaging Input Device and System," which is incorporated herein by reference in its entirety. An example of such an embodiment for the bezel 120 is discussed below with reference to FIG. 14.

During operation of the device 100, areas or location s of the bezel 120 are designated. for various user controls of the device 100. In one embodiment, particular user controls designated for areas of the bezel 120 may be indicated directly on the bezel 120 itself using graphics, words, or the like. In such an embodiment, the user controls/having indications directly on the bezel 120 may be fixed and may be those user controls that a user would typically use when operating the device 100 in any of the possible modes or functionalities of the device 100. In another embodiment, particular user controls designated for areas of the bezel 120 may not have any visual indications appearing directly on the bezel 120 itself. Instead, the designated user controls may be in a logical or predetermined location on the bezel 120 that the user may know or expect.

In yet another embodiment, the electronic device 100 has user interface software or an application for displaying icons, menu items, pictures, or words (referred to herein as "visual guides") 180 on the display 110. The visual guides 180 correspond to the user controls designated for areas or locations of the bezel 120 and are shown on the display 110 adjacent designated areas on the bezel 120. By way of example, the visual guides 180 in FIG. 4 include "Menu," "Power," "Left," "Select," "Right," etc. It will be appreciated that the visual guides 180 and their arrangement depicted in FIG. 4 are only exemplary. More or fewer visual guides 180 may be provided, and the size of the visual guides 180 can be larger or smaller than the scale depicted in FIG. 4.

As shown in FIG. 4, the visual guides 180 are preferably located near the perimeter of the display 110 so that the majority of the display 110 can be dedicated to showing content or the like. Preferably and as shown in FIG. 4, the visual guides 180 are superimposed over visual data (e.g., content, text, a picture, video, etc.) shown on the display 110. The visual guides 180 can be displayed consistently on the display 110 while the electronic device 100 is operating. Alternatively, the visual guides 180 may not be shown in most circumstances during operation and can be displayed only after the user touches a predetermined portion of the bezel 120 or makes some user configured preference, or moves the device 100.

During operation, the user can touch designated areas (e.g., outlined area—121) on the bezel 120 to initiate user controls for the electronic device 100. Some examples of possible user controls include menu operations, cursor operations, and data entry operations. The user interface software operating on the display 110 shows the visual guides 180 in positions adjacent the areas 121 on the bezel 120 designated to perform the user controls so the user may know the general area of the bezel 120 designated for the corresponding user control indicted by the adjacent visual guide 180. The designated areas 121 can be arbitrarily positioned and sized around the bezel 120 depending on the context or content of what is being displayed. The number of distinct areas 121 that can be designated depends on the size of the display 110 and the bezel 120 and depends on what type of touch sensitive sensors are used for the touch sensitive bezel 120. In one example, one edge of the bezel 120 that is about 4 to 5-inches in length may accommodate about one-hundred distinct areas that can be designated for user controls.

In a further embodiment, the electronic device 100 may be capable of rotation and may have an orientation sensor (discussed in more detail below) for determining the orientation of the device 100. Based on the sensed orientation, the areas 121 on the bezel 120 designated for the user controls can be altered or relocated to match the current orientation of the device 100. Likewise, the user interface software operating on the device 100 can alter the location of the visual guides 180 to match the current position of the areas 121 on the bezel 120 designated for the user controls.

Now that details related the electronic device 100, display 110, and bezel 120 for user interface and control have been discussed above in FIG. 4, we now turn to a more detailed discussion of components for an electronic device of the present disclosure.

Figure 5:
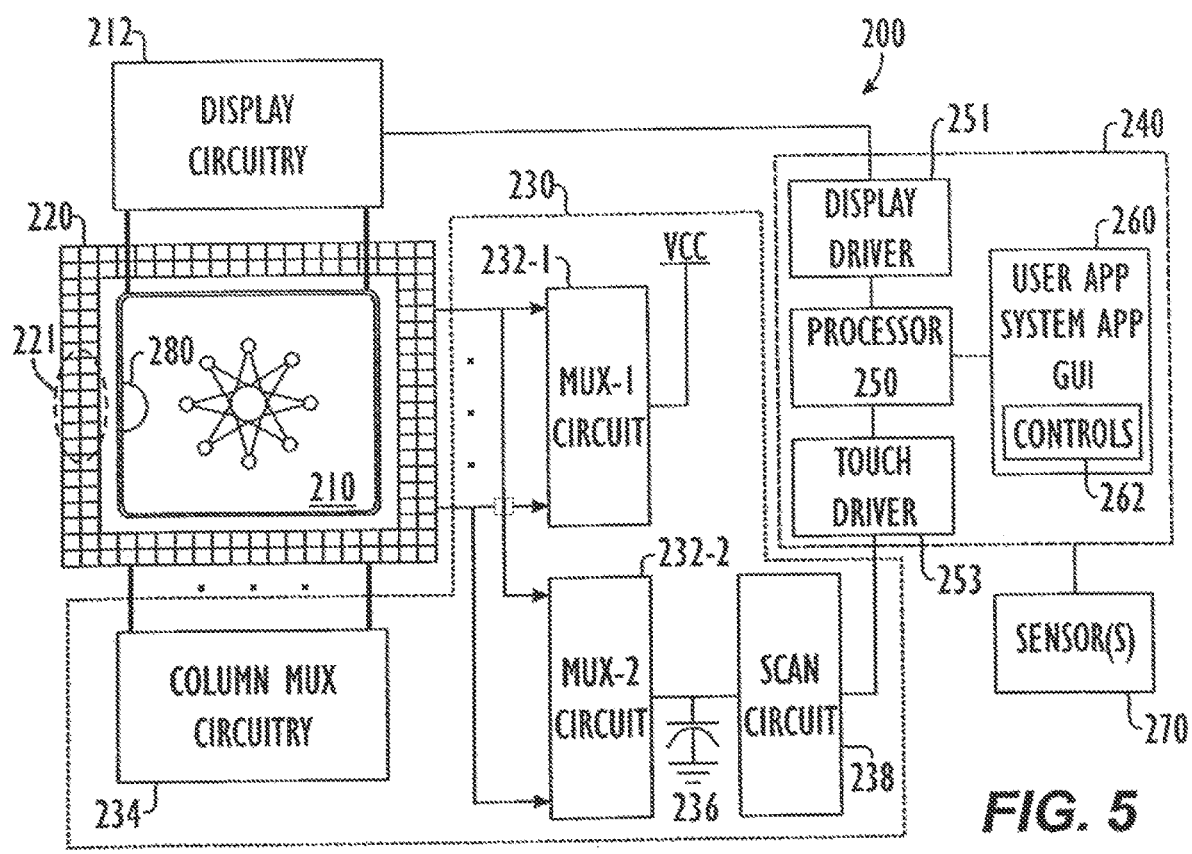
FIG. 5 schematically illustrates components of the electronic device of FIG. 4.

Referring to FIG. 5, components of an embodiment of an electronic device 200 according to certain teachings of the present disclosure are schematically illustrated. Some of the components of the electronic device 200 are not shown in FIG. 5 but will be apparent to one skilled in the art. For example, the electronic device 200 may include a housing and conventional components, such as power circuitry, a central processing unit, memory, and the like. In one example of a conventional component, for instance, the memory can store data, software, etc. and can include random access memory, read-only memory, or both.

The electronic device 200 includes a housing (not shown), a display 210, display circuitry 212, a capacitive sensor array 220, data acquisition circuitry 230, and processing circuitry 240. The display 210 is positioned on the housing (not shown) and has a perimeter. The capacitive sensor array 220 is also positioned on the housing (not shown) and is positioned substantially around the perimeter of the display 210 so that the capacitive sensor array 220 forms part of a bezel for the display 210. The data acquisition circuitry 230 is coupled to the capacitive sensor array 220 and is used to acquire touch data from the array 220. The processing circuitry 240 is coupled to the data acquisition circuitry 230 and to the display 210.

As will be explained in more detail below, the processing circuitry 240 is configured to obtain touch data from the data acquisition circuitry 230, determine if at least one user control is invoked by the obtained touch data, and initiate at least one operation for the electronic device 200 based on the determined user control. The processing circuitry 240 includes a processor 250 and includes one or more software/firmware components that operate on the processor 250. These components include a display driver 251, a sensor driver 253, and system and/or user applications 260.

The applications 260 have one or more user controls 262 that a user can invoke by touching one or more areas of the capacitive sensor array 220 in order to change or control operation of the electronic device 200. To determine which user control 262 is invoked, the processing circuitry 240 designates one or more areas 221 of the capacitive sensor array 220 for the one or more user controls 262 of the applications 260. Then, when a user touches one or more areas 221 of the capacitive sensor array 220, the data acquisition circuitry 230 provides touch data to the processing circuitry 240. The capacitive sensor array 220 and data acquisition circuitry 230 is preferably capable of generating touch data that describes more than one simultaneously touched areas 221 on the bezel 120 so that the touch data can cover instances when the user touches one area only, touches more than one area simultaneously, or makes a pattern or gesture of touches on the array 220.

In turn, the processing circuitry 240 compares the obtained touch data to the one or more designated areas and determines which of the user controls 262 has been invoked by the user. The comparison of obtained touch data to the designated areas 221 may involve different levels of processing. In one level of processing, the processing circuitry 240 compares the location (e.g., rows and columns) that the obtained touch data occurred on the array 220 to the designated areas 221 for the user controls. If the obtained touch data occurs in the designated area 221 for a satisfactory time period or over an average extent of the area 221, for example, then the processing circuitry 240 determines that the corresponding user control has been invoked.

In other levels of processing, the obtained touch data can include one or more location s (e.g., rows and columns) being touched on the array 220, can include touch data obtained over an interval of time, can include changes in touch data over time, and can include other "aggregate" forms of touch data. In this level of processing, the processing circuitry 240 recognizes "touch gestures" from the touch data and determines which control is invoked by the "touch gesture." Some examples of "touch gestures" include a single "tap" at a location of the array 220, two or more sequential. taps made at substantially the same location of the array 220 within predefined intervals of one another, touch events occurring substantially simultaneously at two or more location s of the array 220, sliding touches of one or more fingers by the user over the surface of the array 220, sustained touch at one location of the array 220 in conjunction with sliding or tapping touches at other location s of the array 220, and other combinations of the above.

To recognize such "touch gestures," one or more areas 221 of the array 220 are associated with a control 262, and touch gestures involving one or more touches on those areas 221 are associated with the control 262. The touch gesture can be a single momentary tap, a sustained touch, two or more sequential taps, a sweep of a finger," and any other possible touch arrangement. To then determine if the control 262 has been invoked, the processing circuitry 240 determines if the touch data includes those areas 221 associated with the control 262 and determines from the touch data if the touch gesture associated with the control 262 has occurred on those areas 221.

Turning from discussion of the capacitive sensor array 220, the processing circuitry 240 is also operatively connected to the display 210 by display circuitry 212. The display driver 251 is used to configure visual data (e.g., content, screens, user interface elements, visual guides, etc.) and to send or present the visual data to the display circuitry 212. The electronic device 200 preferably presents one or more visual guides 280 along the perimeter of the display 210. In addition, the one or more visual guides 280 are preferably displayed at location s on the display 210 adjacent to corresponding areas 221 of the capacitive sensor array 220 designated for the one or more user controls 262 associated with the one or more visual guides 280.

Given the overview of the electronic device 200 discussed above, we now turn to a more detailed discussion of the components of the electronic device 200 of the present embodiment. The capacitive sensor array 220 includes a plurality of rows and columns of capacitive sensors, and the array 220 may or may not be symmetrical. The rows and columns of the array 220 are positioned around the perimeter of the display 210.

The data acquisition circuit 230 includes multiplexer ("MUX") circuitry coupled to the sensor array 220. In particular, two multiplexer circuits 232-1 and 232-2 (re-ferred to as the MUX-1 and MUX-2 circuits) are coupled to the rows of the sensor array 220. Each row in the sensor array 220 can be electrically coupled to a reference voltage Vcc through the MUX-1 circuit 232-1 and can be electrically coupled to a storage capacitor 236 through the MUX-2 circuit 232-2. While not shown in detail, each column of sensor array 220 can be similarly coupled to a reference voltage Vcc and to a storage capacitor using column MUX circuits 234. Thus, a user touching a location or area 221 of the sensor array 220 can alter the capacitance measured at affected rows and columns of the array 220.

During operation, the MUX circuits 232 and 234 are responsible for coupling and stimulating successive elements of the sensor array 220 (e.g., rows, columns, or individual pixels—that is, an element at the intersection of a row and column) to the storage capacitor 236 in a controlled/sequenced manner and indicating that a measurement cycle has begun to the scan circuit 238. When the charge on storage capacitor 236 reaches a specified value or threshold, the scan circuit 238 records the time required to charge the storage capacitor 236 to the specified threshold. Consequently, the scan circuit 238 provides a digital value that is a direct indication of the capacitance of the selected element of the sensor array 220.

The sensor driver 240 obtains measured capacitance data from the acquisition circuitry 230. In turn, the sensor driver 240 processes the measured capacitance data and configures a corresponding control, command, operation, or other function designated by the row and column location of the capacitance data. Depending on what application, content, or the like is currently operating, the system application 260 and/or user application 262 implements the corresponding user control 262. Implementation may affect what is currently being displayed on the display 210. Consequently, the display driver 214 may operate the display circuitry 212 coupled to the display 210 in response to an implemented control 262. For example, a new menu may be presented on the display 210 in response to an implemented user control 262.

As shown in FIG. 5, the electronic device 200 can also include one or more sensors 270 coupled to the processing circuitry 240. The one or more sensors 270 can include a Mercury switch, an acceleration sensor, inclinometer sensor, an electronic compass, a light sensor, a motion sensor, or an orientation sensor. In one embodiment, the orientation sensor 270 is a 3-G accelerometer similar to what is used in gyro remotes or used in hard drives to detect free fall. The accelerometer 270 detects gravity and generates orientation data that can indicate which edge of the display 210 is 'up,' "down," "north," or other direction. The processing circuitry 240 coupled to the accelerometer 270 determine the orientation of the electronic device 200 from the orientation data obtained from the sensor 270. The determined orientation can then be used to designate or alter the location of the areas 221 on the array 220 to match the orientation of the device 200. In addition, the determined orientation can then be used to designate or alter the location of the visual guides 280 on the display 210 to match the newly designated areas 221 on the array 220. Furthermore, the determined orientation can then be used to rotate or flip the content shown on the display 210 to match the orientation of the device 200. Details related to how the electronic device 200 can use orientation data are discussed below with reference to FIGS. 8 and 9A-9B.

In another embodiment, the one or more sensors 270 can include one or more ambient light sensors for detecting the level of ambient light around the device 200. Preferably, the device 200 includes at least two such ambient light sensors 270 for redundancy. Based on the level of ambient light detected, the electronic device 200 can automatically adjust the contrast and/or brightness of the display 210 accordingly. In yet another embodiment, the one or more sensors 270 can include a motion sensor, such as a passive pyroelectric sensor. The motion sensor 270 can be used to detect motion of the electronic device 200 from a stationary state so that the device 200 can "wake up" (e.g., turn on or come out of a standby mode) or can show previously hidden visual guides 280 on the display 210 in response to being moved.

Referring to FIG. 6, a process 300 of operating the electronic device having the capacitive sensor array 220 of FIG. 5 for the touch sensitive bezel is illustrated in flow chart form. For better understanding, element numerals for components of FIG. 5 are concurrently provided in the discussion that follows. During operation, the MUX-1 circuitry 232-1 couples a first row of the sensor array 220 to the reference voltage Vcc for a specified period of time (Block 302) and then isolates or disconnects that row from Vcc (Block 304). Next, the MUX-2 circuitry 232-2 couples the same row to the storage capacitor 236 for a specified period of time, or until the voltage on storage capacitor 236 reaches a specified threshold (Block 306).

While the MUX-2 circuitry 232-2 couples the selected sensor row to the storage capacitor 236, a determination is made whether the storage capacitor's voltage reaches a specified threshold (Block 308). If so (i.e., the "Yes" prong of Block 308), the digital value corresponding to the time it took to charge the storage capacitor 236 to the specified threshold is recorded by the scan circuit 238 (Block 310). If the storage capacitor's voltage does not reach the specified threshold during the time that the MUX-2 circuitry 232-2 couples the selected sensor row to the storage capacitor 236 (i.e., the "No" prong of Block 308), then the acts of block 302-308 are repeated.

Once a digital value corresponding to the capacitance of the selected row has been obtained (Block 310), a check is made to see if there are additional rows in the sensor array 220 that need to be sampled. If more rows need to be sampled, the process 300 goes to the next row at Block 314 and repeats the acts of Blocks 302-308. If it is determined at Block 312 that all the rows in the sensor array 220 have been sampled in accordance with Blocks 302-308, a similar sampling process is used to acquire a capacitance value for each column in the sensor array 220 (Block 316). Once all rows and all columns have been processed, the entire process 300 is repeated, which can be done at a predetermined interval (Block 318).

Referring to FIG. 7, a process 400 of operating the electronic device of FIG. 5 is illustrated in flow chart form. For better understanding, element numerals for components of FIG. 5 are concurrently provided in the discussion that follows. During operation, areas 221 on the array 220 of the touch sensitive bezel are designated for user controls of the electronic device (Block 402). In designating an area 221, contiguous rows and columns of a portion of the capacitive sensor array 220 are associated with a user control for the electronic device 200. The electronic device 200 also generates visual guides 280 for the user controls (Block 404) and displays the visual guides 280 on the display 210 adjacent the designated areas 221 on the touch sensitive bezel 120 to which the visual guides 280 correspond (Block 406). For example, the visual guides 280 are preferably displayed along the perimeter of the display 210 adjacent corresponding rows and columns of the capacitive sensor array 220 associated with the user controls for the electronic device 200. In this way, the majority of the display 210 can be used to show content.

The electronic device 200 then obtains touch data with the capacitive sensor array 220 using the techniques disclosed herein (Block 408). The touch data in a basic form includes information of which rows and columns of the capacitive sensor array 220 have been touched (i.e., have exceeded the capacitance threshold). The electronic device 200 performs various forms of processing of the obtained touch data. For example, the touch data can be processed to determine how long the rows and columns have reached a threshold capacitance, to determine how long rows and columns have been below the threshold capacitance since an initial period of being above the threshold, and to determine other forms of information. Furthermore, to facilitate processing, the touch data can be aggregated together into predefined intervals of time and portions of the array 220. In addition, the touch data obtained at a first instance can be stored and later compared to touch data obtained at a subsequent instance to determine changes in the data overtime, caused by a user's touch movement on the array 220, for example. These and other forms of processing of the touch data will be apparent to one skilled in the art with the benefit of the present disclosure.

After the touch data has preferably been processed with the techniques described briefly above, the electronic device 200 then compares the information from the touch data to the designations on the array 220 associated with the user controls for the device 200 (Block 410). From the comparison, the electronic device 200 determines which user control is invoked by the designated area 221 of the array 220 that the user has touched (Block 412). Then, the electronic device 200 initiates the determined user control to affect processing of the device 200 (Block 414). Once the user control is implemented, it may be necessary to update the display 210 and the designated user controls (Block 416). If the same visual guides 280 and designated user controls can be used, then the process returns to Block 408, for example, to obtain any new touch data with the array 220. If, however, new visual guides 280 and designated user controls are needed due to a change in the content of what is displayed or the context of the device's operation, then the process returns to Block 402 to designate new areas on the array 220 for user controls and proceeds to subsequent steps.

One skilled in the art will appreciate that the touch sensitive array 220 around the perimeter of the display 210 of the device 200 can be used to implement various user controls in some ways similar to how a conventional touch pad is used. In a brief example, the information at Block 410 may indicate a "tap" made by the user on the array 220. This "tap" (i.e., a touch by a finger on the array 220 for a "short" duration of time) may have been performed in designated area 221 of the array 220. The electronic device 200 determines that the area 221 invoked by the "tap" is designated for performing a "page up" control of what is being displayed on the device 200. The time duration of the "tap" may indicate the amount or extent of the "page up" control. In response to the user control, the electronic device 200 causes what is being shown on the display 210 to page up as requested by the user.

As noted briefly above, the electronic device 200 of FIG. 5 can include one or more sensors 270, which can include an accelerometer or other orientation sensor Referring to FIG. 8, a process 430 of operating the electronic device of FIG. 5 having the orientation sensor 270 is illustrated in flow chart form. For better understanding, element numerals for components of FIG. 5 are concurrently provided in the discussion that follows. Initially, the electronic device 200 obtains orientation data from the sensor 270 (Block 432). The electronic device 200 can obtain the orientation data at periodic intervals or at certain points during operation. The electronic device 200 then determines whether the orientation of the device has changed (Block 434). If not, the process 500 can end.

If the orientation has changed at Block 434, the electronic device 200 determines how the orientation has changed and alters the designation of areas for user controls of the touch bezel (Block 436). In particular, the processing circuitry 240 alters how the one or more areas 221 of the capacitive sensor array 220 are designated for the one or more user controls 262 so that the designation better matches the new orientation of the device 200. In addition, if the display 210 is showing visual guides 280 for the corresponding areas 221 of the bezel 120, then the electronic device 200 also alters location of the visual guides 280 on the display 210 so that they match the newly designated area 221 for the user controls on the array 220 (Block 438). Then, the process 430 can end until called again during the operation of the electronic device 200.

By way of example, FIG. 9A shows an electronic device 450 having content on the display 460. The device 450 is rectangular and can be oriented in either a "portrait" or a "landscape" orientation. Accordingly, the display 460 can show a picture or other content in either orientation. In some circumstances, the orientation of what is displayed may not match how the device 450 is currently orientated. The user may rotate or changes the orientation of the device 450, for example, to the orientation shown in FIG. 9B. The orientation senor 490 is used to determine the new orientation (i.e., rotation of 90-degrees), and the processing circuitry (not shown) of the device 450 determines that the areas 471 designated on the bezel 470 for certain user controls of the electronic device 450 should be changed. Accordingly, the processing circuitry alters the designation of the areas 471 of the bezel 470 so that they will better match the newly sensed orientation of the device 450. In addition, because the electronic device 450 can display visual guides 480 relative to the designated areas 471 of the bezel 470, the processing circuitry also alters location of the visual guides 480 on the display 460 so that their new location s match the new location s of the designated areas 471 of the bezel 470.

For example, the area 471A of where the "Left" control 480 in FIG. 9A will remain on the same side 454 of the device 450 as shown in FIG. 9B. Yet, the "Left" control 480 is preferably orientated along the new bottom edge 456 of the device 450 so that—it is in a position more amenable to the user. Thus, the old area 471A is no longer designated for the "Left" control. Instead, a new area 421B of the bezel 470 is designated for the "Left" control 480, and the visual guide 480 for the "Left" control is displayed in the appropriate position of the display 460 along the new bottom edge 456 to match the new designated area 471B.

In the example of FIGS. 9A-9B, orientation data from the orientation sensor 490 is used to alter the designation of the areas 471 for the user controls and the location of visual guides 480. In other embodiments, the orientation of the content to be displayed may dictate how the designation of the areas 471 for the user controls and the location of visual guides 480 should be for the device 450. For example, the display 460 of the electronic device 450 in FIGS. 9A-9B is rectangular and can be used to show content in "portrait" or "landscape" orientations. Depending then on the desired or required orientation for particular content (e.g., image, screen, user interface, or picture) to be shown on the display 460, the electronic device 450 can alter the designation of the areas 471 for the user controls and the location of visual guides 480 according to the "portrait" or "landscape" orientations of. the content. In other words, when the device 450 is preparing to display particular content, the electronic device 450 can determine the particular orientation for that content. Then, when the device 450 switches to show that new content on the display 460, the electronic device 450 alters the designation of the areas 471 for the user controls and the location of visual guides 480 if the orientation of the newly displayed content is different from that previously displayed. Thus, the user can naturally rotate the device 450 to better view the newly displayed content in its preferred orientation (e.g., "portrait" or "landscape"), and the visual guides 480 and designated areas 471 will be already matched to the content's orientation.

Turning to FIG. 10, the electronic device 500 of the present disclosure can also be configured to discriminate or ignore certain forms of touch data made on the bezel 520.

For example, the housing 502 of the electronic device 500 may be designed to fit mainly around the display 510 and the surrounding bezel 520. As a result, when a user holds the electronic device 500, it may be likely that portion of the user's hand (e.g., one of the user's fingers or thumb) will maintain consistent contact on portion 522 of the bezel 520. In this instance, it is desirable that the electronic device 500 ignores such consistent contact made on the bezel 520. The processing circuitry (not shown) of the device 500 can store information tracking how long touch data has occurred on portions of the bezel 520 and/or how many adjacent, designated areas have had repeated touch data. Then, after a predefined time limit, the processing circuitry can begin to ignore that consistent touch data in the portion 522 of the bezel 520 when determining what user controls the user is implicating. Furthermore, the processing circuitry can designated new location s for areas of the bezel 520 for user controls that are part of the ignored portion 522 of the bezel 520. In the present example, the areas 524 and "526 for the "page up" and page down" user controls on the left side of the bezel 520 have been moved to new location s outside the ignored portion 522. Likewise, the visual guides 512 associated with the "page up" and page down" user controls have been shifted to new locations adjacent to the newly designated areas 524 and 526.

In previous embodiments of the present disclosure, the touch sensitive bezel of the present disclosure is arranged substantially around the entire perimeter of the display. In one alternative shown in FIG. 11, an embodiment of an electronic device 530 can have a touch sensitive bezel 550 around a display 540 just as before. In addition, the electronic device 530 can have one or more additional touch sensitive pads or surfaces 560 incorporated throughout various sides of the housing 532 for the device 530. These additional touch sensitive pads 560 can be used to detect location caused by a user touching the pads 560 and/or can be used to detect force caused by a user pressing the pads 560. The additional touch sensitive pads 560 can be positioned along edges of the housing 532 and can be positioned on the back of the housing 532.

Any user controls designated for areas 562 on these additional touch sensitive pads 560 may be preconfigured and may not be change during operation. In this way, the user may know the functionality of the various pads 560 and can use the areas 562 to control features of the device 530 without the need of any visual guides 542 on the display 540. Alternatively, the user may be able to designate any user controls for these additional touch sensitive pads 560 using setup and configuration operations of the device 530. In yet another alternative, user controls for areas 562 of these additional pads 560 can be designated and re-designated by the electronic device 530 during operation in much the same way disclosed herein for areas 552 on the bezel 550. For example, areas 562 on the pads 560 can be designated for user controls similar to the areas 552 that can be designated on the bezel 550, and visual guides 542 can be displayed around the perimeter of the display 540 adjacent to corresponding areas 562 on the additional pads 560 in the same way that the visual guides 542 are displayed adjacent designated areas 552 of the bezel 550.

In FIG. 11, for example, the area 552 on the bezel 550 can be designated to adjust values, and the areas 562 of the adjacent side pad 560 can be designated to select various attributes of the display 540. Because the device 530 can be hand-held, the user can selected from the various attributes—by touching an area 562 on the side pad 560 with the hand used to hold the device 530, and the user can then adjust the value for the selected attribute by touching the area 552 on the bezel 550 with a finger of the other hand. The side pad 560 can be either a large surface for tracking touch inputs or can includes a plurality of small dedicated surfaces, such as touch buttons, for performing dedicated functions. In yet an another alternative, the additional pads 560 can also be force sensitive so that a predetermined amount of force or pressure caused by a user touch is required to invoke the user control associated with the touched areas 562 of the pads 560.

In additional alternatives shown in FIG. 12, a touch sensitive bezel 590 according to the present disclosure can be arranged in a housing 572 around at least a portion of a display 580 of an electronic device 570. In general, the bezel 590 can include one or more discrete touch sensitive surfaces positioned in the housing 572 adjacent one or more sides of the display 580. On device 570A, for example, the bezel 590 has a plurality of discrete touch sensitive surfaces positioned in the housing 572 adjacent each side of the display 580. On device 570B, for example, the bezel 590 has a first and second touch sensitive surface positioned in the housing 572 adjacent three sides of the display 580 and has a second touch sensitive surface positioned in the housing 572 adjacent one side of the display 580. On device 570C, for example, the bezel 590 has first and second touch sensitive surfaces positioned in the housing 572 adjacent opposing sides of the display 580. These and other alternative arrangements are possible for touch sensitive bezels according to the present disclosure.

Figure 13A:
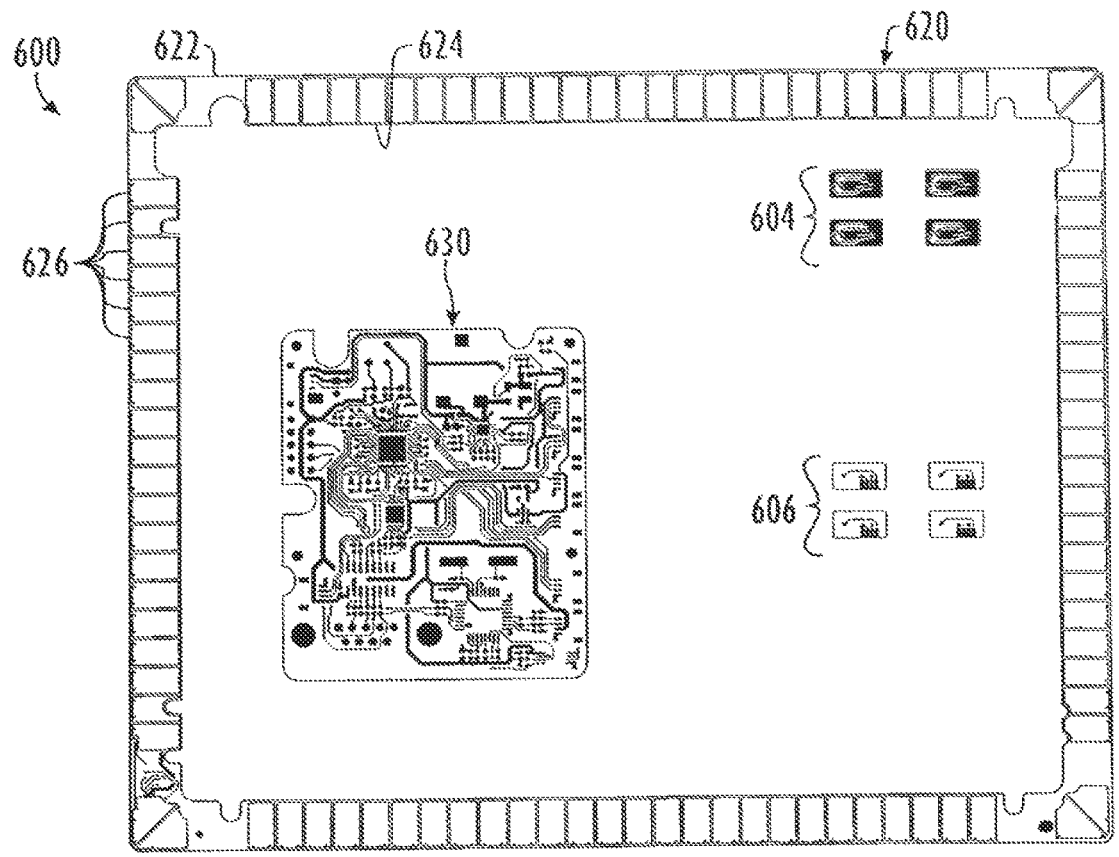
FIG. 13A illustrates an embodiment of a touch sensitive bezel having a plurality of conductive pads, a control module, and sensors according to certain teachings of the present disclosure.

In the embodiment of FIG. 5, the touch sensitive bezel of electronic device 200 has been described as having capacitive sensor array 220 that is used with data acquisition circuitry 230. As alluded to above, however, a touch sensitive bezel for an electronic device according to the present disclosure can include other forms of touch sensitive circuitry. Referring to FIG. 13A, another embodiment of a touch sensitive bezel 620 for an electronic device 600 is illustrated. Only portion of the touch sensitive bezel 620 is illustrated in FIG. 13A, and the housing, display, and other components of the electronic device 600 are not shown for illustrative purposes. In the present embodiment, the touch sensitive bezel 620 includes a Printed Circuit Board (PCB) 622 formed into a ring or frame shape and defining an inner opening 624 in which components of the display (not shown) for the electronic device are positioned. A plurality of conductive pads 626 are formed on the PCB 622, and each pad 626 is interconnected by a resistive element (not shown) according to details discussed below. The PCB 622 in this embodiment can have dimensions of approximately 8 by 10-inches and can have about 100 pads 626 formed around its perimeter.

The touch sensitive bezel 620 also includes a control module 630, which is housed in the electronic device and is shown here relative to the PCB 622 for illustrative purposes. The control module 630 is connected to the pads 626 of the PCB 622 by connections (not shown). The control module 630 has a plurality of components, including an infrared sensor, communication circuitry, accelerometer/inclinometer sensor, and other components. A suitable infrared sensor is an RE200B pyroelectric passive infrared sensor. A suitable accelerometer/inclinometer sensor is a KXP84 IC.

The electronic device 600 can also have a plurality of ambient light sensors 604 and a plurality of infrared (IR) modules 606, which are also shown here relative to the control module 630 for illustrative purposes. A suitable ambient light sensor is an ISL29001 light-to-digital sensor. The ambient light sensors 604 can be positioned in various location s on the housing of the electronic device and behind the display. The ambient light sensors 604 detect the level of ambient light near the display so that the electronic device can adjust the contrast, brightness, or backlighting of the display accordingly.

Figure 13B:
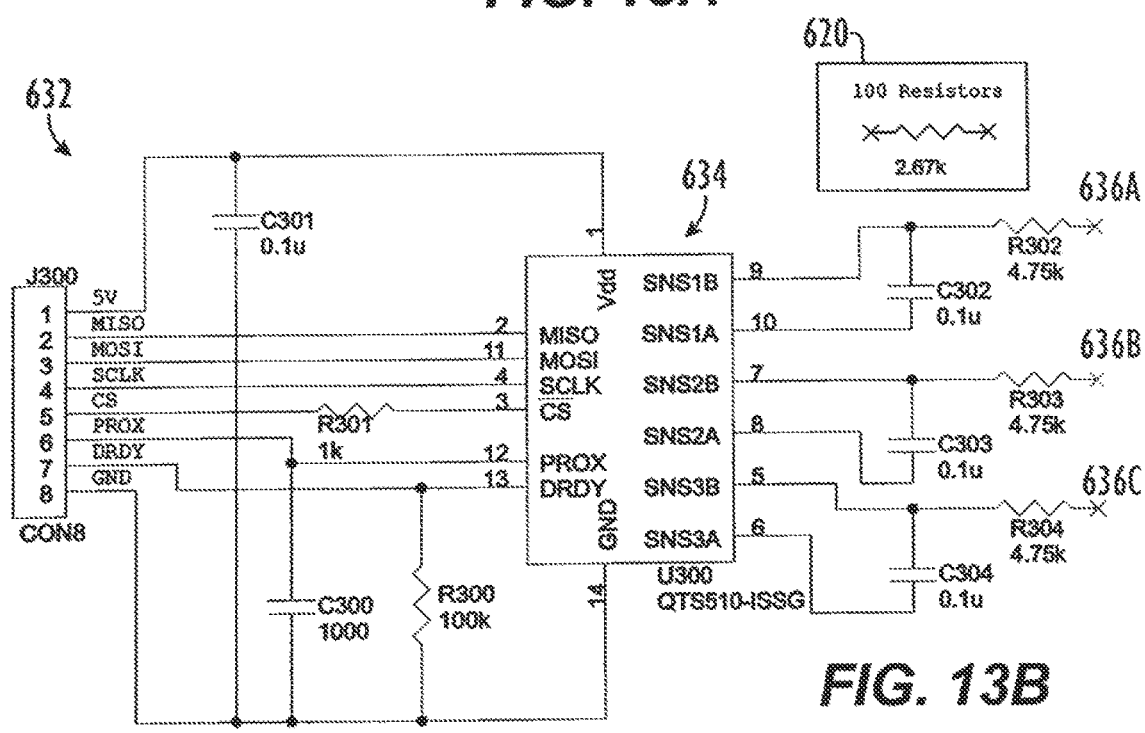
FIG. 13B illustrates a circuit diagram of portion of the control module for the touch sensitive bezel of FIG. 13A.

In FIG. 13B, a schematic diagram of components 632 comprising portion of the control module 630 of FIG. 13A is illustrated. The components 632 in this portion include a QT510 Interacted Circuit 634 available from Quantum Research Group, Ltd. The QT510 IC 634 is connected at three approximately equidistant points 636A, B, and on the pad element 620, which is shown here schematically. Operation and arrangement of QT510 IC 634 and the pad element 620 is similar to that used for the QWheel™ available from Quantum Research Group, Ltd. However, in at least one exception, the QWheel™ has 18 pads formed into a concentric wheel with resistors of about 15K positioned between each pad and a total resistance of about 270 k. In contrast, the present embodiment of the pad element 620 has about 100 pads formed as a frame for the display of the device. The 100 pads are interconnected by about 100 resistors. Each resistor has a resistance of about 2.67 k so that the pad element 620 has a total resistance of about 270 k.

In an additional embodiment, the operation and arrangement of IC 634 and the pad element 620 of the present disclosure can use techniques disclosed in U.S. Patent Application Publication No. 2006/0032680, entitled "A Method of Increasing Spatial Resolution of Touch Sensitive Devices," which is incorporated herein by reference in its entirety, to expand the detected sensitivity of the pad element 620.

Figure 13C:
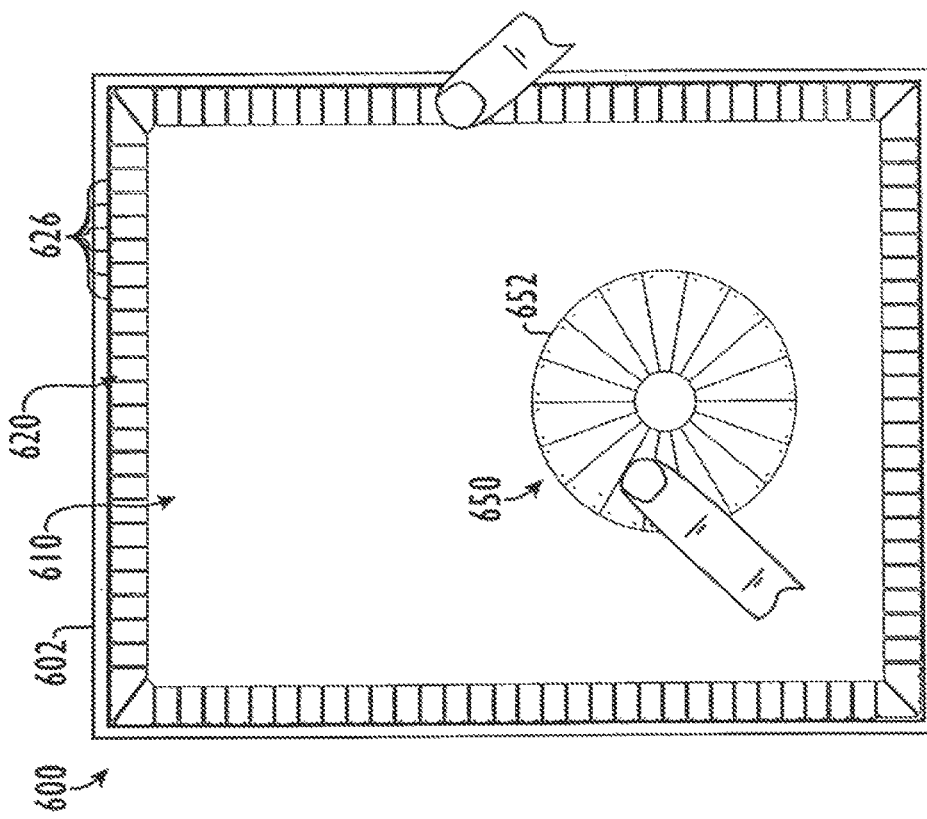
FIG. 13C is an alternative embodiment of FIG. 13A.

In the embodiment shown in FIG. 13A, the pads 626 are formed on PCB 622. In an alternative embodiment shown in FIG. 13C, pads 628 can be formed as layers on a surface of a display 610 for the electronic device 600. For example, techniques associated with Indium oxide doped with tin oxide (referred to herein as ITO techniques) can be used to deposit the pads 626 as transparent conductive thin layers on the surface of the display 610. In this way, the touch sensitive bezel of the device 600 is essentially the perimeter of the display 610, and the housing 602 is practically consumed by the display 610. In addition, a touch sensitive wheel 650 having a plurality of pads 652 can also be deposited as on the display 610 using ITO techniques to provide additional user controls of the electronic device 600.

Figure 14:
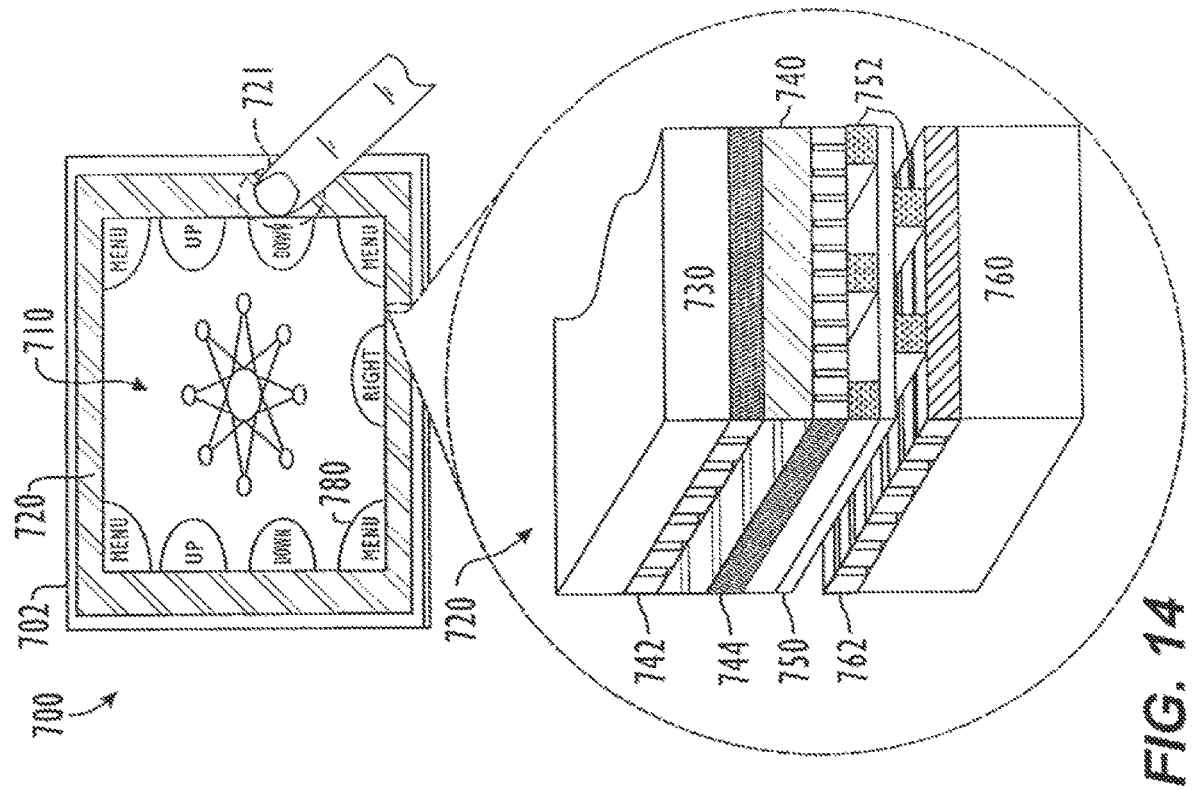
FIG. 14 illustrates an embodiment of a touch sensitive bezel having force detection and location layers according to certain teachings of the present disclosure.

In FIG. 14, an embodiment of an electronic device 700 having a touch sensitive bezel 720 capable of force and location detection is illustrated. Portion of the touch sensitive bezel 720 is illustrated in a detailed cutaway. In this embodiment, the bezel 720 includes a force detector combined with a location detector so that the bezel 720 can provide both location and force detection. The bezel 720 includes a cosmetic layer 730, a substrate 740, a dielectric spring layer 750, and a base or support layer 760. The substrate 740 has a plurality of conductive drive paths 742 on a "top" side and has a plurality of conductive sense paths 744 on the "bottom" side. The dielectric spring layer 750 has alternating, or spatially offset, raised structures 752 on both sides of the layer 750. The base layer 760 has a plurality of conductive drive paths 762. The drive paths 742 on the substrate 740 are laid down in a first direction to form rows as are the drive paths 762 on the base layer 760. The sense paths 744 on the bottom side of the substrate 740 are laid down in a second direction to form columns.

To sense location, the device 700 uses many of the same techniques discussed above with reference to the capacitive sensor array of FIG. 5. During operation, for example, data acquisition circuitry (not shown) of the device 700 drives the plurality of drive paths 742 (one at a time) during a first time period. During this same time period, the sense paths 744 on the other side of the substrate 740 are interrogated to obtain data representing the location of one or more touches to the cosmetic layer 730. For example, a user's finger placed in proximity to various rows and columns of the drive paths 742 and sense paths 744 on the top and bottom of the substrate 740 alters their capacitive relationship when processed by the data acquisition circuitry.

To sense force, circuitry of the device 700 drives the drive paths 762 on the base layer 760 (one at a time) during a second time period. During this same time, the sense paths 744 on the bottom side of the substrate 740 are again interrogated to obtain data representing the strength or intensity of force applied to cosmetic layer 730 by a user's touch. For example, when a force is applied by a user's finger on the cosmetic layer 730, the spring layer 750 deforms moving the sense paths 744 on the bottom of the substrate 740 closer to the drive paths 762 on the top of the base layer 760. A resulting change in mutual capacitance is then used to generate data indicative of the strength or intensity of an applied force. Additional details related to the layers and other aspects of this embodiment are disclosed in incorporated U.S. patent application Ser. No. 11/278,080.

Using force and location detection, the bezel 720 of the present embodiment can provide additional user interface and controls. For example, a user's finger in FIG. 7 is shown touching an area 721 of the bezel 720 designated for a "page down" operation (as indicated by the adjacent visual guide 780). The electronic device 700 uses the sensed location on the bezel 720 to determine which control is invoked by the user's touch. In addition, the force applied by the user's touch is obtained using the force detection features of the bezel 700. The sensed force can be used to determine the desired speed or extent with which to perform the "page down" operations, for example.

Given all of the previous discussion of the present disclosure, we now turn to an embodiment of an electronic device that incorporates one or more of the aspects and features discussed above. In FIGS. 15 through 19, an embodiment of a multimedia device 800 having a housing 802, a display 810, a touch sensitive bezel 820, and a user interface 900 according to certain teachings of the present disclosure is illustrated in a number of stages of operation and use. The multimedia device 800 in FIGS. 15 through 19 is meant to be exemplary. It will be appreciated that the user interface 900, available features and functions, user controls, screens, designations of the bezel 820, and various other details provided in the discussion that follows may be altered depending on the implementation and desired results.

Figure 15:
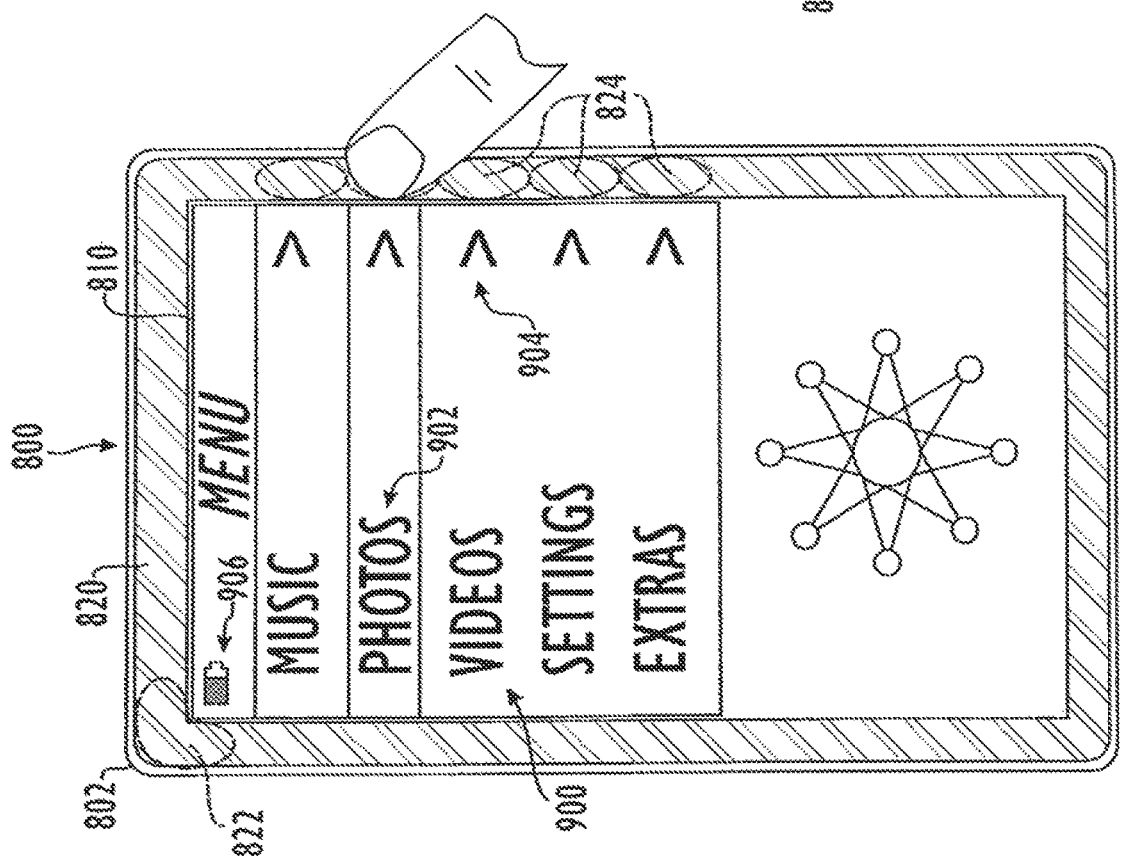

In FIG. 15, a menu screen of the user interface 900 is displayed and lists various functions or features 902 (e.g., Music, Photos, Videos, etc.) that are available on the device 800. An area 822 of the bezel 820 adjacent a battery symbol 906 can be touched at any point during operation to access power settings for the device 800 without the user having to access the settings function 902 on the menu screen 900. A plurality of areas 824 on one side of the bezel 820 are designated for selection of one of the available functions or features 902, and visual guides 904 are provided on the perimeter of the bezel 820 adjacent the designated areas 824. A user touching one of these areas 824 of the bezel 820 accesses a subsequent screen of the user interface 900 for the selected function or feature 902. It should be noted that the side of the housing 802 may include a touch sensitive pad (similar to pads 560 of FIG. 11) on a side of the housing 802, and areas (e.g., areas 562 of FIG. 11) of this side pad can be similarly designated.

Figure 16:
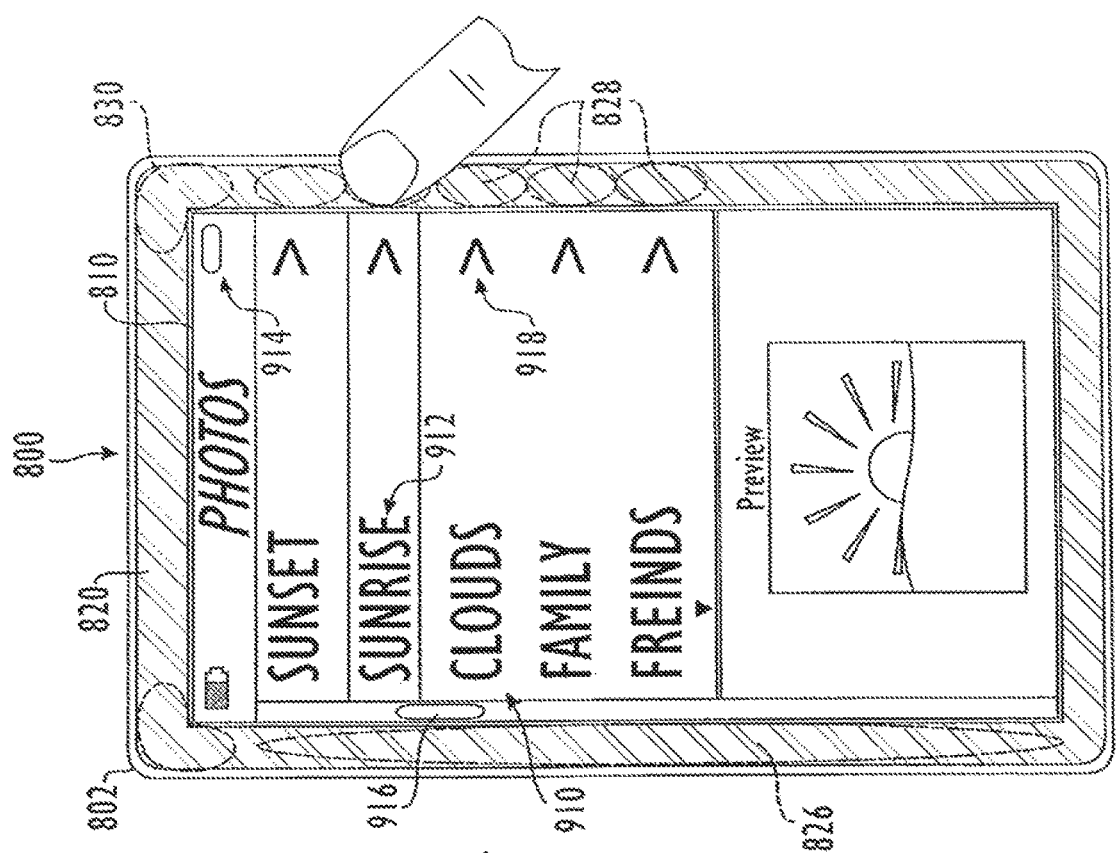
FIGS. 15 through 19 illustrate an embodiment of a multimedia device having a touch sensitive bezel and a user interface according to certain teachings of the present disclosure.

In FIG. 16, the user has accessed the photo feature from the previous menu so that the display 810 shows a photo screen 910 listing various available photos 912. An area 826 on the left side of the bezel 820 is designated for scrolling up and down the list of photos 912, and a visual scroll guide 916 is provided at the perimeter of the display 810 adjacent the area 826. A plurality of areas 828 on the right side of the bezel 820 are designated for selecting to open a selected photo 912, and visual guides 914 for each photo 912 are provided adjacent these areas 828. An area 826 in the upper corner adjacent a close window icon 914 on the screen 910 is designated on the bezel 820 for closing the current screen 910 to return to the menu screen of FIG. 15.

Figure 17A:
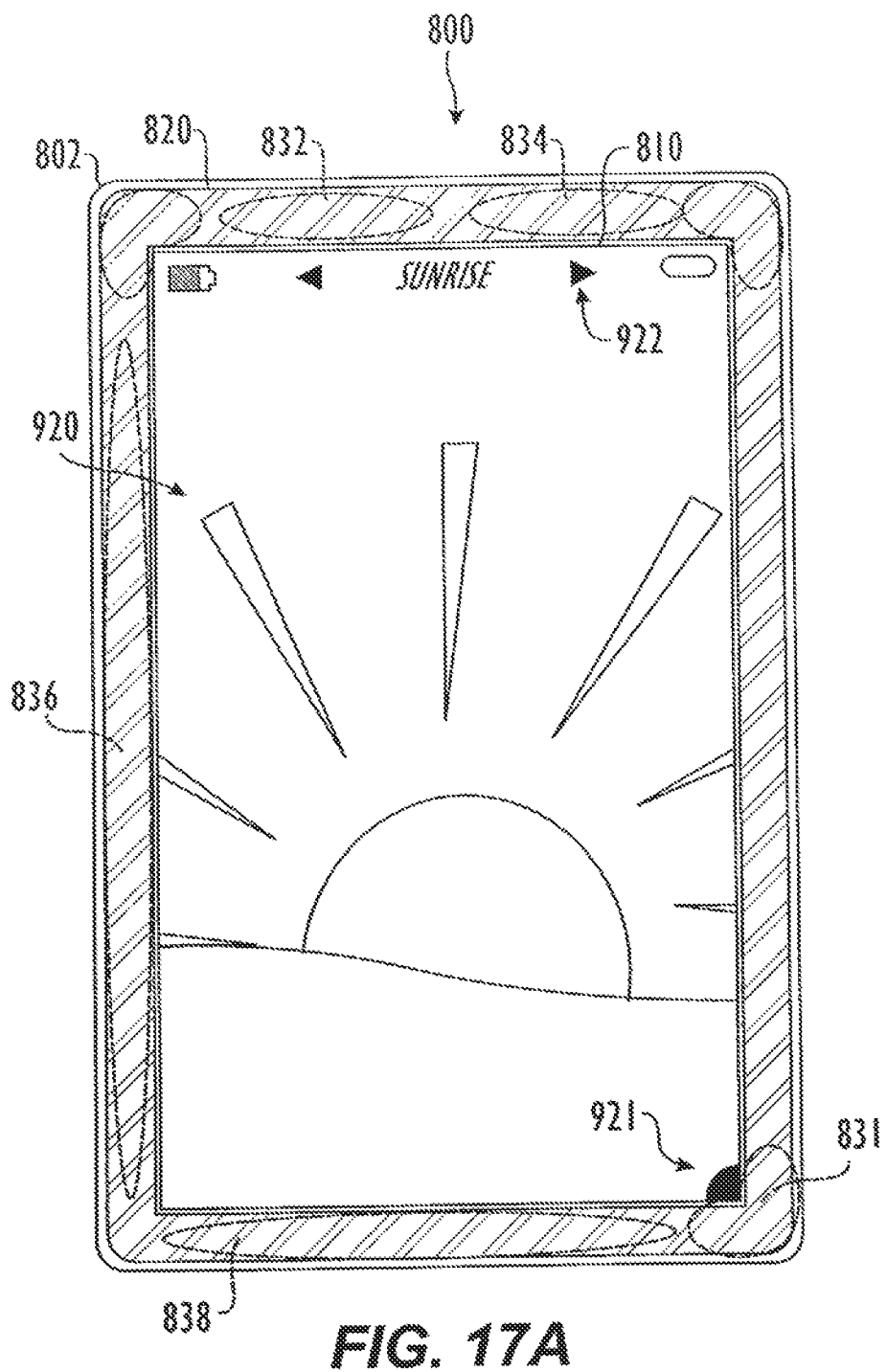

In FIG. 17A, the display 810 shows a screen 920 having a selected photo (e.g., sunrise). A toggle area 831 of the bezel 820 in the lower right corner is designated to access and display additional user controls that are discussed below with reference to FIG. 17C. A visual guide 921 is provided on the display 810 adjacent this toggle area 831. A first area 832 on the bezel 820 is designated for moving to a previous photo of those available, and a second area 834 is designated for moving to a subsequent photo. Corresponding visual guides 922 are displayed adjacent these areas 832 and 834 on the bezel 820. Additional areas 836 and 838 on adjacent sides of the bezel 820 may be designated for any of a number of operations, such as zoom☐ contrast, brightness, page down, scroll, etc. In the present embodiment, visual guides are not shown adjacent these areas 836 and 838 so that the majority of the display 810 is unobstructed with elements of the user interface, and the screen 920 can primarily display the content (i.e., the sunrise photo). The user controls for which these areas 836 and 838 are designated may be already known or readily apparent to the user.

Figure 17B:
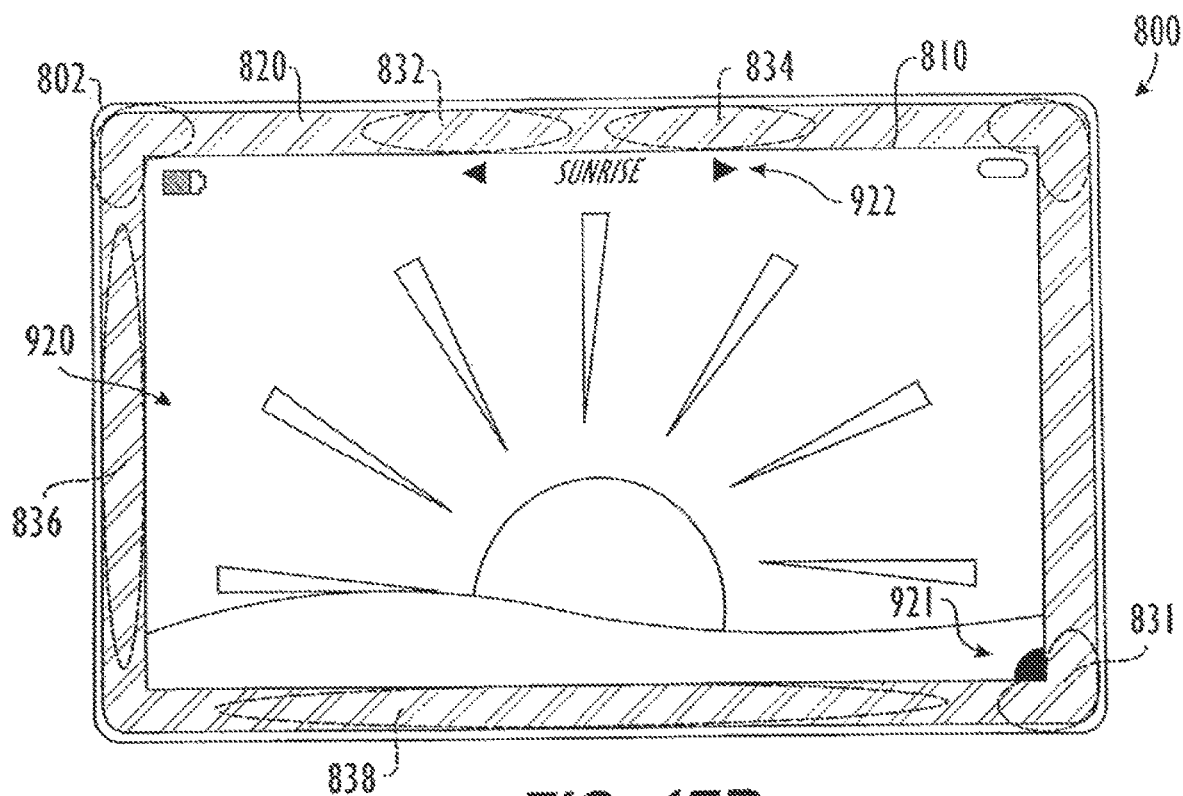

As shown in FIG. 17A, the device 800 is rectangular and is shown in a vertical (i.e., "portrait") orientation. The user may rotate the device 800 so that it has a horizontal (i.e., "landscape") orientation, such as shown in FIG. 17B. As discussed previously, the device 800 can have an orientation sensor (not shown), such as an accelerometer or an inclinometer, and can determine the orientation of the device 800. In FIG. 17B, the device 800 has determined the horizontal or landscape orientation. Based on this determination, the device 800 has adjusted the orientation of the screen 920 showing the photo on the display 810 in a landscape orientation and has readjusted the location of all the areas on the bezel 820 designated for the various user controls.

Figure 17C:
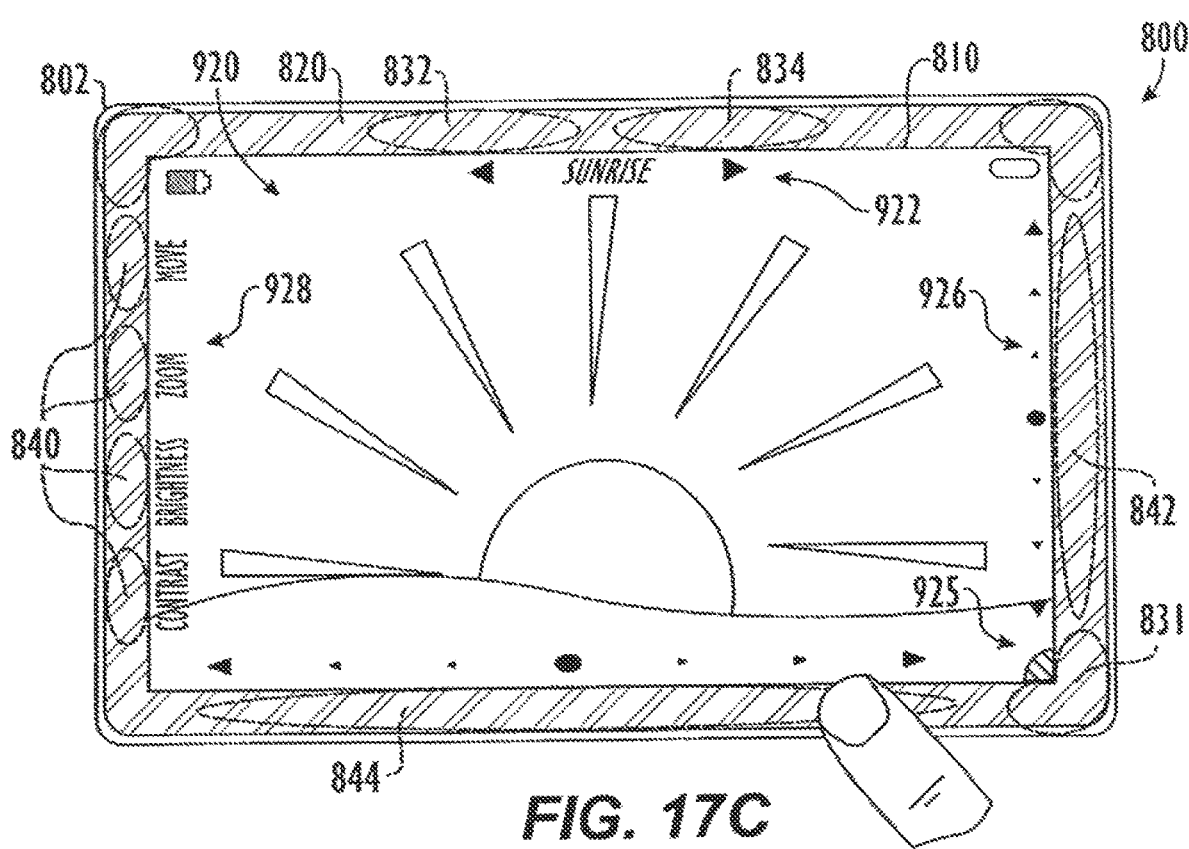

If the user selects the toggle area 831 in the lower right corner, the screen 920 shows additional user controls. In FIG. 17C, for example, the toggle area 831 has been previously selected so that a new visual guide 925 is provided adjacent the area. In addition, a plurality of areas 840 on the bezel 820 are designated for a number of user controls, which have visual guides 928 shown on the display 810 adjacent the bezel 820. In this example, the user controls available for viewing photos include contrast, brightness, zoom, and move. A user can select one of these areas 840 to access that corresponding control. Then, while the corresponding control is activated (either by highlighting the corresponding visual guide 928 or while the user continues touching the corresponding area 840), the user can adjust values or settings for the selected control using one or more areas 842 and 844 on other portions of the bezel 820. These areas 842 and 844 have adjacent visual guides 926 showing that they are used to adjust values. By reselecting the toggle area 831 in the lower right hand corner, the user can remove the visual guides 926 and 928 for the user controls from the screen 920.

Figure 18:
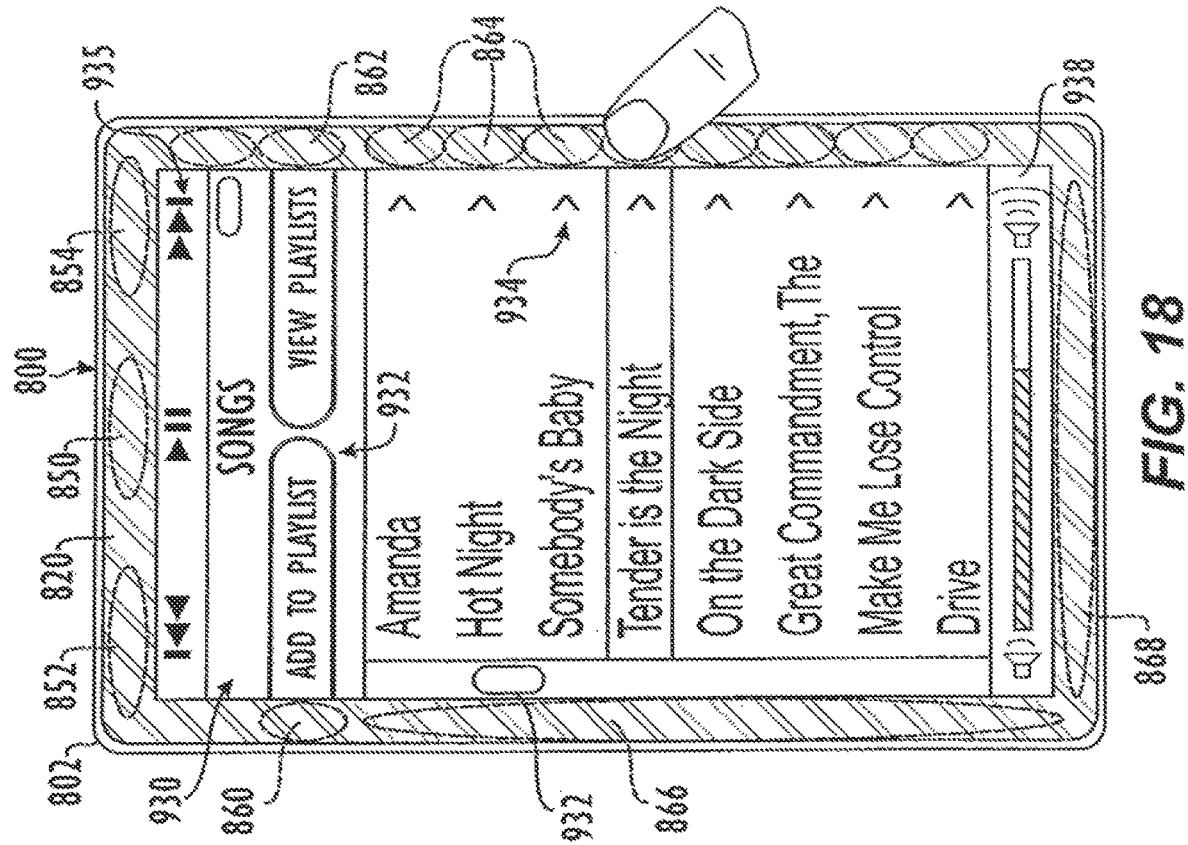

In FIG. 18, an example screen 930 listing songs is shown on the display 810 of the device 800. A plurality of areas 864 on the right side of the bezel 820 adjacent visual guides 934 for the listed songs can be used to select, highlight, or open the corresponding song. An area 864 on the left side of the bezel 820 adjacent a scroll guide 934 can be used to scroll through the list of songs on the screen 930. If the user selects or highlights one of the listed songs, the user can select areas 850 to play/pause the song or areas 852, 854 to track forward or back from the selected song. These areas 850, 852, 854 have corresponding visual guides 935. The user can also select to add the selected song to a play list or can elect to view various play lists by selecting from additional areas 860 and 862 having visual guides 932. Depending on the amount of area of the display 810 available, one or more user controls 938 (e.g., volume level) can be displayed on the screen 930, and one or more unused areas 868 of the bezel 820 can be designated for the one or more user controls 938.

Figure 19:
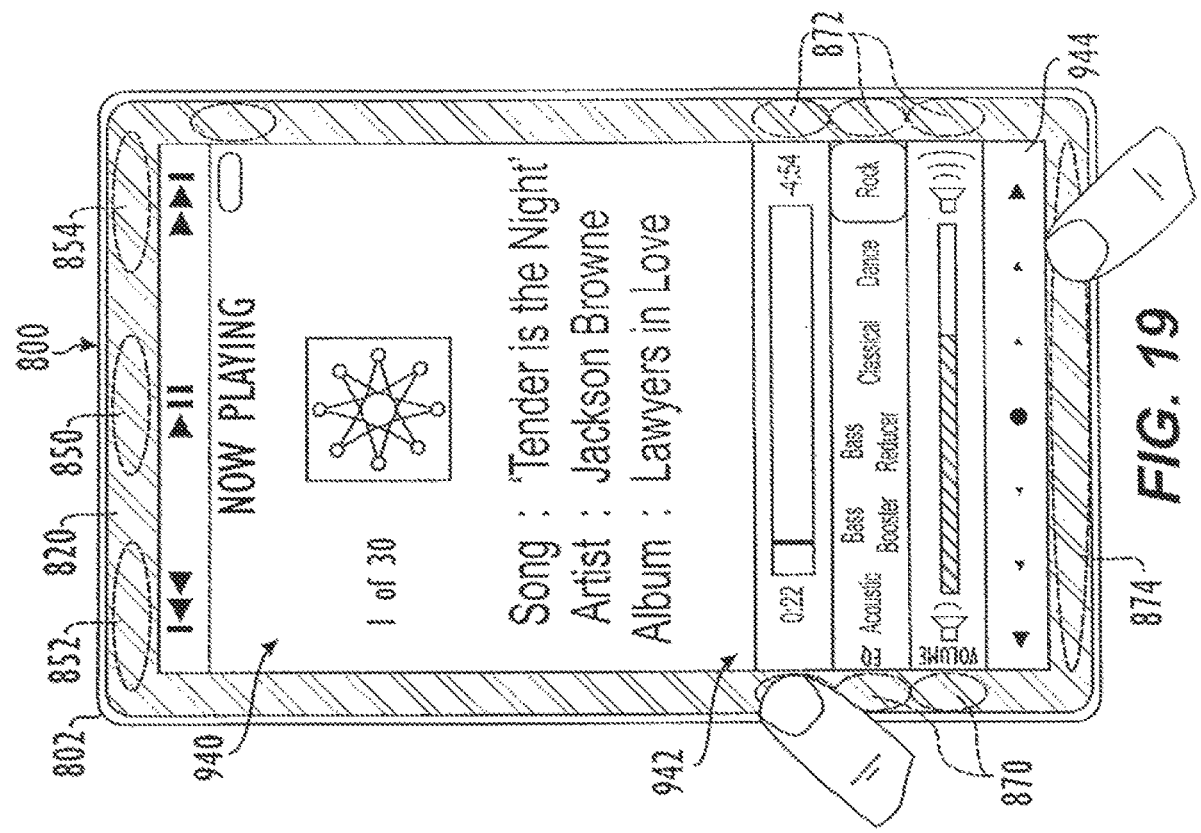

In FIG. 19, an example "now playing" screen 940 is shown on the display 810 of the device 800. The screen 940 shows information about the song that is currently being played on the device 800. As before, the area 850 on the bezel 820 is designated for play/pause user controls, and areas 852 and 854 are designated for previous track and next track, respectively. A plurality of areas 870 and 872 are provided on the sides of the bezel 820 adjacent various visual guides 942 corresponding to various user controls (e.g., time bar for song, equalizer selection, and volume level). In one possibility, the user can select to change the settings or values of any one of these user controls by tapping or holding on the areas 870 or 872 on either side of the adjacent visual guide 942 for a control to advance or reduce the setting or value. In another possibility, the user can select or highlight one of the user controls by tapping or holding on the areas 870 or 872 on either side of the adjacent visual guide 942 for a control, and the user can then advance or reduce the setting or value by sliding over an additional area 874 of the bezel 820 next to the visual guide 944 for adjustability.

As shown by the example multimedia device 800 of FIGS. 15 through 19, the touch sensitive bezel 820 and the user interface 900 according to certain teachings of the present disclosure can obtain and process various forms of touch data. For example, the touch sensitive bezel 820 can be used to sense touch gestures, such as touch and drag operations, made by the user. Using the touch gestures, a user can perform a number of user controls, such as move portions of an image that are being displayed (e.g., page up or page down), move a curser to drop and drag visual elements displayed (e.g., move a holder or file in a directory window), scroll up and down through a screen, skip through images in an album or series of images, adjust the setting or value of a user control, or perform similar operations. In addition, because the touch sensitive bezel 820 can also be configured to detect force, the pressure that a user applies to a designated area of the bezel 820 can be used to determine the amount, extent, or level of a setting, adjustment, or value of a user control.

Furthermore, the touch sensitive bezel 820 according to the present disclosure can be used to obtain touch data corresponding to multiple user controls simultaneously. For example, the user controls of the bezel 820 can be configured so that one side of the bezel 820 controls brightness with a touch and drag motion by the user, while the other side of the bezel 820 controls contrast with a touch and drag motion by the user. Thus, using both of these sides of the bezel 820, the user can simultaneously adjust both the contrast and the brightness of the display 810 using touch and drag motions on the sides of the bezel 820. These and other possibilities and combinations will be apparent to one skilled in the art having the benefit of the present disclosure.

The foregoing description of preferred and other embodiments shows several different configurations of electronic devices. Certain features, details, and configurations were disclosed in conjunction with each embodiment. However, one skilled in the art will understand (1) that such features, details, and configurations can be used with the various different embodiments, even if such features, details, and configurations were not specifically mentioned in conjunction with a particular embodiment, and (2) that this disclosure contemplates various combinations of the features, details, and configurations disclosed herein. More specifically, the foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed:

1. An apparatus, comprising:
a touch screen located on a front surface of the apparatus;
a first touch sensitive region located on a side surface of the apparatus, the side surface adjacent to but non-planar with respect to the front surface, the first touch sensitive region providing one or more configurable control areas; and
a processor communicatively coupled to the touch screen and the first touch sensitive region, the processor configured for
displaying one or more first images in a first region of the touch screen,
detecting a first touch at a first control area of the first touch sensitive region,
upon detecting the first touch, configuring one or more areas in a second region of the touch screen as input areas, the one or more input areas correlated to a location of the first touch,
detecting one or more second touches at the one or more input areas in the second region, and
performing a first operation in response to the detected one or more second touches.

2. The apparatus of claim 1, the processor further configured for displaying the first region and the second region adjacent to each other on the touch screen.

3. The apparatus of claim 1, the processor further configured for locating the second region at an edge of the touch screen.

4. The apparatus of claim 1, the processor further configured for detecting a gesture at the first control area of the first touch sensitive region, and upon detecting the gesture, designating the one or more areas in the second region of the touch screen as the input areas.

5. The apparatus of claim 1, the processor further configured for detecting movement of an object over the first control area of the first touch sensitive region, and upon detecting the movement of the object, designating the one or more areas in the second region of the touch screen as the input areas.

6. The apparatus of claim 1, the processor further configured for detecting a gesture at the one or more input areas of the second region, and performing the first operation in response to the detected gesture.

7. The apparatus of claim 1, the processor further configured for detecting movement of an object at the one or more input areas of the second region, and performing the first operation in response to the detected movement.

8. The apparatus of claim 1, the processor further configured for detecting a tap at the one or more input areas of the second region, and performing the first operation in response to the detected tap.

9. The apparatus of claim 1, the processor further configured for re-designating a function of the one or more configurable control areas in the first touch sensitive region during operation of the apparatus.

10. A method for performing operations on a hand-held device, comprising:
displaying one or more first images in a first region of a touch screen located on a front surface of the device;
providing one or more configurable control areas at a first touch sensitive region located on a side surface of the device, the side surface adjacent to but non-planar with respect to the front surface;
detecting a first touch at a first control area of the first touch sensitive region;
upon detecting the first touch, configuring one or more areas in a second region of the touch screen as input areas, the one or more input areas correlated to a location of the first touch;
detecting one or more second touches at the one or more input areas in the second region; and
performing a first operation in response to the detected one or more second touches.

11. The method of claim 10, further comprising displaying the first region and the second region adjacent to each other on the touch screen.

12. The method of claim 10, further comprising locating the second region at an edge of the touch screen.

13. The method of claim 10, further comprising detecting a gesture at the first control area of the first touch sensitive region, and upon detecting the gesture, designating the one or more areas in the second region of the touch screen as the input areas.

14. The method of claim 10, further comprising detecting movement of an object over the first control area of the first touch sensitive region, and upon detecting the movement of the object, designating the one or more areas in the second region of the touch screen as the input areas.

15. The method of claim 10, further comprising detecting a gesture at the one or more input areas of the second region, and performing the first operation in response to the detected gesture.

16. The method of claim 10, further comprising detecting movement of an object at the one or more input areas of the second region, and performing the first operation in response to the detected movement.

17. The method of claim 10, further comprising detecting a tap at the one or more input areas of the second region, and performing the first operation in response to the detected tap.

18. The method of claim 10, further comprising re-designating a function of the one or more configurable control areas in the first touch sensitive region during the performance of the operations.

19. A non-transitory computer-readable storage medium having stored thereon instructions which, if executed by a specialized electronic device, causes the electronic device to perform a method comprising:
- displaying one or more first images in a first region of a touch screen located on a front surface of the device;
- providing one or more configurable control areas at a first touch sensitive region located on a side surface of the device, the side surface adjacent to but non-planar with respect to the front surface;
- detecting a first touch at a first control area of the first touch sensitive region;
- upon detecting the first touch, configuring one or more areas in a second region of the touch screen as input areas, the one or more input areas correlated to a location of the first touch;
- detecting one or more second touches at the one or more input areas in the second region; and
- performing a first operation in response to the detected one or more second touches.

20. The non-transitory computer-readable storage medium of claim 19, the method further comprising detecting a gesture at the first control area of the first touch sensitive region, and upon detecting the gesture, designating the one or more areas in the second region of the touch screen as the input areas.

* * * * *